US012281204B2

(12) United States Patent
Ellison et al.

(10) Patent No.: US 12,281,204 B2
(45) Date of Patent: Apr. 22, 2025

(54) MULTIBLOCK COPOLYMERS OF POLYOLEFINS AND POLYESTERS

(71) Applicants: Regents of the University of Minnesota, Minneapolis, MN (US); Murray State University, Murray, KY (US)

(72) Inventors: Christopher John Ellison, Eden Prairie, MN (US); Kevin Michael Miller, Murray, KY (US)

(73) Assignees: Regents of the University of Minnesota, Minneapolis, MN (US); Murray State University, Murray, KY (US)

( * ) Notice: Subject to any disclaimer, the term of this patent is extended or adjusted under 35 U.S.C. 154(b) by 591 days.

(21) Appl. No.: 17/598,655

(22) PCT Filed: Apr. 1, 2020

(86) PCT No.: PCT/US2020/026208
§ 371 (c)(1),
(2) Date: Sep. 27, 2021

(87) PCT Pub. No.: WO2020/205992
PCT Pub. Date: Oct. 8, 2020

(65) Prior Publication Data
US 2022/0195127 A1 Jun. 23, 2022

Related U.S. Application Data
(60) Provisional application No. 62/827,413, filed on Apr. 1, 2019.

(51) Int. Cl.
C08G 81/02 (2006.01)
C08G 63/183 (2006.01)
C08G 63/82 (2006.01)

(52) U.S. Cl.
CPC ......... C08G 81/027 (2013.01); C08G 63/183 (2013.01); C08G 63/82 (2013.01)

(58) Field of Classification Search
CPC .... C08G 81/027; C08G 63/183; B32B 27/32; B32B 27/306; B32B 2270/00
See application file for complete search history.

(56) References Cited

U.S. PATENT DOCUMENTS 5,296,550 A   3/1994 Natarajan et al.
6,300,419 B1  10/2001 Sehanobish et al.
(Continued)

FOREIGN PATENT DOCUMENTS

CN   102344556   11/2013
GB   1091256    11/1967
(Continued)

OTHER PUBLICATIONS

Akishev et al., "Studies on cold plasma-polymer surface interaction by example of PP- and PET-films," J. Phys. D. Appl. Physics, Nov. 13, 2008, 41(23):235203, 13 pages.
(Continued)

Primary Examiner — Ling Siu Choi
Assistant Examiner — Olga Lucia Donahue
(74) Attorney, Agent, or Firm — Fish & Richardson P.C.

(57) ABSTRACT

This document provides multiblock copolymers comprising: at least one block obtained from a polyester having an average MN of from about 2,000 to about 200,000, wherein the polyester contains one or more terephthalate units; and at least one block obtained from a polyolefin having an average MN of from about 2,000 to about 200,000. This document further provides methods of making and using the multiblock copolymers, and multilayer films, polymer blends, and molded articles comprising the multiblock copolymers.

18 Claims, 21 Drawing Sheets

(56) References Cited

U.S. PATENT DOCUMENTS

| | | | |
|---|---|---|---|
| 6,773,735 | B1 | 8/2004 | Dalgewicz, III |
| 2005/0107533 | A1 | 5/2005 | Schauder et al. |
| 2007/0173348 | A1 | 7/2007 | Rajagopalan et al. |
| 2008/0275185 | A1 | 11/2008 | deKok et al. |
| 2013/0041055 | A1 | 2/2013 | Hillmyer et al. |
| 2014/0024778 | A1 | 1/2014 | Alsewailem et al. |
| 2014/0228518 | A1 | 8/2014 | Alsewailem et al. |
| 2016/0237203 | A1 | 8/2016 | Martinez et al. |

FOREIGN PATENT DOCUMENTS

| | | |
|---|---|---|
| WO | WO 2017/210423 | 12/2017 |
| WO | WO 2018/063578 | 4/2018 |
| WO | WO 2020/205992 | 10/2020 |
| WO | WO 2023/205392 | 10/2023 |

OTHER PUBLICATIONS

Albertsson et al., "Designed to degrade," Science, Nov. 17, 2017, 358(6365):872-873.
Balazs et al., "Monte Carlo simulations for the behavior of multi block copolymers at a penetrable interface," J. Chem. Physics, 1991, 94(2):1653-1663.
Barlow et al., "Mechanical compatibilization of immiscible blends," Polym. Eng. Science, Jun. 1984, 24(8):525-534.
Barnes et al., "Accumulation and fragmentation of plastic debris in global environments," Philos. Trans. R. Soc. B Biol. Sciences, Jul. 27, 2009, 364(1526):1985-1998.
Bates et al., "Multiblock Polymers: Panacea or Pandora's Box?," Science, Apr. 27, 2012, 336(6080):434-440.
Berry et al., "The Viscosity of Polymers and Their Concentrated Solutions," Fortschritte der Hochpolymeren-Forschung, 1968, 5:261-357.
Birch et al., "Accelerating the Coupling of Maleated Polyolefins with Polyesters via Tin Compounds," Macromolecules, Oct. 29, 2019, 52(21):8359-8366.
Carté et al., "Morphological origin of super toughness in poly(ethylene terephthalate)/polyethylene blends," J. Appl. Polym. Science, Apr. 20, 1993, 48(4):611-624.
Christensen et al., "The renewable chemicals industry," ChemSusChem, 2008, 1(4):283-289.
Cole et al., "Adhesion between immiscible polymers correlated with interfacial entanglements," Macromolecules, Mar. 28, 2003, 36(8):2808-2815.
Coltelli et al., "Influence of Compatibilizer Precursor Structure on the Phase Distribution of Low Density Poly(Ethylene) in a Poly(Ethylene Terephthalate) Matrix," Polym. Eng. Science, 2008, 48(7):1424-1433.
Corsi et al., "Localization of a Multiblock Copolymer at a Selective Interface: Scaling Predictions and Monte Carlo Verification," J. Chem. Physics, Feb. 28, 2005, 122(9):094907, 8 pages.
Dadmun, "Importance of a broad composition distribution in polymeric interfacial modifiers," Macromolecules, Nov. 10, 2000, 33(24):9122-9125.
Eagan et al., "Combining polyethylene and polypropylene: Enhanced performance with PE/iPP multiblock polymers," Science, Feb. 24, 2017, 355(6327):814-816.
Eastwood et al., "Multiblock copolymers in the compatibilization of polystyrene and poly(methyl methacrylate) blends: Role of polymer architecture," Macromolecules, May 18, 2002, 35(13):5069-5077.
Ebeling et al., "Effect of a tie layer on the delamination toughness of polypropylene and polyamide-66 microlayers," J. Appl. Polym. Science, Feb. 28, 1999, 71(9):1461-1467.
EPA.gov [online], "Plastics," Mar. 2015, retrieved on Jan. 24, 2022, retrieved from URL<https://archive.epa.gov/epawaste/conserve/tools/warm/pdfs/Plastics.pdf>, 14 pages.
Feig et al., "Biodegradable Polymeric Materials in Degradable Electronic Devices," ACS Cent. Science, Feb. 6, 2018, 4(3):337-348.
Fetters et al., "Connection between Polymer Molecular Weight, Density, Chain Dimensions, and Melt Viscoelastic Properties," Macromolecules, Aug. 1, 1994, 27(17):4639-4647.
Garcia et al., "The future of plastics recycling," Science, Nov. 17, 2017, 358(6365):870-872.
Genomatica.com [online], "Genomatica," available on or before Feb. 1, 2019, via Internet Archive: Wayback Machine URL<https://web.archive.org/web/20190201074823/https://www.genomatica.com/>, retrieved on Jan. 25, 2022, retrieved from URL<https://www.genomatica.com/>, 5 pages.
Geyer et al., "Production, use, and fate of all plastics ever made," Sci. Advances, Jul. 19, 2017, 3(7):25-29.
Guerrero et al., "Properties and Morphology of Poly(Ethylene Terephthalate) and High-Density Polyethylene Blends," J. Appl. Polym. Science, Aug. 28, 2001, 82(6):1382-1390.
Hameed et al., "Melt Miscibility and Mechanical Properties of Metallocene LLDPE blends with HDPE: Influence of Mw of LLDPE," Polym. Journal, 2006, 38(11):1114-1126.
Hillmyer et al., "Synthesis and characterization of model polyalkane-poly(ethylene oxide) block copolymers," Macromolecules, Oct. 21, 1996, 29(22):6994-7002.
Hussein, "Influence of composition distribution and branch content on the miscibility of m-LLDPE and HOPE blends: Rheological investigation," Macromolecules, Feb. 22, 2003, 36(6):2024-2031.
Iñiguez et al., "Morphological Stability of Postconsumer PET/HDPE Blends," Polym. Bulletin, Nov. 2000, 45(3):295-302.
Jambeck et al., "Plastic waste inputs from land into the ocean," Science, Feb. 13, 2015, 347(6223):768-771.
Kaiser et al., "Recycling of Polymer-Based Multilayer Packaging: A Review," Recycling, Dec. 22, 2017, 3(1):1, 26 pages.
Kalfoglou et al., "Comparison of compatibilizer effectiveness for PET/HDPE blends," Polymer, 1995, 36(23):4453-4462.
Kim et al., "Improved compatibility of high-density polyethylene/poly(ethylene terephthalate) blend by the use of blocked isocyanate group," J. Appl. Polym. Science, Oct. 2000, 78(5):1017-1024.
Lee et al., "Can random copolymers serve as effective polymeric compatibilizers?," J. Polym. Sci. Part B Polym. Physics, Dec. 1997, 35(17):2835-2842.
Lee et al., "Sustainable Poly(lactide-b-butadiene) Multiblock Copolymers with Enhanced Mechanical Properties," Macromolecules, Sep. 3, 2013, 46(18):7387-7398.
Lin et al., "Multiblock copolymers consisting of polyolefin and polyester blocks: 1. Thermal and mechanical behaviour," Polymer, 1994, 35(19):4120-4126.
Lohse et al., "Graft Copolymer Compatibilizers for Blends of Polypropylene and Ethylene-Propylene Copolymers," Macromolecules, Jan. 1, 1991, 24(2):561-566.
Lusinchi et al., "In Situ Compatibilization of HDPE/PET Blends," J. Appl. Polym. Science, Jan. 2001, 79(5):874-880.
Macosko et al., "Compatibilizers for Melt Blending: Premade Block Copolymers," Macromolecules, Aug. 12, 1996, 29(17):5590-5598.
Mathers, "How well can renewable resources mimic commodity monomers and polymers?," J. Polym. Sci., Part A: Polym. Chemistry, Jan. 1, 2012, 50(1):1-15.
Morris, "Appendix B—Examples of Flexible Packaging Film Structures," The Science and Technology of Flexible Packaging, Plastics Design Library, Sep. 2016, 697-709.
Morris, "Effect of Process and Material Parameters on Interlayer Peel Strength in Coextrusion Coating, Film Casting and Film Blowing," J. Plast. Film Sheeting, Oct. 2010, 26(4):343-376.
Morris, "Introduction," The Science and Technology of Flexible Packaging, Plastics Design Library, 2017, 3-21.
Nomura et al., "Multiblock Copolymers for Recycling Polyethylene-Poly(ethylene terephthalate) Mixed Waste," ACS Appl. Mater, Interfaces, Feb. 4, 2020, 12(8):9726-9735.
Noolandi, "Multiblock copolymers as polymeric surfactants: are 'pancakes' better than 'dumbbells'?," Macromol. Theory Simulations, Sep. 1992, 1(5):295-298.
Okamoto et al., "Phase separation and homogenization in poly(ethylene naphthalene-2,6-dicarboxylate)/poly(ethylene terephthalate) blends," Polymer, Mar. 1997, 38(6):1357-1361.

(56) References Cited

OTHER PUBLICATIONS

Panthani et al., "Crystallization and Mechanical Properties of Poly(1-lactide)-Based Rubbery/Semicrystalline Multiblock Copolymers," Macromolecules, Jun. 22, 2015, 48(13):4529-4540.

Pawlak et al., "Recycling of Postconsumer Poly(Ethylene Terephthalate) and High-Density Polyethylene by Compatibilized Blending," J. Appl. Polym. Science, Nov. 7, 2002, 86(6):1473-1485.

PCT International Preliminary Report and Patentabilty in International Appln. No. PCT/US2020/026208, dated Sep. 28, 2021, 6 pages.

PCT International Search Report and Written Opinion in International Appln. No. PCT/US2020/026208, dated Jun. 18, 2020, 8 pages.

Pietrasanta et al., "Reactive compatibilization of HDPE/PET blends by glycidyl methacrylate functionalized polyolefins," Macromol. Chem. Physics, 1999, 200(1):142-149.

Pitet et al., "Nanoporous linear polyethylene from a block polymer precursor," J. Am. Chem. Society, Jun. 23, 2010, 132(24):8230-8231.

Pluta et al., "Phase Structure and Viscoelastic Properties of Compatibilized Blends of PET and HDPE Recyclates," J. Appl. Polym. Science, Nov. 7, 2001, 82(6):1423-1436.

Pracella et al., "Compatibilization and Properties of Poly(Ethylene Terephthalate)/Polyethylene Blends Based on Recycled Materials," Macromol. Chem. Physics, Jul. 2002, 203(10-11):1473-1485.

Russell et al., "Segment Density Distribution of Symmetric Diblock Copolymers at the Interface between Two Homopolymers As Revealed by Neutron Reflectivity," Macromolecules, Apr. 1, 1991, 24(7):1575-1582.

Ruzette et al., "Block Copolymers in Tomorrow's Plastics," Nat. Materials, Jan. 2005, 4(1):19-31.

Sambaru et al., "Properties and Morphology of Oriented Ternary Blends of Poly(Ethylene Terephthalate), High Density Polyethylene, and Compatibilizing Agent," Polym. Eng. Science, Jul. 1993, 33(13):827-837.

Sapieha et al., "Corona versus low pressure plasma treatment: Effect on surface properties and adhesion of polymers," J. Adhesion, 1993, 42(1-2):91-102.

Todd et al., "Reactive Compatibilization of Poly(ethylene terephthalate) and High-Density Polyethylene Using Amino-Telechelic Polyethylene, " Macromolecules, Nov. 29, 2016, 49(23):8988-8994.

Traugott et al., "Mechanical compatibilization of high density polyethylene-poly(ethylene terephthalate) blends," J. Appl. Polym. Science, Sep. 1983, 28(9):2947-2959.

Uehara et al., "Recycling assessment of multilayer flexible packaging films using design of experiments," Polimeros, Aug. 2015, 25(4):371-381.

Vispute et al., "Renewable chemical commodity feedstocks from integrated catalytic processing of pyrolysis oils," Science, Nov. 26, 2010, 330(6008):1222-1227.

Wang et al., "Hydroxy-telechelic poly(ethylene-co-20 isobutylene) as a soft segment for thermoplastic polyurethanes," Polym. Chemistry, Oct. 14, 2015, 6(38):6806-6811.

Wolf et al., "Role of Plasma Surface Treatments on Wetting and Adhesion," Engineering, Jan. 2010, 02(06):397-402.

Wu, "Chain structure and entanglement," J. Polym. Sci. Part B Polym. Physics, Mar. 1989, 27(4):723-741.

Xu et al., "Compatibilization of Isotactic Polypropylene (iPP) and High-Density Polyethylene (HDPE) with iPP-PE Multiblock Copolymers," Macromolecules, Oct. 22, 2018, 51(21):8585-8596.

Xu et al., "Synthesis and remarkable efficacy of model polyethylene-graft-poly(methyl methacrylate) copolymers as compatibilizers in polyethylene/poly(methyl methacrylate) blends," Macromolecules, Dec. 12, 2012, 45(24):9604-9610.

Yang et al., "Surface modification of polyethyleneterephthalate by an atmospheric-pressure plasma source," Surface Coatings Technology, Oct. 2004, 187(2-3):172-176.

Zeng et al., "Effect of Branching and Molecular Weight on Heterogeneous Catalytic Deuterium Exchange in Polyolefins," Macromolecules, Aug. 18, 2017, 50(17):6849-6860.

Zhang et al., "Effects of Different Types of Polyethylene on the Morphology and Properties of Recycled Poly(Ethylene Terephthalate)/Polyethylene Compatibilized Blends," Polym. Adv. Technologies, Dec. 2011, 22(12):1851-1858.

Zhang et al., "Models for adhesion at weak polymer interfaces," J. Polym. Sci. Part B Polym. Physics, Oct. 27, 2009, 47(23):2313-2319.

Zhang et al., "Thermal properties and morphology of recycled poly(ethylene terephthalate)/maleic anhydride grafted linear low-density polyethylene blends," J. Appl. Polym. Science, Sep. 2008, 109(6):3546-3553.

Zhu et al., "Monte Carlo simulation of the compatibility of graft copolymer compatibilized two incompatible homopolymer blends: Effect of graft structure," .J. Appl. Polym. Science, Aug. 5, 2007, 105(3):1591-1596.

Alamo et al., "Small Angle Neutron Scattering Investigations of Melt Miscibility and Phase Segregation in Blends of Linear and Branched Polyethylenes as a Function of the Branch Content," Macromolecules, Feb. 1997, 30(3):561-566.

Chang et al., "Interfacial Tension Measurement and Micellization in a Polymer Blend with Copolymer Surfactant: A False Critical Micelle Concentration," Macromolecules, Nov. 2015, 48(22):8154-8168.

Charoensirisomboon et al., "Pull-out of copolymer in situ-formed during reactive blending: effect of the copolymer architecture," Polymer, Aug. 2000, 41(18):6907-6912.

Choi, "Molecular dynamics studies of the thermodynamics of HDPE/butene-based LLDPE blends," Polymer, Nov. 2000, 41(24):8741-8747.

Cigana et al., "The relative efficacy of diblock and triblock copolymers for a polystyrene/ethylene-propylene rubber interface," Polymer, Jul. 1998, 39(15):3373-3378.

Creton et al., "Adhesion and Fracture of Interfaces Between Immiscible Polymers: from the Molecular to the Continuum Scal, " Molecular to the Continuum Scale, Adv. Polym. Sci. 2001, pp. 53-136.

Creton et al., "Failure mechanisms of polymer interfaces reinforced with block copolymers," Macromolecules, Jun. 1992, 25(12):3075-3088.

Crist et al., "Recent developments in phase separation of polyolefin melt blends," J. Polym. Sci. Part B Polym. Phys., Oct. 1997, 35(14):2329-2353.

Delva et al., "Compatibilization of PET-PE blends for the recycling of multilayer packaging foils," AIP Conf. Proc., Jan. 2019, 2055(1):030005.

Eckstein et al., "Determination of Plateau Moduli and Entanglement Molecular Weights of Isotactic, Syndiotactic, and Atactic Polypropylenes Synthesized with Metallocene Catalysts," Macromolecules, Jan. 1998, 30(4):1335-1340.

Ellison et al., "Multiblock Copolymers for Compatibilizing and Recycling PET and PE Mixed Waste Streams," Abstract: A42. 00001, Presented at the Proceedings of the American Physical Society March Meeting 2022, Mar. 14-18, 2022, Chicago, IL, 1 page.

Environmental Protection Agency [online], "Advancing Sustainable Materials Management: 2018 Fact Sheet," Dec. 2020, retrieved on Oct. 16, 2024, retrieved from URL<https://www.epa.gov/sites/default/files/2021-01/documents/2018_ff_fact_sheet_dec_2020_fnl_508.pdf>, 25 pages.

Favis et al., "The effect of viscosity ratio on the morphology of polypropylene/polycarbonate blends during processing," Polym. Eng. Sci., Nov. 1987, 27(21):1591-1600.

Fetters et al., "Chain Dimensions and Entanglement Spacings," Physical Properties of Polymers Handbook, 2007, Chapter 25, pp. 447-454.

Galante et al., "The crystallization of blends of different types of polyethylene: The role of crystallization conditions," Polymer, Oct. 1998, 39(21):5105-5119.

Galloway et al., "Block copolymer compatibilization of cocontinuous polymer blends," Polymer, Jan. 2005, 46(1):183-191.

Hameed et al., "Rheological study of the influence of Mw and comonomer type on the miscibility of m-LLDPE and LDPE blends," Polymer, 2002, 43(25):6911-6929.

(56) References Cited

OTHER PUBLICATIONS

Horák et al., "Effect of selected structural parameters of styrene-butadiene block copolymers on their compatibilization efficiency in polystyrene/polybutadiene blends," J. Polym. Sci., Part B: Polym. Phys., Dec. 2002, 40(23):2612-2623.

Horák et al., "Effect of styrene-butadiene triblock copolymer structure on its compatibilization efficiency in PS/PB and PS/PP blends," Polym. Eng. Sci., Oct. 2002, 42(10):2042-2047.

Hussein et al., "Influence of Composition Distribution and Branch Content on the Miscibility of m-LLDPE and HDPE Blends: Rheological Investigation," Macromolecules, Feb. 2003, 36(6):2024-2031.

Korley et al., "Toward polymer upcycling-adding value and tackling circularity," Science, Jul. 2021, 373(6550):66-69.

Liang, "Compatibility of Triblock Copolymers in an A/B/ Copolymer Ternary Mixture," Macromolecules, Nov. 1999, 32(24):8204-8209.

Lodge et al., "Linear Viscoelasticity," Polymer Chemistry, CRC Press, 2021, pp. 481-531.

Manias et al., "Thermodynamics of Polymer Blends," Polymer Blends Handbook, Springer Netherlands, 2014, pp. 171-289.

Noolandi et al., "Interfacial properties of immiscible homopolymer blends in the presence of block copolymers," Macromolecules, Mar. 1982, 15(2):482-492.

PCT International Search Report and Written Opinion in International Appln. No. PCT/US2023/019361, mailed on Aug. 30, 2023, 19 pages.

Pracella et al., "Compatibilization and properties of poly(ethylene terephthalate)/polyethylene blends based on recycled materials," Macromol. Chem. Phys., Jul. 2002, 203(10-11):1473-1485.

Ragaert et al., "Mechanical and chemical recycling of solid plastic waste," Waste Maneg., Nov. 2017, 69:24-58.

Sadik et al., "In-melt transesterification of poly(lactic acid) and poly(ethylene-co-vinylalcohol), " Mater. Chem. Phys., Jul. 2013, 140(2-3):559-556.

Sample et al., "Tandem ROMP/Hydrogenation Approach to Hydroxy-Telechelic Linear Polyethylene," ACS Macro Lett., May 2022, 11(5):608-614 [preprint].

Self et al., "Linear, Graft, and Beyond: Multiblock Copolymers as Next-Generation Compatibilizers," JACS Au., Jan. 2022, 2(2):310-321.

Thurber et al., "Accelerating Reactive Compatibilization of PE/PLA Blends by an Interfacially Localized Catalyst," ACS Macro Lett., Jan. 2015, 4(1):30-33.

Vranjes et al., "Compatibilization efficiency of styrene-butadiene block copolymers as a function of their block number," J. Appl. Polym. Sci., Apr. 2008, 108(1):466-472.

Weimann et al., "Phase Behavior of Isotactic Polypropylene-Poly(ethylene/ethylethylene) Random Copolymer Blends," Macromolecules, Jun. 1997, 30(12):3650-3657.

Xu et al., "Compatibilization of Isotactic Polypropylene (iPP) and High-Density Polyethylene (HDPE) with iPP-PE Multiblock Copolymers," Macromolecules, Oct. 2018, 51(21):8585-8596.

Zervoudakis et al., "Dihydroxy Polyethylene Additives for Compatibilization and Mechanical Recycling of Polyethylene Terephthalate/Polyethylene Mixed Plastic Waste," ACS Macro Lett., Dec. 2022, 11(12):1396-1402.

Zhang et al., "Efficiency of graft copolymers as compatibilizers for immiscible polymer blends," Polymer, Sep. 2007, 48(20):5940-5949.

Zhao et al., "A Review of the Miscibility of Polyethylene Blends," Mater. Manuf. Process., 2006, 21(2):135-142.

Bielawski et al., "Highly efficient syntheses of acetoxy- and hydroxy-terminated telechelic poly(butadiene)s using ruthenium catalysts containing N-heterocyclic ligands," Polymer, May 2001, 42(11):4939-4945.

PCT International Preliminart Report on Patentability in International Appln. No. PCT/US2023/019361, mailed on Oct. 31, 2024, 10 pages.

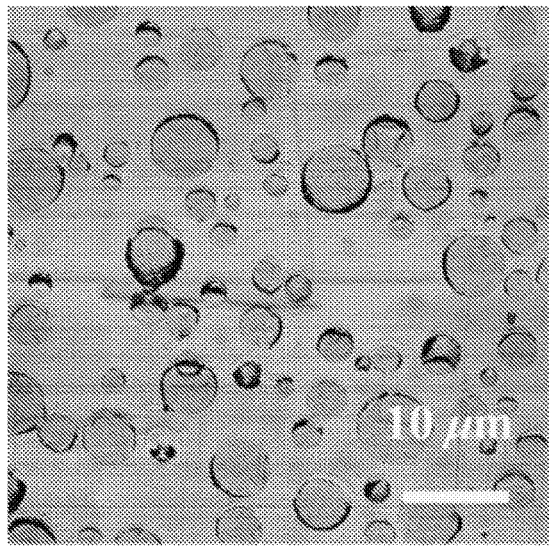
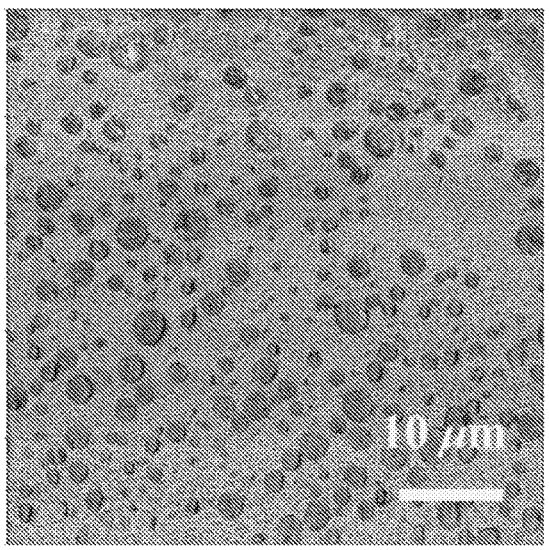
FIG. 13A               FIG. 13B
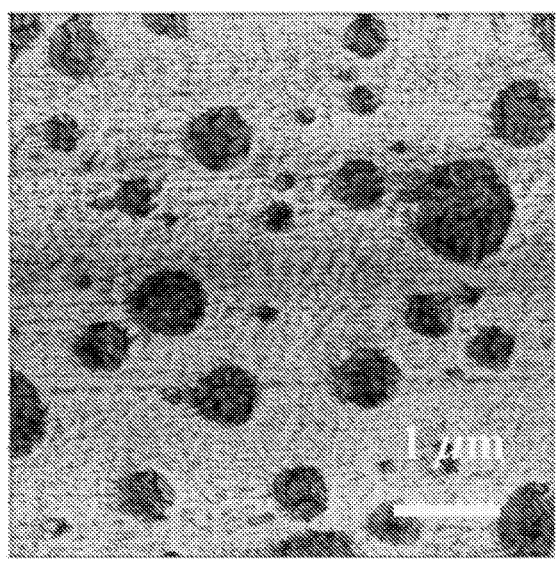
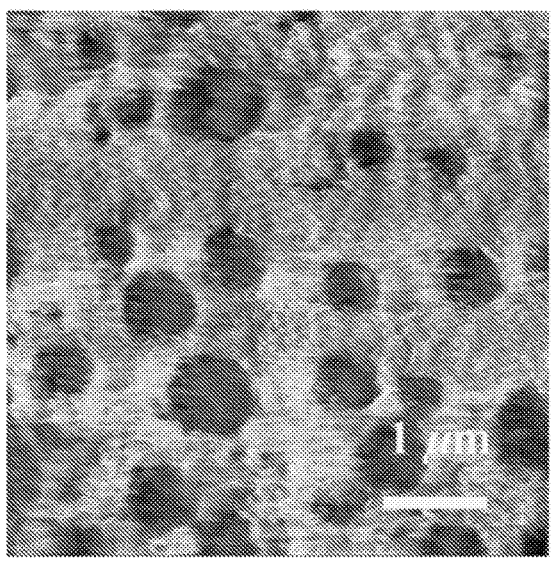
FIG. 13C               FIG. 13D

MULTIBLOCK COPOLYMERS OF POLYOLEFINS AND POLYESTERS

CROSS-REFERENCE TO RELATED APPLICATIONS

This application is a National Stage application under 35 U.S.C. § 371 of International Application No. PCT/US2020/026208, having an International Filing Date of Apr. 1, 2020, which claims priority to Provisional Patent Application Ser. No. 62/827,413, filed Apr. 1, 2019, which is incorporated herein by reference.

GOVERNMENT SUPPORT CLAUSE

This invention was made with government support under CHE-1413862 awarded by the National Science Foundation. The government has certain rights in the invention.

TECHNICAL FIELD

This document relates to multiblock copolymers of polyolefins and polyesters, wherein the polyester contains one or more terephthalate units. This document further includes methods and materials for making and using such multiblock copolymers, as well as multilayer films, polymer blends, and molded articles made from such multiblock copolymers.

BACKGROUND

Polyolefins and polyesters are two of the most prevalent polymers in the world. Polyolefins, such as polyethylene (PE), and polyesters, such as poly(ethylene terephthalate) (PET), are often combined in food or other packaging because of their gas barrier and mechanical properties. Multi-component products, including, e.g., PE/PET multilayer films, are commonly used in packaging, but the pure components cannot be easily or economically physically separated, which can make recycling of the packaging difficult or impractical.

SUMMARY

Provided herein are multiblock copolymers (MBCPs) of polyolefins and polyesters, wherein the polyester contains one or more terephthalate units. Such multiblock copolymers can be useful, e.g., as adhesion promoters and as compatibilizers for recycled multicomponent polymer products. This document further includes methods for making and using multiblock copolymers, as well as multilayer films, polymer blends, and molded articles made from such multiblock copolymers.

The MBCPs provided herein can advantageously adhere to both a polyolefin layer and a polyester layer of a multilayer film. The MBCPs provided herein advantageously provide compatibilization of the interface of immiscible blends of polyolefin and polyesters containing one or more terephthalate units and enable sublimate unusable blends to be formed into practical materials. Without being bound by any theory, it is believed the MBCPs provided herein enable compatibilization by improving ductility of the blends. These properties of the MBCPs provided herein open up the possibility of recycling previously inseparable multicomponent products by simple, direct melt blending.

Such MBCPs provide several advantages. For example, the MBCPs provided herein exhibit improved adhesion, mechanical strength and compatibility in polyester/polyolefin multi-layer films and blends, wherein the polyester contains one or more terephthalate units. The improved properties provided by the MBCPs described herein can significantly improve recyclability of packaging materials.

Polyesters containing one or more terephthalate units and polyolefins can have very large interaction parameters and can exhibit thin interfacial thicknesses, resulting in significantly poor adhesion and poor general compatibility. As one example of the advantages provided by the MBCPs described herein, MBCPs can dramatically strengthen the polyester/polyolefin interlayer which otherwise shows very poor adhesion. Moreover, the MBCPs provided herein can dramatically increase adhesion. Without being bound by any particular theory, it is believed the MBCPs can form entanglements with the adjoining homopolymer layers near the interface. In addition this entanglement phenomenon can be enhanced by increasing the size of the individual blocks in the MBCP, and thus can be tailored to particular product needs.

As another example of the advantages provided by the MBCPs described herein, MBCPs provided herein can effectively compatibilize polyester/polyolefin blends, wherein the polyester contains one or more terephthalate units. Moreover, the MBCPs can significantly reduce the size of the polyolefin droplets in the polyester matrix of such blends. Finally, the MBCPs provided herein can significantly increase elongation at break of such blends. Without being bound by any particular theory, it is believed that the interfacial energy of the blends decreases due to the localization of MBCP at the interface and that the resulting adhesion improves greatly contributing to the improvement of physical properties. Such properties of the MBCPs open up, by direct melt blending with a MBCP, the possibility of recycling multicomponent products such as PET/PE multilayer films common in food packaging, which are normally difficult or impractical to separate.

In a first general aspect, this document provides a multiblock copolymer comprising a block obtained from a polyester, wherein the polyester contains one or more terephthalate units; and a block obtained from a polyolefin. In some embodiments, the block obtained from a polyester can have an average $M_N$ of from about 2,000 to about 200,000. In some embodiments, the block obtained from a polyolefin can have an average $M_N$ of from about 2,000 to about 200,000.

In a second general aspect, this document provides a process for preparing a multiblock copolymer provided herein comprising reacting a hydroxy-terminated polyester block precursor, wherein the polyester contains one or more terephthalate units; a hydroxy-terminated polyolefin block precursor, and an acid chloride.

In a third general aspect, this document provides a process for preparing a multiblock copolymer provided herein comprising performing a ring opening reaction with a cyclic polyester block precursor, a diacyl chloride; and a hydroxy-terminated (e.g., monohydroxy-terminated, dihydroxy-terminated) polyolefin block precursor to form a diblock polyester-polyolefin polymer or a triblock polyester-polyolefin-polyester polymer; and coupling the diblock or triblock polymer in the presence of the diacyl chloride, wherein the polyester contains one or more terephthalate units.

In a fourth general aspect, this document provides a multilayer film comprising a multiblock copolymer as provided herein.

In a fifth general aspect, this document provides a method of making the multilayer films provided herein, comprising laminating a multiblock copolymer provided herein to a first polymer layer, a second polymer layer, or both the first and second polymer layers.

In a sixth general aspect, this document provides a method of making the multilayer films provided herein, comprising premixing a multiblock copolymer provided herein with a first polymer or a second polymer; and coextruding the first and second polymer to form the multilayer film.

In a seventh general aspect, this document provides a polymer blend comprising a multiblock copolymer provided herein; and two or more immiscible polymers.

In an eighth general aspect, this document provides a process for compatibilizing two or more immiscible polymers comprising adding a multiblock copolymer provided herein to a melted blend comprising a first polymer and second polymer, wherein each of the first and second polymers are immiscible with respect to the other.

In a ninth general aspect, this document provides a process comprising melting a multilayer film comprising a multiblock copolymer provided herein to produce a melt blend; and forming the melt blend into a molded article.

In a tenth general aspect, this document provides molded article comprising the MBCPs described herein.

Unless otherwise defined, all technical and scientific terms used herein have the same meaning as commonly understood by one of ordinary skill in the art to which the present application pertains. Methods and materials are described herein for use in the present application; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

Other features and advantages of the present application will be apparent from the following detailed description and figures, and from the claims.

DESCRIPTION OF DRAWINGS

FIG. 13A is an AFM phase image of an exemplary as-extruded blend of PET/PE (80/20), according to Example 3.

FIG. 13B is an AFM phase image of an exemplary as-extruded blend of PET/PE/TBCP (80/20/2), according to Example 3.

FIG. 13C is an AFM phase image of an exemplary as-extruded blend of PET/PE/MBCP-4k (80/20/2), according to Example 3.

FIG. 13D is an AFM phase image of an exemplary as-extruded blend of PET/PE/MBCP-7k (80/20/2), according to Example 3.

DETAILED DESCRIPTION

Definitions

Figure 1:
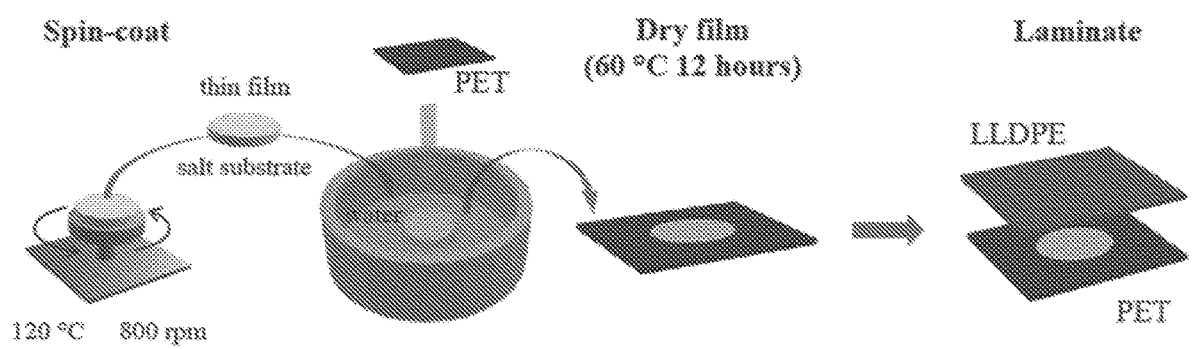
FIG. 1 is a schematic of an exemplary process for preparing a multilayer films.

The term "multiblock copolymer" (MBCP) includes copolymers comprised of two types of blocks where the number of blocks is at least two. In certain embodiments, MBCPs provided herein can have at least two types of blocks, where the number of blocks is 2, 3, 4, 5, 6, 7, 8, 9, 10, 12, 15, 20, 40, 100 or more blocks.

As used herein, "$M_N$" refers to the number average molecular weight of a polymer. For example, $M_N$ is the total weight of the polymer divided by the total number of molecules.

As used herein, the term "polymer" refers to a macromolecule containing a plurality of repeating subunits.

Polymeric materials are essential to daily human life, and are used in various products including packaging, textiles, electronics, automobiles, etc. The attractive properties of synthetic polymers (such as excellent chemical resistance and reasonable production cost) distinguish polymeric materials from traditional materials such as metals and ceramics. In 2015, the plastic production volume was 380-million-tons [1]. One reason for this high level of polymer production is packaging materials, which comprises 42% of the total plastic production. Most of these packaging materials are single use [1]. Since many synthetic polymers can take an extremely long time to degrade in the environment [2], [3], a number of serious environmental problems, such as ocean pollution and microplastic accumulation throughout the food chain, have arisen [2], [4]. Polymer recycling and the implementation of bio-degradable substitutes continue to be explored in an effort to reduce the negative environmental impacts of polymers. However, among the polymer waste streams in the U.S., only a fraction (<8.8%) of polymer products are recovered from municipal solid waste for recycling purposes. The majority of these waste streams are composed of polyesters containing one or more terephthalate units, such as poly(ethylene terephthalate) (PET) and, polyolefins such as polyethylene (PE) [5], [6]. PET and PE are two of the most commonly produced and consumed polymers in the world, accounting for approximately 80% of the total non-fiber plastics production. Both of these materials are used primarily in packaging materials because of their desirable properties. For example, PE can exhibit great ductility and impact strength, good chemical resistance, sealability, and excellent moisture barrier properties. PET can provide superior oxygen barrier properties, thermal stability (<350° C.), high modulus, and good mechanical strength.

PET and PE are commonly used in one-way packaging and are usually easy to recycle when they are used as a single substrate. In food packaging, however, PET and PE are often combined as a multilayer film in order to take advantage of the attractive properties of both polymers for improved performance. However, it is challenging to combine two or more polymer layers together directly because many polymer combinations (such as PET/PE) are inherently immiscible due to their small entropy gain from polymer mixing unless there are attractive interactions. This can lead to poor adhesion. Even when two polymers with similar structures are combined, such as PE and isotactic polypropylene (iPP), poor combatibility and adhesion are observed [7]. The adhesion between PE and PET is even worse than that of PE/iPP because the interaction parameter is larger.

Numerous attempts have been made to improve the adhesion between polymer layers. Such attempts can be classified into two categories. A first option is to place a tie layer between the two polymer layers [8H12]. Tie layer polymers usually have functional groups which are grafted or randomly introduced into copolymers, such as maleic anhydrides or glycidyl (meth)acrylates. The copolymer can chemically react with one or both layers so that the two layers can be combined effectively. Generally, reactive polyurethane adhesives which consist of isocyanate (toluene diisocyanate, diphenylmethane diisocyanate, etc.) and polyol (polyethylene glycol, polypropylene glycol, etc.) functional groups are also used to enhance adhesion. Another second effective option to improve the adhesion is surface modification by ion sputtering, corona and plasma irradiation [13]-[16]. Such treatments can enhance the surface properties of the polymer films to promote the adhesion by chemical and physical modification of the surface. However, when it comes to recycling, the multilayer films can be challenging to work with because the pure components can be difficult to physically separate [17]. The easiest and the most economical recycling method is to melt and simply mix polymers directly. However, in recycled blends of two or more immiscible polymer components, poor mechanical properties usually occur due to miscibility issues. To achieve the desired mechanical properties of polymer blend, improvement of both compatibility and adhesion is needed.

One potential approach to improve the compatibility in polymer blends is to introduce a reactive or non-reactive compatibilizer. For reactive compatibilization, polymers with reactive functional groups (e.g., maleic anhydride, glycidyl, or amino group) can be introduced to the blends during the mixing process and chemically react with, e.g., PET [18H25]. A greater compatibilizing effectiveness has been reported with copolymers containing glycidyl epoxy groups on side-chains as compared to those with maleic anhydride functional groups [23]. PET-grafted-polyolefin was formed as a sterically repelling layer at the interface after the reaction between the compatibilizer and the end groups of PET, resulting in finer domain dispersions. Recently, an amino-telechelic PE compatibilizer was synthesized, and was mixed with PET/high-density polyethylene (HDPE) blends in an extruder in a melt state [26]. The amino end groups enabled the reaction with PET to form multiblock copolymers as a compatibilizer. The properties of such polymer blends were better than the reported PET-grafted-polyolefin because each block in the reacted compatibilizer was structurally similar to both HDPE and PET. However, certain disadvantages were also present. For example, the reactive compatibilization reaction required efficient mixing, since there was little to no thermodynamic driving force for those functional polymers to migrate to the interface. Additionally, the reaction time needed to be shorter than the residence time of mixing in order to complete the reaction and the chemical bonds generated by reaction needed to be stable under the desired processing conditions (high temperature and high shear rate). Furthermore, viscosity was found to increase during and after the reaction due to unexpected crosslinking reactions, making processing more difficult.

Non-reactive compatibilizers are another potentially effective way to compatibilize immiscible blend systems, the most common approach of which mixes a miscible or compatible component with a homopolymer. For instance, random copolymers [27], [28] and graft copolymers [29]-[31] can have an ability to compatibilize polymer blends by localizing at the interface. Block copolymers are also one of the more industrially effective compatibilizers. For example, through the addition of a styrene-ethylene-butylene-styrene (SEBS) block copolymer, improvements in the ductility of the ternary blends have been reported. [32], [33]. The resulting interpenetrating network of PET and PE in the presence of SEBS was attributed to the observed improvement of mechanical properties. The investigators regarded the polystyrene in SEBS as a PET-like block, while the poly(ethylene-butylene) acted as a PE-like block. It was hypothesized that the compatibilizer would prefer to stay at the interface and "emulsify" the PET and PE.

MBCPs, as used herein, are comprised of at least two types of blocks where the number of blocks is at least two. MBCPs can have more efficiency of compatibilization compared to the di- or tri-block copolymers [35], [36]. Recently, the synthesis of ethylene and isotactic propylene (PE-iPP) MBCPs was reported with precisely controlled molecular weights utilizing a hafnium pyridylamine catalyst [7], [37]. The compatibilized blends showed good mechanical properties and could be used as recycled products. Improvement of interfacial adhesion between iPP and PE films having iPP-PE tetra-block copolymers disposed between the iPP and PE films was observed as compared to that with di-block copolymers. However, improved compatibility and adhesion is still needed for blends of polyolefins and polyesters containing one or more terephthalate units, such as for common PET/PE blends.

Multiblock Copolymers

Provided herein are multiblock copolymers (MBCPs) comprising polyolefins and polyesters, wherein the polyester contains one or more terephthalate units. Such MBCPs can be useful, e.g., as adhesion promoters and as compatibilizers for recycled multicomponent polymer products, such as recycled PET/PE blends.

In some embodiments, the MBCPs can comprise a block obtained from a polyester, wherein the polyester contains one or more terephthalate units; and a block obtained from a polyolefin. In some embodiments, the MBCPs can consist essentially of blocks obtained from a polyester containing one or more terephthalate units and blocks obtained from a polyolefin.

In some embodiments, the MBCPs can have a number average molecular weight ($M_N$) of from about 4,000 to about 600,000, from about 6,000 to about 300,000, from about 8,000 to about 200,000, from about 10,000 to about 100,000, from about 8,000 to about 80,000, from about 8,000 to about 70,000, from about 8,000 to about 60,000, from about 8,000 to about 50,000, from about 8,000 to about 40,000, from about 8,000 to about 30,000, from about 8,000 to about 24,000, or from about 8,000 to about 20,000. In some embodiments, the MBCPs can have a number average molecular weight ($M_N$) of about 4,000, about 5,000, about 6,000, about 7,000, about 8,000, about 9,000, about 10,000, about 11,000, about 12,000, about 13,0000, about 14,000, about 15,000, about 16,000, about 17,000, about 18,000, about 19,000, about 20,000, or more, up to about 600,000.

MBCPs can have two different types of repeating units. A first type of repeating units are the individual monomeric units of which the blocks are composed. In some embodiments, the MBCPs can have and average of 2 or more repeating individual monomeric units, from 2 to 50 repeating individual monomeric units, from 2 to 40 repeating individual monomeric units, from 2 to 30 repeating individual monomeric units, from 2 to 20 repeating individual monomeric units, from 4 to 20 repeating individual monomeric units, from 4 to 18 repeating individual monomeric units, from 4 to 16 repeating individual monomeric units, from 6 to 14 repeating individual monomeric units, from 6 to 12 repeating individual monomeric units, from 8 to 14 repeating individual monomeric units, or from 10 to 14 repeating individual monomeric units. In some embodiments, the MBCPs can have an average of 2, 3, 4, 5, 6, 7, 8, 9, 10, 11, 12, 13, 14, 15, 16, 17, 18, 19, 20, or more repeating individual monomeric units. Fractional average repeating individual monomeric units (e.g, decimal averages, such as, e.g., 6.5, 11.2, etc.) are also contemplated herein.

A second type of repeating units in MBCPs is repeating block units. As used herein, repeating block units refers to the simplest repeating block units. For example, in a polymer exhibiting -ABABAB- structure, each A and each B. singularly, are the simplest repeating block units (while each -AB-, though also a repeating block unit, is not the simplest unit). In some embodiments, the MBCPs can have an average of from about 2 to about 20 repeating block units. In some embodiments, the MBCPs can have an average of 2, 3, 4, 5, 6, 7, 8, 9, 10, 11, 12, 13, 14, 15, 16, 17, 18, 19, or 20 repeating block units. Fractional average repeating block units (e.g, decimal averages, such as, e.g., 6.5, 11.2, etc.) are also contemplated herein.

In some embodiments, the block units of the MBCPs can be randomly arranged. In some embodiments, random arrangement can include perfectly random arrangement. In some embodiments, random arrangement can include biased random order. In some embodiments, the blocks can be alternatingly arranged. In some embodiments, alternating arrangement of the blocks can be perfectly alternating. In some embodiments, alternating arrangement of the blocks can be non-perfectly alternating.

In some embodiments, the MBCPs can have more than one melting point. In some embodiments, the melting points of the MBCPs can approximately correspond to the melting points of one or more, or of each of the polyolefin and/or polyester from which the blocks are obtained. In some embodiments, the MBCPs can have a first T. of from about 115° C. to about 135° C., and a second T, of from about 245° C. to about 275° C.

In some embodiments, the MBCPs can comprise from about 10 wt.-% to about 90 wt.-% blocks obtained from the polyester, from about 20 wt.-% to about 80 wt.-% blocks obtained from the polyester, from about 30 wt.-% to about 70 wt.-% blocks obtained from the polyester, from about 40 wt.-% to about 60 wt.-% blocks obtained from the polyester, from about 40 wt.-% to about 50 wt.-% blocks obtained from the polyester, from about 50 wt.-% to about 60 wt.-% blocks obtained from the polyester, or from about 45 wt.-% to about 55 wt.-% blocks obtained from the polyester. In some embodiments, the MBCPs can comprise about 10 wt.-%, 20 wt.-%, 30 wt.-%, 40 wt.-%, 50 wt.-%, 60 wt.-%, 70 wt.-%, 80 wt.-%, 90 wt.-%, 41 wt.-%, 42 wt.-%, 43 wt.-%, 44 wt.-%, 45 wt.-%, 46 wt.-%, 47 wt.-%, 48 wt.-%, 49 wt.-%, 51 wt.-%, 52 wt.-%, 53 wt.-%, 54 wt.-%, 55 wt.-%, 56 wt.-%, 57 wt.-%, 58 wt.-%, 59 wt.-%, 15 wt.-%, 25 wt.-%, 35 wt.-%, 45 wt.-%, 55 wt.-%, 65 wt.-%, 75 wt.-%, or 85 wt.-% blocks obtained from the polyester.

In some embodiments, the MBCPs can comprise from about 10 wt.-% to about 90 wt.-% blocks obtained from the polyolefin, from about 20 wt.-% to about 80 wt.-% blocks obtained from the polyolefin, from about 30 wt.-% to about 70 wt.-% blocks obtained from the polyolefin, from about 40 wt.-% to about 60 wt.-% blocks obtained from the polyolefin, from about 40 wt.-% to about 50 wt.-% blocks obtained from the polyolefin, from about 50 wt.-% to about 60 wt.-% blocks obtained from the polyolefin, or from about 45 wt.-% to about 55 wt.-% blocks obtained from the polyolefin. In some embodiments, the MBCPs can comprise about 10 wt.-%, 20 wt.-%, 30 wt.-%, 40 wt.-%, 50 wt.-%, 60 wt.-%, 70 wt.-%, 80 wt.-%, 90 wt.-%, 41 wt.-%, 42 wt.-%, 43 wt.-%, 44 wt.-%, 45 wt.-%, 46 wt.-%, 47 wt.-%, 48 wt.-%, 49 wt.-%, 51 wt.-%, 52 wt.-%, 53 wt.-%, 54 wt.-%, 55 wt.-%, 56 wt.-%, 57 wt.-%, 58 wt.-%, 59 wt.-%, 15 wt.-%, 25 wt.-%, 35 wt.-%, 45 wt.-%, 55 wt.-%, 65 wt.-%, 75 wt.-%, or 85 wt.-% blocks obtained from the polyolefin.

In some embodiments, the MBCP as provided herein has a random arrangement, and has the following structural formula (I), wherein the brackets indicate a repeating element (e.g., a polyolefin unit, a polyester unit, or -polyester-polyolefin-units), and wherein "CO" indicates the random arrangement of the copolymer:

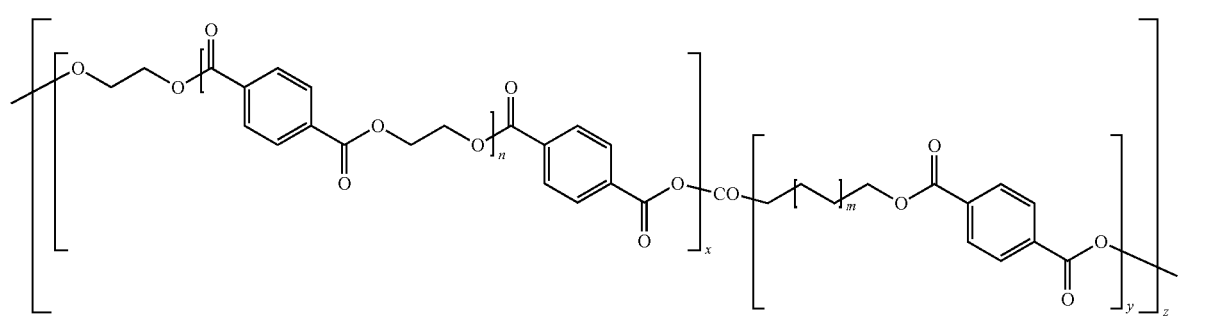

(I)

In some embodiments, n, m, x, y, and z are each independently an integer from 1 to 1,500, from 1 to 1,000, from 1 to 800, from 1 to 300, from 1 to 100, from 1 to 50, or from 1 to 20. In some embodiments, n, m, x, y, and z are each independently selected from 1, 2, 3, 4, 5, 6, 7, 8, 9, 10, 11, 12, 13, 14, 15, 16, 17, 18, 19, 20, 30, 40, 50, 60, 70, 80, 90, 100, 120, 140, 160, 180, 200, 250, 300, 500, 600, 800, 1000, 1100, 1200, 1300, 1400, and 1500.

In some embodiments, the MBCP as provided herein has an alternating arrangement, and has the following structural formula (II), wherein the brackets indicate a repeating element (e.g., a polyolefin unit, a polyester unit, or -polyester-polyolefin-units):

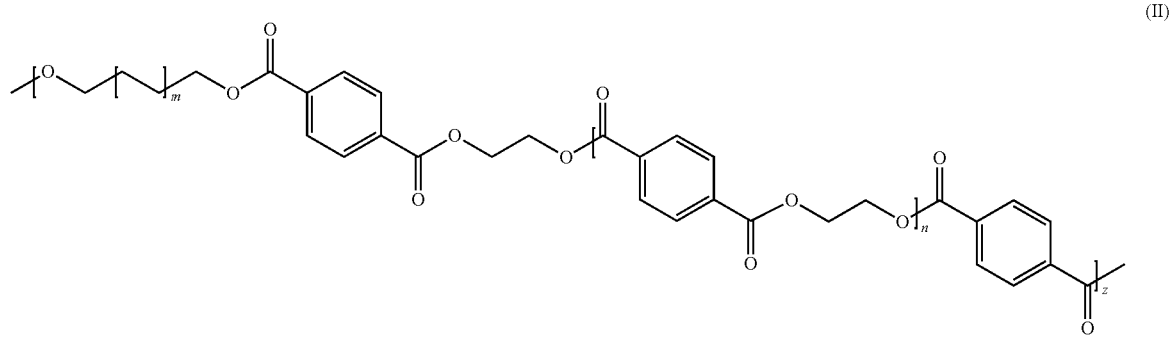

(II)

In some embodiments, n, m, and z are each independently an integer from 1 to 1,500, from 1 to 1,000, from 1 to 800, from 1 to 300, from 1 to 100, from 1 to 50, or from 1 to 20. In some embodiments, n, m, x, y, and z are each independently selected from 1, 2, 3, 4, 5, 6, 7, 8, 9, 10, 11, 12, 13, 14, 15, 16, 17, 18, 19, 20, 30, 40, 50, 60, 70, 80, 90, 100, 120, 140, 160, 180, 200, 250, 300, 500, 600, 800, 1000, 1100, 1200, 1300, 1400, and 1500.

Polyesters

The MBCPs provided herein can comprise a block obtained from a polyester, wherein the polyester contains one or more terephthalate units.

In some embodiments of the MBCPs provided herein, a block obtained from a polyester can have an average $M_N$ of from about 2,000 to about 200,000, from about 2,000 to about 180,000, from about 2,000 to about 160,000, from about 2,000 to about 140,000, from about 2,000 to about 120,000, from about 2,000 to about 100,000, from about 2,000 to about 80,000, from about 2,000 to about 60,000, from about 2,000 to about 40,000, from about 2,000 to about 20,000, from about 3,000 to about 200,000, from about 3,000 to about 180,000, from about 3,000 to about 160,000, from about 3,000 to about 140,000, from about 3,000 to about 120,000, from about 3,000 to about 100,000, from about 3,000 to about 80,000, from about 3,000 to about 60,000, from about 3,000 to about 40,000, from about 3,000 to about 20,000, from about 2,000 to about 19,000, from about 2,000 to about 18,000, from about 2,000 to about 17,000, from about 2,000 to about 16,000, from about 2,000 to about 15,000, from about 2,000 to about 14,000, from about 2,000 to about 12,000, from about 2,000 to about 10,000, from about 4,000 to about 19,000, from about 4,000 to about 18,000, from about 4,000 to about 17,000, from about 4,000 to about 16,000, from about 4,000 to about 15,000, from about 4,000 to about 14,000, from about 4,000 to about 12,000, from about 4,000 to about 10,000, from about 6,000 to about 19,000, from about 6,000 to about 18,000, from about 6,000 to about 17,000, from about 6,000 to about 16,000, from about 6,000 to about 15,000, from about 6,000 to about 14,000, from about 6,000 to about 12,000, and/or from about 6,000 to about 10,000.

In some embodiments, the polyester contains one or more terephthalate units. In some embodiments, the polyester contains at least 2, at least 3, at least 4, at least 5, at least 6, at least 7, at least 8, at least 9, at least 10, at least 12, at least 14, at least 16, at least 18, at least 20, at least 25, at least 30, at least 40, at least 50, at least 60, at least 75, at least 80, at least 100, at least 150, at least 200, at least 250, at least 300, at least 400, at least 500, at least 600, at least 700, at least 800, at least 900, or at least 1000 terephthalate units.

Any polyester containing one or more terephthalate units can be used in the MBCPs described herein. Suitable polyesters containing one or more terephthalate units can be selected from, for example, polyethylene terephthalate (PET), polyethylene terephthalate glycol (PETG), polybutylene terephthalate (PBT), polycyclohexane terephthalate glycol (PCTG), polycyclohexane terephthalate (PCT), polytrimethylene terephthalate (PTT), polydianol terephthalate (PDT), and combinations thereof. In some embodiments, the polyester is polyethylene terephthalate (PET).

Polyolefins

The MBCPs provided herein can comprise a block obtained from a polyolefin.

In some embodiments of the MBCPs provided herein, a block obtained from a polyolefin can have an average $M_N$ of from about 2,000 to about 200,000, from about 2,000 to about 180,000, from about 2,000 to about 160,000, from about 2,000 to about 140,000, from about 2,000 to about 120,000, from about 2,000 to about 100,000, from about 2,000 to about 80,000, from about 2,000 to about 60,000, from about 2,000 to about 40,000, from about 2,000 to about 20,000, from about 3,000 to about 200,000, from about 3,000 to about 180,000, from about 3,000 to about 160,000, from about 3,000 to about 140,000, from about 3,000 to about 120,000, from about 3,000 to about 100,000, from about 3,000 to about 80,000, from about 3,000 to about 60,000, from about 3,000 to about 40,000, from about 3,000 to about 20,000, from about 2,000 to about 19,000, from about 2,000 to about 18,000, from about 2,000 to about 17,000, from about 2,000 to about 16,000, from about 2,000 to about 15,000, from about 2,000 to about 14,000, from about 2,000 to about 12,000, from about 2,000 to about 10,000, from about 4,000 to about 19,000, from about 4,000 to about 18,000, from about 4,000 to about 17,000, from about 4,000 to about 16,000, from about 4,000 to about 15,000, from about 4,000 to about 14,000, from about 4,000 to about 12,000, from about 4,000 to about 10,000, from about 6,000 to about 19,000, from about 6,000 to about 18,000, from about 6,000 to about 17,000, from about 6,000 to about 16,000, from about 6,000 to about 15,000, from about 6,000 to about 14,000, from about 6,000 to about 12,000, and/or from about 6,000 to about 10,000.

Suitable polyolefins can be selected from, for example, a polyethylene, an ethylene α-olefin (C3-C20) copolymer, polypropylene, a propylene α-olefin (C4-C20) copolymer, polybutylene, a butylene α-olefin (C5-C20) copolymer, a polyisobutylene polymer, α-olefin diene copolymers, block copolymers comprising styrene and a conjugated diene, low-density polyethylene (LDPE), high-density polyethylene (HDPE), linear low-density polyethylene (LLDPE), poly(vinyl alcohol) (PVA), polyisoprene, and copolymers and hydrogenated forms thereof. For example, in some embodiments, the polyolefin can be hydrogenated polyisoprene, available from Cray Valley. In some embodiments, the polyolefin is selected from polyethylenes, polypropylenes, polystyrenes, alkyl polystyrenes, polybutylenes, polybutadienes, polyacrylates, polymethacrylates, polyisoprenes, polyisobutylene, polyvinylidene dichloride, polyethylene vinyl alcohol, and combinations thereof. In some embodiments, the polyolefin is a polyethylene.

Process of Making Multiblock Copolymers

In some embodiments, MBCPs can be prepared by coupling hydroxy-terminated polyesters containing at least one terephthalate unit and hydroxy-terminated polyolefins through a polyesterification reaction. Exemplary synthetic methods for preparing MBCPs of the present document are described below.

In some embodiments, the MBCPs provided herein contain block units that are randomly arranged. In some embodiments, random arrangement can include perfectly random arrangement. In some embodiments, random arrangement can include biased random order. Without being bound by any particular theory, it is believed that certain processes for making the polymers can be used to result in random arrangements of the block units. In some embodiments, such randomly arranged MBCPs can be prepared with a process comprising reacting a hydroxy-terminated polyester block precursor, wherein the polyester contains one or more terephthalate units; a hydroxy-terminated polyolefin block precursor; and an acid chloride. In some embodiments, one or more of the block precursors can be di-hydroxy terminated. In some embodiments, one or more of the block precursors can be mono-hydroxy terminated.

In some embodiments, the reaction can be performed at between about 70° C. and 300° C. In some embodiments, the reaction can be performed at between about 110° C. and 130° C. In some embodiments, the reaction is performed in the presence of a Lewis base neutralizer, which is a Lewis base that can neutralize any acidic byproduct. Exemplary Lewis base neutralizers include, but are not limited to, lutidine, TEA, hindered amine bases, and combinations thereof. In some embodiments, the reaction is performed in the presence of a Lewis base catalyst, which is a Lewis base (e.g., DMAP) that can catalyze the polyermization described herein. In some embodiments, the reaction is performed in the presence of one or more solubilizing solvents capable of solubilizing polyesters containing one or more terephthalate units, polyolefins and the resulting multiblock copolymer. Exemplary solubilizing solvents include, but are not limited to, THF, TCE, and combinations thereof. In some embodiments, the reaction is performed in the presence of lutidine, DMAP, and TCE.

The acid chloride can be any acid chloride. In some embodiments, the acid chloride is a diacyl chloride. In some embodiments, the diacyl chloride is selected from terephthaloyl chloride, sebacoyl chloride, adipoyl chloride, and isophthaloyl chloride. In some embodiments, the ratio of acid chloride functional groups to combined hydroxyl groups present on the polyester block precursor and polyolefin block precursor is from about 1:9 to about 9:1, from about 1:8 to about 8:1, from about 1:7 to about 7:1, from about 1:6 to about 6:1, from about 1:5 to about 5:1, from about 1:4 to about 4:1, from about 1:3 to about 3:1, from about 1:2 to about 2:1, or about 1:1.

In some embodiments, randomly arranged MBCPs can be prepared according to Scheme 1.

Scheme 1 hydroxy-terminated polyester containing at least one terephthalate unit

+ hydroxy-terminated polyolefin

→ Acid Chloride
2,6-lutidine, DMAP
TCE, 120° C.

randomly arranged polyolefin-polyester MBCP

In one exemplary embodiment, a randomly arranged MBCP can be formed according to Scheme 2.

Scheme 2

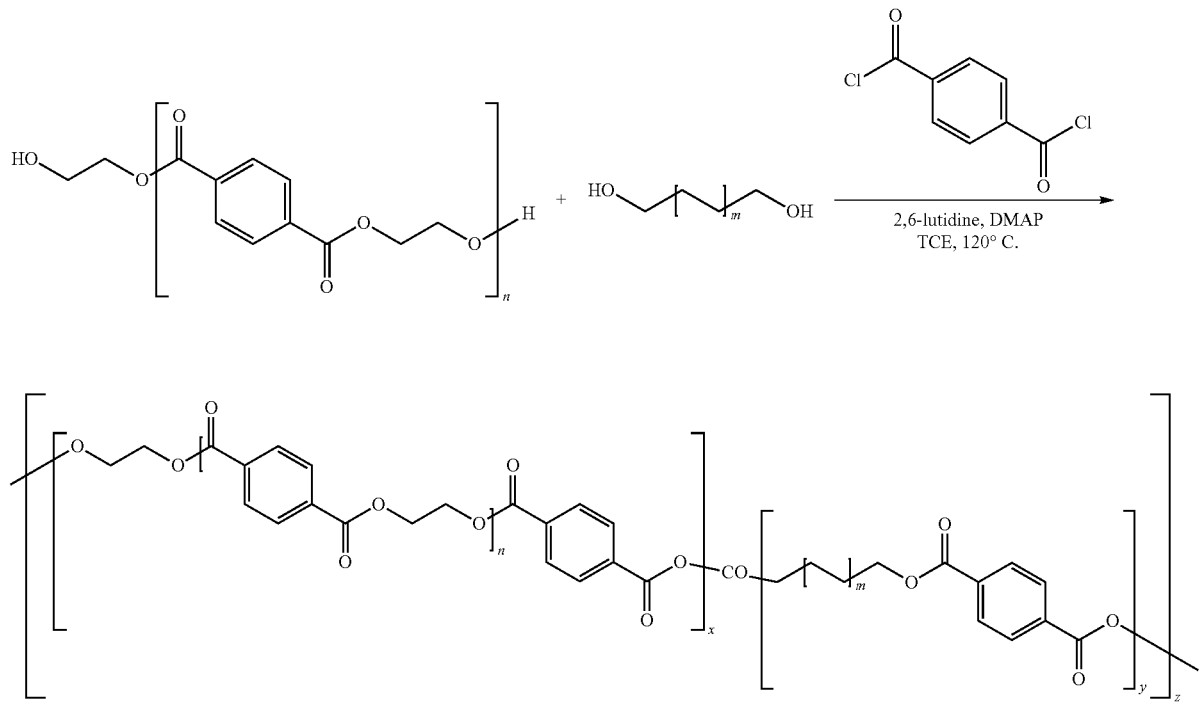

In some embodiments, n, m, x, y, and z are each independently an integer from 1 to 1,500, from 1 to 1,000, from 1 to 800, from 1 to 300, from 1 to 100, from 1 to 50, or from 1 to 20. In some embodiments, n, m, x, y, and z are each independently selected from 1, 2, 3, 4, 5, 6, 7, 8, 9, 10, 11, 12, 13, 14, 15, 16, 17, 18, 19, 20, 30, 40, 50, 60, 70, 80, 90, 100, 120, 140, 160, 180, 200, 250, 300, 500, 600, 800, 1000, 1100, 1200, 1300, 1400, and 1500

In some embodiments, the MBCPs provided herein contain block units that are alternatingly arranged. In some embodiments, alternating arrangement of the blocks can be perfectly alternating. In some embodiments, alternating arrangement of the blocks can be non-perfectly alternating. Without being bound by any particular theory, it is believed that certain processes for making the polymers can be used to result in alternating arrangements of the block units. In some embodiments, such alternatingly arranged MBCPs can be prepared with a process comprising performing a ring opening reaction with a cyclic polyester block precursor; a Lewis acid catalyst; and a hydroxy-terminated polyolefin block precursor to form a diblock polyester-polyolefin polymer or a triblock polyester-polyolefin-polyester polymer; and coupling the diblock or triblock polymer in the presence of the diacyl chloride, wherein the polyester contains one or more terephthalate units. In some embodiments, one or more of the block precursors can be di-hydroxy terminated. In some embodiments, di-hydroxyterminated block precursors can form triblock polymers. In some embodiments, one or more of the block precursors can be mono-hydroxy terminated. In some embodiments, mono-hydroxyterminated block precursors can form diblock polymers.

Non-limiting examples of Lewis acid catalysts that may be used include, for example, titanium tetraisopropoxide, dibutyltin oxide, tin octanote, aluminum isopropoxide, zirconium acetylacetonate, zirconium tetrabutoxide, tin(II) n-octanoate, tin(II) 2-ethylhexanoate, tin(II) laurate, dibutyltin dichloride, dibutyltin diacetate, dibutyltin dilaurate, dibutyltin dimaleate, dioctyltin diacetate, antimony triethoxide or boronic acid derivatives, such as pyridineboronic acid.

In some embodiments, the diacyl chloride is present in excess. In some embodiments, the diacyl chloride is selected from terephthaloyl chloride, sebacoyl chloride, adipoyl chloride, or isophthaloyl chloride. In some embodiments, the ratio of acid chloride functional groups to combined hydroxyl groups present on the polyester block precursor and polyolefin block precursor is from about 1:9 to about 9:1, from about 1:8 to about 8:1, from about 1:7 to about 7:1, from about 1:6 to about 6:1, from about 1:5 to about 5:1, from about 1:4 to about 4:1, from about 1:3 to about 3:1, from about 1:2 to about 2:1, or about 1:1.

In some embodiments, the reaction can be performed at between about 50° C. and 300° C.

In some embodiments, alternatingly arranged MBCPs can be formed by converting a hydroxy terminated block precursor into an acid chloride terminated block precursor, using excess acid chloride. After removing any remaining unreacted acid chloride, an acid chloride terminated block precursor is reacted with a hydroxyl terminated block precursor to produce an alternating MBCP. In some embodiments, the acid chloride is a diacyl chloride. In some embodiments, the hydroxy terminated block precursor is dihydroxy terminated. In some embodiments, the acid chloride terminated block precursor is a diacid chloride terminated block precursor.

In some embodiments, a polyester block precursor can be converted to an acid chloride terminated polyester block precursor and then reacted with a hydroxy terminated polyolefin block precursor to form a MBCP.

In one exemplary embodiment, an alternatingly arranged MBCP can be formed according to Scheme 3.

Scheme 3
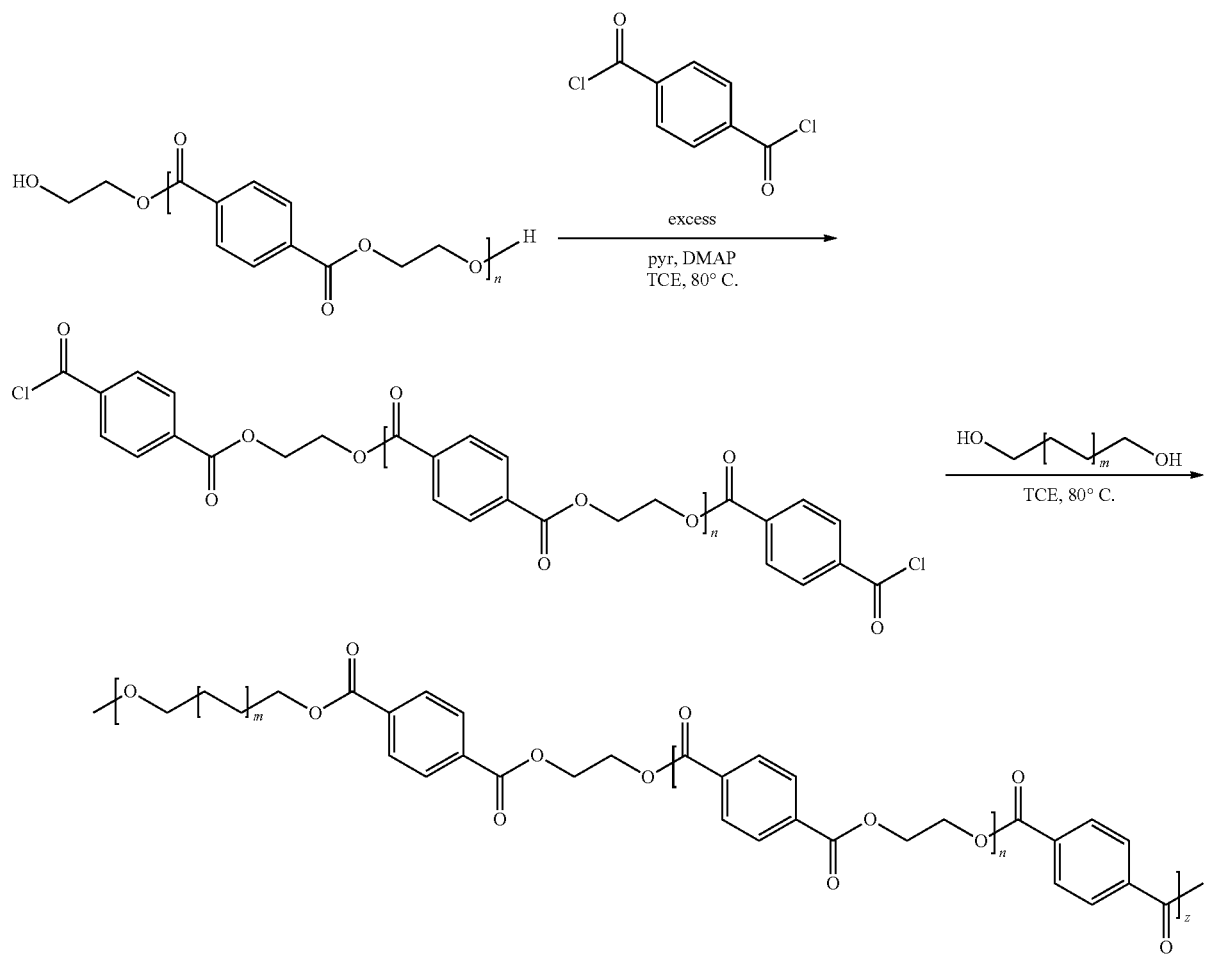
In some embodiments, a polyolefin block precursor can be converted to an acid chloride terminated polyolefin block precursor and then reacted with a hydroxy terminated polyester block precursor to form a MBCP.
In one exemplary embodiment, an alternatingly arranged MBCP can be formed according to Scheme 4.
Scheme 4
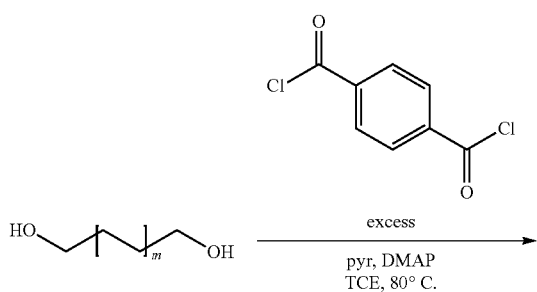

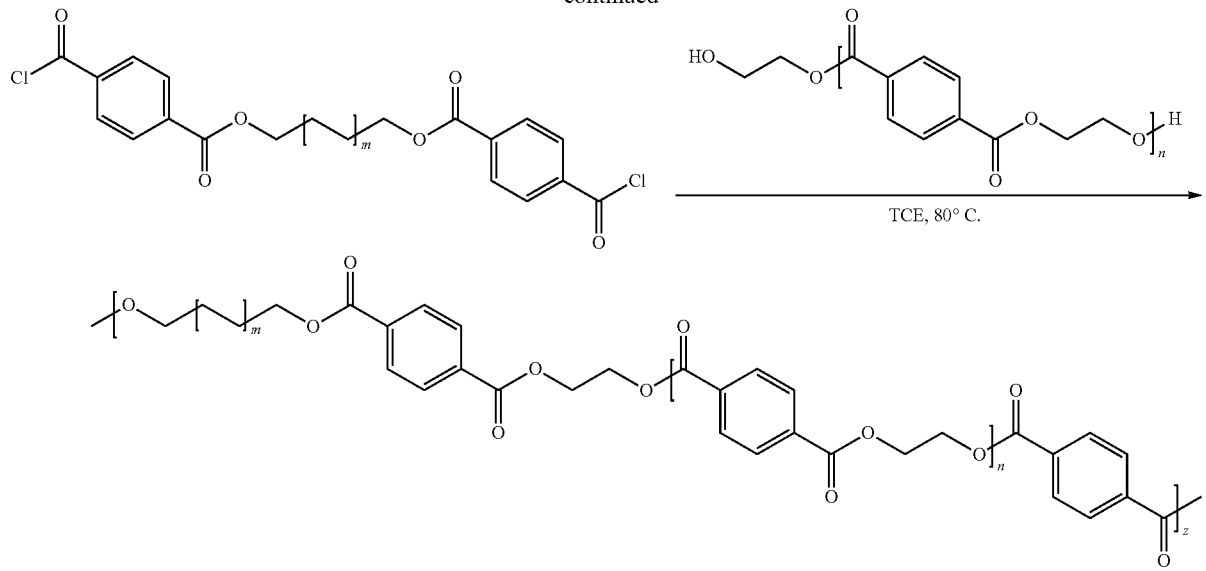

Suitable starting materials and intermediates are readily available from various commercial sources.

Products and Methods Using the Multiblock Copolymers of the Present Document

Multilayer Films and Methods

In some embodiments, this document provides multilayer films comprising the MBCPs provided herein. For example, a multilayer film comprising a MBCP as described herein can comprise at least one layer comprising the multiblock copolymer disposed between a first polymer layer and a second polymer layer. In some embodiments the film can be a tri-layer film having a first polymer layer; a second polymer layer; and a layer of the MBCP disposed between the first polymer layer and the second polymer layer. In some embodiments, the layer comprising the MBCP consists essentially of the multiblock copolymer.

In some embodiments, the first polymer layer is a polyester containing one or more terephthalate units. In some embodiments, the polyester of the first polymer layer contains a chemical repeat unit that is chemically the same as a chemical repeat unit in the polyester from which the block obtained from a polyester in the MBCP is obtained. For example, in some embodiments, the first polymer can have a butylene terephthalate repeat unit when the block obtained from a polyester in the MBCP is obtained from a polybutylene terephthalate.

In some embodiments, the polyester of the first polymer is any polyester containing a terephthalate unit. In some embodiments, the polyester of the first polymer is any polyester as described herein. In some embodiments, the polyester of the first polymer is selected from polyethylene terephthalate (PET), polyethylene terephthalate glycol (PETG), polybutylene terephthalate (PBT), polycyclohexane terephthalate glycol (PCTG), polycyclohexane terephthalate (PCT), polytrimethylene terephthalate (PTT), polydianol terephthalate (PDT), and combinations thereof. In some embodiments, the polyester is polyethylene terephthalate (PET).

In some embodiments, the second polymer layer is a polyolefin. In some embodiments, the polyolefin of the second polymer layer contains a chemical repeat unit that is chemically the same as a chemical repeat unit in the polyolefin from which the block obtained from a polyolefin in the MBCP is obtained. For example, in some embodiments, the second polymer can have a polypropylene repeat unit when the block obtained from a polyolefin in the MBCP is obtained from a polypropylene.

In some embodiments, the polyolefin of the second polymer layer is any polyolefin. In some embodiments, the polyolefin of the second polymer layer is any polyolefin as described herein. In some embodiments, the polyolefin is selected from wherein the polyolefin is selected from polyethylenes, polypropylenes, polystyrenes, alkyl polystyrenes, polybutylenes, polybutadienes, polyacrylates, polymethacrylates, polyisoprenes, polyisobutylene, polyvinylidene dichloride, polyethylene vinyl alcohol, and combinations thereof. In some embodiments, the polyolefin is polyethylene.

In some embodiments, the layer comprising the MBCP has an average thickness of from about 10 nm to about 1 μm, about 10 nm to about 900 nm, about 10 nm to about 800 nm, about 10 nm to about 700 nm, about 10 nm to about 600 nm, about 10 nm to about 500 nm, about 10 nm to about 400 nm, about 10 nm to about 300 nm, about 10 nm to about 200 nm, about 10 nm to about 100 nm, about 10 nm to about 300 nm, about 20 nm to about 300 nm, about 30 nm to about 300 nm, about 40 nm to about 300 nm, about 50 nm to about 300 nm, about 60 nm to about 300 nm, about 70 nm to about 300 nm, about 80 nm to about 300 nm, about 90 nm to about 300 nm, about 100 nm to about 300 nm, or about 150 nm to about 250 nm. In some embodiments, the layer comprising the MBCP has an average thickness of from about 100 nm to about 250 nm.

In some embodiments, the multilayer films provided herein have advantageously high adhesive strength. Without being bound by any particular theory, it is believed the MBCP advantageously increases the adhesion between the first polymer and second polymer layers. In some embodiments, the film has an adhesive strength of greater than 0.5 N/mm, greater than 0.6 N/mm, greater than 0.7 N/mm, greater than 0.8 N/mm, greater than 0.9 N/mm, or greater than 1.0 N/mm.

The multilayer films described herein can be manufactured according to known methods. In some embodiments, a method of making a multilayer film is provided comprising laminating the multiblock copolymer to the first polymer layer, the second polymer layer, or both the first and second polymer layers. In some embodiments, a method of making a multilayer film is provided comprising premixing the multiblock copolymer with the first polymer or the second polymer; and coextruding the first and second polymer to form the multilayer film.

In some embodiments, the multilayer films provided herein are advantageously easily recyclable. Without being bound by any particular theory, it is believed the MBCP layer compatibilizes the first polymer and the second polymer during recycling. In some embodiments, a process is provided comprising melting a multilayer film provided herein to produce a melt product; and forming the melt product into a molded article.

Polymer Blends and Methods of Compatibilizing Polymer Blends

In some embodiments, MBCPs provided herein exhibit beneficial compatibilizing behavior for compatibilizing two or more immiscible polymers in a melt blend.

Polymer blends are provided herein, comprising a MBCP provided herein; and two or more immiscible polymers.

In some embodiments, the first polymer is a polyester containing one or more terephthalate units. In some embodiments, the polyester of the first polymer contains a chemical repeat unit that is chemically the same as a chemical repeat unit in the polyester from which the block obtained from a polyester in the MBCP is obtained. For example, in some embodiments, the first polymer can have a polybutylene terephthalate repeat unit when the block obtained from a polyester in the MBCP is obtained from a polybutylene terephthalate.

In some embodiments, the polyester of the first polymer is any polyester containing a terephthalate unit. In some embodiments, the polyester of the first polymer is any polyester as described herein. In some embodiments, the polyester of the first polymer is selected from polyethylene terephthalate (PET), polyethylene terephthalate glycol (PETG), polybutylene terephthalate (PBT), polycyclohexane terephthalate glycol (PCTG), polycyclohexane terephthalate (PCT), polytrimethylene terephthalate (PTT), polydianol terephthalate (PDT), and combinations thereof. In some embodiments, the polyester is polyethylene terephthalate (PET).

In some embodiments, the second polymer is a polyolefin. In some embodiments, the polyolefin of the second polymer contains a chemical repeat unit that is chemically the same as a chemical repeat unit in the polyolefin from which the block obtained from a polyolefin in the MBCP is obtained. For example, in some embodiments, the second polymer can have a polypropylene repeat unit when the block obtained from a polyolefin in the MBCP is obtained from a polypropylene.

In some embodiments, the polyolefin of the second polymer layer is any polyolefin. In some embodiments, the polyolefin of the second polymer layer is any polyolefin as described herein. In some embodiments, the polyolefin is selected from wherein the polyolefin is selected from polyethylenes, polypropylenes, polystyrenes, alkyl polystyrenes, polybutylenes, polybutadienes, polyacrylates, polymethacrylates, polyisoprenes, polyisobutylene, polyvinylidene dichloride, polyethylene vinyl alcohol, and combinations thereof. In some embodiments, the polyolefin is polyethylene.

In some embodiments, the polymer blends provided herein exhibit advantageous properties. In some embodiments, the second polymer exhibits a number average droplet size ($D_N$) within a matrix of the first polymer of less than 5 µm, less than 4 µm, less than 3 µm, less than 2 µm, or less than 1 µm. In some embodiments, the polymer blend exhibits a strain at break of greater than 50%, greater than 60%, greater than 70%, greater than 80%, greater than 90%, greater than 100%, greater than 110%, greater than 120%, greater than 130%, greater than 140%, greater than 150%, greater than 200%, greater than 250%, greater than 300%, greater than 330%, or greater than 350%.

In some embodiments, the polymer blend exhibits a stress at break of greater than 25 MPa, greater than 30 MPa, greater than 35 MPa, or greater than 40 MPa.

Also provided herein is a process for compatibilizing two or more immiscible polymers comprising: adding MBCP provided herein to a melted blend comprising a first polymer and second polymer, wherein each of the first and second polymers are immiscible with respect to the other. In some embodiments, the MBCP is added to the melted blend such that the MBCP is present in the melted blend in an amount of less than about 5 wt.-% of the melted blend, less than about 4 wt.-% of the melted blend, less than about 3 wt.-% of the melted blend, less than about 2 wt.-% of the melted blend, or less than about 1 wt.-% of the melted blend.

Molded Articles

This document further provides molded articles comprising at least one MBCP provided herein. In some embodiments, such molded article are made from recycled materials. In some embodiments, the molded articles comprise two or more immiscible polymers and at least one MBCP.

Some embodiments described herein can include, without limitation:

Embodiment 1. A multiblock copolymer comprising:
a block obtained from a polyester having an average $M_N$ of from about 2,000 to about 200,000, wherein the polyester contains one or more terephthalate units; and
a block obtained from a polyolefin having an average $M_N$ of from about 2,000 to about 200,000.

Embodiment 2. The multiblock copolymer of claim 1, wherein the multiblock copolymer has an average $M_N$ of from about 4,000 to about 600,000.

Embodiment 3. The multiblock copolymer of any one of claims 1-2, wherein the multiblock copolymer has an average of from about 2 to about 20 repeating block units.

Embodiment 4. The multiblock copolymer of any one of claims 1-3, wherein the blocks are randomly arranged.

Embodiment 5. The multiblock copolymer of any one of claims 1-3, wherein the blocks are alternatingly arranged.

Embodiment 6. The multiblock copolymer of any one of claims 1-5, wherein the multiblock copolymer consists essentially of blocks obtained from a polyester containing one or more terephthalate units and blocks obtained from a polyolefin.

Embodiment 7. The multiblock copolymer of any one of claims 1-6, wherein the multiblock copolymer has a first T. of from about 115° C. to about 135° C., and a second $T_m$ of from about 245° C. to about 275° C.

Embodiment 8. The multiblock copolymer of any one of claims 1-7, wherein the polyester is selected from polyethylene terephthalate (PET), polyethylene terephthalate glycol (PETG), polybutylene terephthalate (PBT), polycyclohexane terephthalate glycol (PCTG), polycyclohexane terephthalate (PCT), polytrimethylene terephthalate (PTT), polydianol terephthalate (PDT), and combinations thereof.

Embodiment 9. The multiblock copolymer of any one of claims 1-8, wherein the polyolefin is selected from polyethylenes, polypropylenes, polystyrenes, alkyl polystyrenes, polybutylenes, polybutadienes, polyacrylates, polymethacrylates, polyisoprenes, polyisobutylene, polyvinylidene dichloride, polyethylene vinyl alcohol, and combinations thereof.

Embodiment 10. The multiblock copolymer of any one of claims 1-9, wherein the multiblock copolymer comprises from about 10 wt.-% to about 90 wt.-% blocks obtained from the polyester.

Embodiment 11. The multiblock copolymer of any one of claims 1-9, wherein the multiblock copolymer comprises from about 40 wt.-% to about 60 wt.-% blocks obtained from the polyester.

Embodiment 12. The multiblock copolymer of any one of claims 1-11, wherein the multiblock copolymer comprises from about 10 wt.-% to about 90 wt.-% blocks obtained from the polyolefin.

Embodiment 13. The multiblock copolymer of any one of claims 1-11, wherein the multiblock copolymer comprises from about 40 wt.-% to about 60 wt.-% blocks obtained from the polyolefin.

Embodiment 14. A process for preparing a multiblock copolymer comprising reacting:
a hydroxy-terminated polyester block precursor, wherein the polyester contains one or more terephthalate units;
a hydroxy-terminated polyolefin block precursor; and
an acid chloride.

Embodiment 15. The process of claim 14, wherein the polyester is selected from polyethylene terephthalate (PET), polyethylene terephthalate glycol (PETG), polybutylene terephthalate (PBT), polycyclohexane terephthalate glycol (PCTG), polycyclohexane terephthalate (PCT), polytrimethylene terephthalate (PTT), polydianol terephthalate (PDT), and combinations thereof.

Embodiment 16. The process of any one of claims 14-15, wherein the polyolefin is selected from polyethylenes, polypropylenes, polystyrenes, alkyl polystyrenes, polybutylenes, polybutadienes, polyacrylates, polymethacrylates, polyisoprenes, polyisobutylene, polyvinylidene dichloride, polyethylene vinyl alcohol, and combinations thereof.

Embodiment 17. The process of any one of claims 14-16, wherein the polyester block precursor has an average $M_N$ of from about 2,000 to about 200,000.

Embodiment 18. The process of any one of claims 14-17, wherein the polyolefin block precursor has an average $M_N$ of from about 2,000 to about 200,000.

Embodiment 19. The process of any one of claim 14-18, wherein the reacting is performed at between about 70° C. and 300° C.

Embodiment 20. The process of any one of claim 14-19, wherein the reacting is performed at between about 110° C. and 130° C.

Embodiment 21. The process of any one of claim 14-20, wherein the reacting is performed in the presence of lutidine, DMAP, and TCE.

Embodiment 22. The process of any one of claims 14-21, wherein the acid chloride is a diacyl chloride.

Embodiment 23. The process of claim 22, wherein the diacyl chloride is selected from terephthaloyl chloride, sebacoyl chloride, adipoyl chloride, and isophthaloyl chloride.

Embodiment 24. The process of any one of claims 14-23, wherein a ratio of acid chloride functional groups to combined hydroxyl groups present on the polyester block precursor and polyolefin block precursor is from about 1:9 to about 9:1.

Embodiment 25. A process for preparing a multiblock copolymer comprising:
performing a ring opening reaction with
a cyclic polyester block precursor;
a Lewis acid catalyst; and
a hydroxy-terminated polyolefin block precursor to form a diblock polyester-polyolefin polymer or a triblock polyester-polyolefin-polyester polymer; and
coupling the diblock polymer or the triblock polymer in the presence of a diacyl chloride, wherein the polyester contains one or more terephthalate units.

Embodiment 26. The process of claim 25, wherein the diacyl chloride is present in excess.

Embodiment 27. The process of any one of claims 25-26, wherein the diacyl chloride is selected from terephthaloyl chloride, sebacoyl chloride, adipoyl chloride, and isophthaloyl chloride.

Embodiment 28. The process of any one of claims 25-27, wherein the reaction is performed at between about 50° C. and 300° C.

Embodiment 29. A multilayer film comprising the multiblock copolymer of any one of claims 1-13.

Embodiment 30. The multilayer film of claim 29, wherein the film comprises at least one layer comprising the multiblock copolymer disposed between a first polymer layer and a second polymer layer.

Embodiment 31. The multilayer film of claim 29, wherein the film is a tri-layer film having a first polymer layer; a second polymer layer, and a layer of the multiblock copolymer disposed between the first polymer layer and the second polymer layer.

Embodiment 32. The multilayer film of any one of claims 29-31, wherein the film has an adhesive strength of greater than 0.5 N/mm.

Embodiment 33. The multilayer film of any one of claims 29-31, wherein the film has an adhesive strength of greater than 1.0 N/mm.

Embodiment 34. The multilayer film of any one of claims 29-33, wherein the layer comprising the multiblock copolymer consists essentially of the multiblock copolymer.

Embodiment 35. The multilayer film of any one of claims 29-34, wherein the layer comprising the multiblock copolymer has an average thickness of from about 10 nm to about 100 µm.

Embodiment 36. The multilayer film of any one of claims 29-34, wherein the layer comprising the multiblock copolymer has an average thickness of from about 100 nm to about 250 nm.

Embodiment 37. The multilayer film of any one of claims 29-36, wherein the first polymer layer is a polyester containing one or more terephthalate units.

Embodiment 38. The multilayer film of claim 37, wherein the polyester is selected from polyethylene terephthalate (PET), polyethylene terephthalate glycol (PETG), polybutylene terephthalate (PBT), polycyclohexane terephthalate glycol (PCTG), polycyclohexane terephthalate (PCT), polytrimethylene terephthalate (PTT), poly-xylylene terephthalate (PXT), polydianol terephthalate (PDT), and combinations thereof.

Embodiment 39. The multilayer film of any one of claims 37-38, wherein the polyester of the first polymer layer contains a chemical repeat unit that is chemically the same as the a chemical repeat unit in the polyester from which the block obtained from a polyester in the multiblock copolymer is obtained.

Embodiment 40. The multilayer film of any one of claims 29-39, wherein the second polymer layer is a polyolefin.

Embodiment 41. The multilayer film of claim 40, wherein the polyolefin is selected from wherein the polyolefin is selected from polyethylenes, polypropylenes, polystyrenes, alkyl polystyrenes, polybutylenes, polybutadienes, polyacrylates, polymethacrylates, polyisoprenes, polyisobutylene, polyvinylidene dichloride, polyethylene vinyl alcohol, and combinations thereof.

Embodiment 42. The multilayer film of any one of claims 40-41, wherein the polyolefin of the second polymer layer contains a chemical repeat unit that is chemically the same as the a chemical repeat unit in the polyolefin from which the block obtained from a polyolefin in the multiblock copolymer is obtained.

Embodiment 43. The multilayer film of any one of claims 40-42, wherein the polyolefin is polyethylene.

Embodiment 44. A method of making the multilayer film of any one of claim 29-43, comprising laminating the multiblock copolymer to the first polymer layer, the second polymer layer, or both the first and second polymer layers.

Embodiment 45. A method of making the multilayer film of any one of claim 29-43, comprising:
premixing the multiblock copolymer with the first polymer or the second polymer; and
coextruding the first and second polymer to form the multilayer film.

Embodiment 46. A polymer blend comprising:
the multiblock copolymer of any one of claims 1-13; and
two or more immiscible polymers.

Embodiment 47. The polymer blend of claim 46, wherein the two or more immiscible polymers comprise a first polymer and a second polymer, and wherein the first polymer is a polyester containing one or more terephthalate units.

Embodiment 48. The polymer blend of claim 47, wherein the polyester is selected from polyethylene terephthalate (PET), polyethylene terephthalate glycol (PETG), polybutylene terephthalate (PBT), polycyclohexane terephthalate glycol (PCTG), polycyclohexane terephthalate (PCT), polytrimethylene terephthalate (PTT), poly-xylylene terephthalate (PXT), polydianol terephthalate (PDT), and combinations thereof.

Embodiment 49. The polymer blend of any one of claims 47-48, wherein the second polymer is a polyolefin.

Embodiment 50. The polymer blend of claim 49, wherein the polyolefin is selected from polyethylenes, polypropylenes, polystyrenes, alkyl polystyrenes, polybutylenes, polybutadienes, polyacrylates, polymethacrylates, polyisoprenes, polyisobutylene, polyvinylidene dichloride, polyethylene vinyl alcohol, and combinations thereof.

Embodiment 51. The polymer blend of any one of claims 46-50, wherein the second polymer exhibits a number average droplet size ($D_N$) within a matrix of the first polymer of less than 5 μm.

Embodiment 52. The polymer blend of any one of claims 46-50, wherein the second polymer exhibits a number average droplet size ($D_N$) within a matrix of the first polymer of less than 1 μm.

Embodiment 53. The polymer blend of any one of claims 46-52, wherein the polymer blend exhibits a strain at break of greater than 50%.

Embodiment 54. The polymer blend of any one of claims 46-53, wherein the polymer blend exhibits a strain at break of greater than 100%.

Embodiment 55. The polymer blend of any one of claims 46-54, wherein the polymer blend exhibits a stress at break of greater than 25 MPa.

Embodiment 56. The polymer blend of any one of claims 46-55, wherein the polymer blend exhibits a stress at break of greater than 40 MPa.

Embodiment 57. A process for compatibilizing two or more immiscible polymers comprising:
adding the multiblock copolymer of any one of claims 1-10 to a melted blend comprising a first polymer and second polymer,
wherein each of the first and second polymers are immiscible with respect to the other.

Embodiment 58. The process of claim 57, wherein multiblock copolymer is present in an amount of less than about 5 wt.-% of the melted blend.

Embodiment 59. A process comprising:
melting the multilayer film of any one of claims 29-43 to produce a melt blend; and
forming the melt blend into a molded article.

Embodiment 60. A molded article comprising the multiblock copolymer of any one of claims 1-13.

EXAMPLES

Unless noted otherwise, all reagents were obtained from commercial suppliers. Unless noted otherwise, appropriate laboratory and analytical procedures were employed.
Materials and Methods
Materials PET pellets were provided from Toray Plastics America (North Kingstown, RI) were dried in a vacuum oven at 120° C. for more than 12 h before melt blending and hot press. The intrinsic viscosity of PET is 0.6 dl/g (in 2-chlorophenol). Linear low-density polyethylene (LLDPE) pellets (L3003.32, melt flow index=3.2/10 min at 190° C./2.16 kg) were provided from ExxonMobil (Irving, TX) and used as received. The branch content was determined to be 37 $CH_3$/1000 C by $^1H$ NMR spectroscopy.

Preparation of Hydroxy-Terminated PET Block Precursor

The following is one of the examples of PET block precursor synthesis. Ethylene glycol (6.42 g, 130.4 mmol), pyridine (23.38 g, 295.5 mmol) and catalytic N,N-dimethyl-4-aminopyridine (DMAP) were dissolved in anhydrous tetrahydrofuran (THF, 100 mL) in a two-necked, 500-mL round-bottomed flask purged with argon. The stirred solution was cooled to 0° C., and a solution of terephthaloyl chloride (20.00 g, 98.5 mmol) in anhydrous THF (200 mL) was added using an addition funnel over 45 minutes. After the addition was completed, the reaction was warmed to room temperature and stirred for 4 hours. Ethylene glycol (6.42 g, 130.4 mmol) was then added to quench the reaction, and the resulting mixture was stirred at room temperature overnight. The reaction was then poured into methanol (800 mL) with stirring. The precipitate was isolated and washed sequentially with methanol (200 mL), deionized (DI) water (2×200 mL) and acetone (2×200 mL) before being placed in a vacuum oven (60° C., <13 Pa) to dry overnight. The reaction yielded 23.85 g of a white solid. NMR number average molecular weight ($M_n$) was determined to be 4600 g/mol by end-group evaluation. $^1H$ NMR (8:1 chloroform-d: trifluoroacetic acid-d, 25° C.): δ 4.12 (m, 2H, —$CH_2$—$CH_2$—OH), 4.57 (m, 4H, —$CH_2$—$CH_2$—OH), 4.73-4.80 (m, EG units), 8.15-8.25 (m, $H^{Ar}$).

Preparation of Hydroxy-Terminated PE Block Precursor

The following is one of the examples of PE block precursor synthesis. The procedure was conducted based on previous literature [38][20]. The chain transfer agent, cis-1,4-diacetoxy-2-butene (2.07 g, 12.0 mmol) was added to THF (135 mL) in a two-neck 500 mL Schlenk flask under Argon purging. The flask was then transferred to a 35° C. oil bath, and cis-cyclooctene (30 g, 272.2 mmol) was added dropwise over 30 min. The addition of a Grubbs catalyst second generation (101.86 mg, 0.12 mmol) solution in THF (3 mL) was started after adding 1 mL cis-cyclooctene. After 6 hours, the mixture was precipitated in methanol (1.2 L) with 35% HCl (1.5 g) solution in water (13.5 g). The precipitated polymer was collected and dried under vacuum for two days. The precipitation and drying procedures were repeated once, while in the second precipitation, the dried polymer was dissolved in THF (250 mL) assisted with sonication. To convert the end groups into hydroxy groups, the entire yield was dissolved in THF (137.5 mL) at 40° C. and 25 wt % NaOMe (2.97 g, 55.0 mmol) solution in methanol was added. The solution was stirred for 20 hours and precipitated in methanol (2 L) with 35% HCl (1.5 g) solution in water (13.5 g). The isolated white power was dried under vacuum for three days (96% yield). Dihydroxy-poly(cyclooctene) (HO-PCOE-OH) (7 g, 63.5 mmol double bonds), p-toluenesulfonyl hydrazide (36.67 g, 196.9 mmol), tributylamine (52.83 mL, 222.3 mmol), butylated hydroxytoluene (35 mg, 0.16 mmol), and xylene (385 mL) were added to a 1000 mL three-neck round-bottom flask. The mixture was heated in a 140° C. oil bath under reflux for 6 hours. Precipitation was carried out in acidic methanol (4 L with 35% HCl (3 g) solution in DI water (27.0 g)) and the precipitate was washed with methanol (2×500 mL). The isolated white powder was dried under vacuum for two days, and the yield was obtained from the final weight as 96%. The extent of hydrogenation was determined >99%. $M_n$ was determined from $^1$H NMR end-group analysis as 4400 g/mol. $^1$H NMR (toluene-$d_8$, 100° C.): δ 3.40 (t, —CH$_2$—CH$_2$—OH), 1.37 (m, —CH$_2$—, backbone).

Preparation of PET-PE Multiblock Copolymer

The following is one of the examples of the multiblock copolymer synthesis. To a round-bottomed flask purged with argon was dissolved the PET block precursor (0.45 mmol) and PE block precursor (0.45 mmol) in 1,1,2,2-tetrachloroethane (TCE, 50 mL) at 135° C. Once completely dissolved, the solution was cooled to 120° C. whereupon 2,6-lutidine (2.73 mmol) and catalytic DMAP were added. A solution of terephthaloyl chloride (0.90 mmol) in TCE (5 mL) was then added dropwise via an addition funnel. After the addition was completed, the reaction was allowed to stir at 120° C. overnight. The polymer was then precipitated in methanol (200 mL), isolated, and washed sequentially with methanol (100 mL), DI water (2×100 mL) and acetone (2×100 mL) before being placed in a vacuum oven (60° C., <13 Pa) to dry overnight. The reaction yielded 3.85 g of a white solid.

Preparation of Monohydroxy-Terminated PE Block Precursor

The procedure followed previous literature [39]. The anionic polymerization of 1,3-butadiene (15 g) was carried out in cyclohexane (1 L) at 40° C. for 16 h using sec-butyllithium as an initiator. Polymerization in a nonpolar solvent (e.g., cyclohexane) favors a predominantly 1,4-microstructure (~90%). End-functionalization was achieved by the addition of excess ethylene oxide (EO) to cap the living polybutadienyl carbanions after EO capping; the stirred mixture turned from light yellow to colorless and subsequent termination with ~10 mL acidic methanol. The resulting hydroxy-terminated poly(1,4-butadiene) (PB-OH) was precipitated in methanol, re-dissolved in benzene, and freeze-dried in a vacuum oven. Hydrogenation of PB-OH was achieved using the Dow Re/Pt—SiO$_2$ hydrogenation catalyst (1:3 catalyst to PB-OH by mass) at 80° C. in cyclohexane for 16 h with 3.5 MPa of H2 to produce monohydroxy-terminated polyethylene. Complete saturation was confirmed by the absence of unsaturated carbon-carbon double bonds according to $^1$H NMR characterization.

Preparation of PET-PE Triblock Copolymer

To a 100 mL, flame-dried Schlenk flask under argon was dissolved terephthaloyl chloride (0.51 g, 2.5 mmol), 2,6-lutidine (0.81 g, 7.5 mmol) and catalytic DMAP (10 mg) in TCE (10 mL) at 120° C. To this stirred solution was added dropwise by pipette a solution of dihydroxy-terminated PET precursor (1.00 g, 0.25 mmol) in TCE (15 mL), pre-warmed to 135° C. After the addition was completed, the resulting reaction was allowed to stir at 120° C. for 2 hours.

The Schlenk flask and its contents were then placed in an argon-purged glove box, where the acid chloride-terminated PET was precipitated in diethyl ether (250 mL). The solid was filtered, washed with diethyl ether (2×200 mL), then placed under vacuum to dry overnight. The acid chloride-terminated PET precursor (1.34 g, 0.31 mmol) and mono-hydroxy-terminated PE precursor (2.49 g, 0.62 mmol) were then charged to a flame-dried 100-mL Schlenk flask in an argon-purged glove box. The flask was removed from the glove box and a solution of catalytic DMAP (10 mg) in TCE (10 mL) was added by syringe. The reaction was then stirred under argon at 120° C. for 24 hr. The polymer was precipitated into methanol (100 mL), then washed with methanol (100 mL), DI water (2×100 mL) and acetone (2×100 mL), followed by drying in a vacuum oven (60° C., <0.01 mm Hg) overnight. The reaction yielded 3.35 g of a white solid.

Polymer Characterization $^1$H NMR spectra were recorded on a JEOL-ECS 400 MHz spectrometer with a 4 seconds relaxation delay for 16,000 scans. Reported chemical shift values were referenced to residual solvent signals (chloroform-d: 7.24 ppm; TCE-$d_2$: 6.0 ppm). The number average molecular weight ($M_n$) was determined by $^1$H NMR end group evaluation (3.96 ppm for the methylene nearest the hydroxyl of the terminal ethylene glycol group; 3.67 ppm for the methylene nearest the terminal hydroxyl group). The $M_n$, weight average molecular weights ($M_w$), and molecular weight distribution (Đ=$M_w$/$M_n$) were determined by size exclusion chromatography (SEC; Agilent PL-220 equipped with RI detector) referenced to monodispersed polystyrene standards. The column set (three Agilent PL-Gel Mixed B columns and one PL-Gel Mixed B guard column) was operated with 1,2,4-trichlorobenzene (TCB) containing 0.01 wt % of 3,5-di-tert-4-hydroxytoluene at 1.0 mL/min at 135° C. for PE precursors (Table 1). Since PET precursors, and PET-PE MBCPs are not readily soluble in TCB, the samples were dissolved in TCE first to assist their dissolution and then they were injected into the TCB mobile phase. In order to compare the retention times between PET-PE MBCPs and their precursors, the PE precursor was also tested using TCE to dissolve the sample followed by injection into the TCB mobile phase (Figure S5). Differential scanning calorimetry (DSC) measurements were performed on a TA Instruments Q200 DSC or a Mettler Toledo DSC1 with heating and cooling rates of 5° C./min. Thermal transitions were determined on 5-10 mg samples in hermetically sealed aluminum pans. Thermogravimetric analyses (TGA) were conducted on a TA Instruments TGA500. Samples were heated under nitrogen at a ramp rate of 20° C./min to 270° C. and held for 10 minutes.

Preparation of Block Copolymer Thin Film and Lamination

The multiblock copolymer thin films were processed through the following procedure which is illustrated in FIG. 1. Block copolymer (25 mg) was dissolved in 1 mL of TCE at 120° C. The polymer solution, salt substrates (NaCl polished disk 25 mm×2 mm, International Crystal Laboratories, Garfield, NJ), and glass pipets were also heated at 120° C. The TCE solution was transferred onto the heated salt substrate by pipet via spin coating at 800 rpm for 1 min. The obtained thin film on the salt substrate was then soaked in water. The PET film (0.25 mm thickness) was processed by a Genesis hydraulic press (Wabash MPI, Wabash, IN) at 270° C. followed by being washed with methanol. Afterward, it was put on the top of the block copolymer film in water. Within 5 minutes, the PET film adhered to block copolymer thin film, and the entire substrate was taken out of the water carefully. The resulting substrate was dried in air for 12 hours and fully dried in a vacuum oven at 60° C. for 12 hours. The triblock copolymer films were also processed in the same manner except that 2-chlorophenol was used as a solvent. In the lamination process, 0.2 mm thick LLDPE film (made by Genesis press at 150° C.) was placed on top of the block copolymer film. The film set was placed in the 0.35 mm thick stainless steel mold between two fluoropolymer-coated fabric sheets and pressed at 270° C. for one minute followed by cooling with water circulation. The laminates were taken out from the mold and fluoropolymer-coated fabric sheets and cut into 10 mm wide strips for peel testing. The laminates without the BCP layer (control samples) were prepared as control samples in the same manner.

Peel Test

The edges of laminates were separated into PET and PE films and placed in the tensile tester Autograph AGS-X tensile tester (Shimadzu Corporation, Kyoto, Japan) with a 500 N load cell and pulled at 5 mm/min. The peel strength is presented as the peel force divided by the sample width and evaluated as a function of peel displacement.

Preparation of Polymer Blend

Pellets of PET and LLDPE were fed into a twin-screw extruder, DSM Xplore micro compounder 5 mL (MC 5, Xplore Instruments BV, The Netherlands) with and without block copolymer powder, and blended for 5 min in total at 270° C. and 100 rpm with nitrogen purge gas with a nitrogen purge gas. The materials were then extruded from a 5-mm-diameter circular die and cooled in air.

Tensile Testing

Extruded samples were pressed by a Genesis press at 270° C. for 3 minutes in a 0.3 mm thick stainless steel mold between two fluoropolymer-coated fabric sheets followed by cooling with water circulation. The films were removed from the sheets and stamped into dumbbell shape specimens (overall length=38 mm, length of narrow section=22 mm, the width of narrow section=5 mm). The mechanical properties of specimens were evaluated by an Autograph AGS-X tensile tester (Shimadzu Corporation, Kyoto, Japan) with a 500 N load cell following ASTM D1708. The samples were elongated until the break with a velocity of 10 mm/min. Young's modulus was determined from the slope of the stress-strain curve with a range between 0-1% strain.

Morphology of the Polymer Blends

The fractured surface morphology of the polymer blends was obtained by scanning electron microscopy (SEM). The extruded samples and the tensile test specimens were cryofractured in liquid nitrogen. The fractured surface of the samples was coated with 5 nm thick iridium layer to avoid charging. The coated surface was observed by S8230 field emission SEM (Hitachi High-Technologies Corporation, Tokyo, Japan) with 2 kV accelerating voltage, 10 µA emission current and 8 mm working distance. Atomic force microscopy (AFM) was also conducted by Bruker Nanoscope V. The extruded samples and the tensile test specimens were microtomed at −80° C. with a series of consecutive cuts, initially with a glass knife, then finished with a series of cuts by a Diatome diamond knife at 100 nm step length and a velocity of 3 mm/s velocity. The samples were examined in the repulsive regime by a silicon tip (HQ: NSC36/AL BS, NanoAndMore USA Corp., Watsonville, CA) with radius 8 nm, resonance frequency 130 kHz, and force constant 2 N/m.

Example 1. Synthesis and Characterization of Block Copolymers

Figure 2:
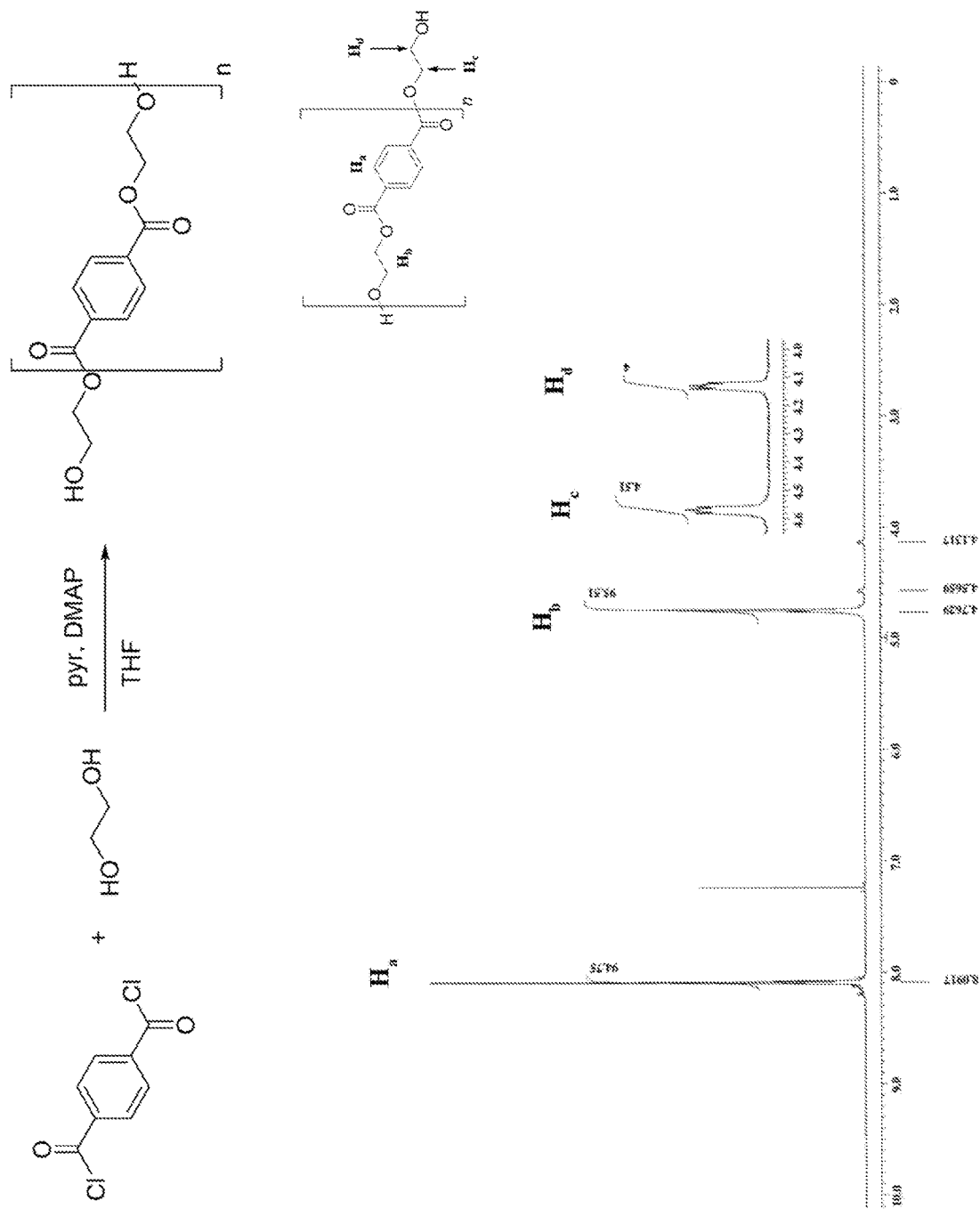
FIG. 2 is an exemplary synthetic scheme and a $^1$H NMR spectrum of PET block precursor for MBCP according to Example 1.
Figure 3:
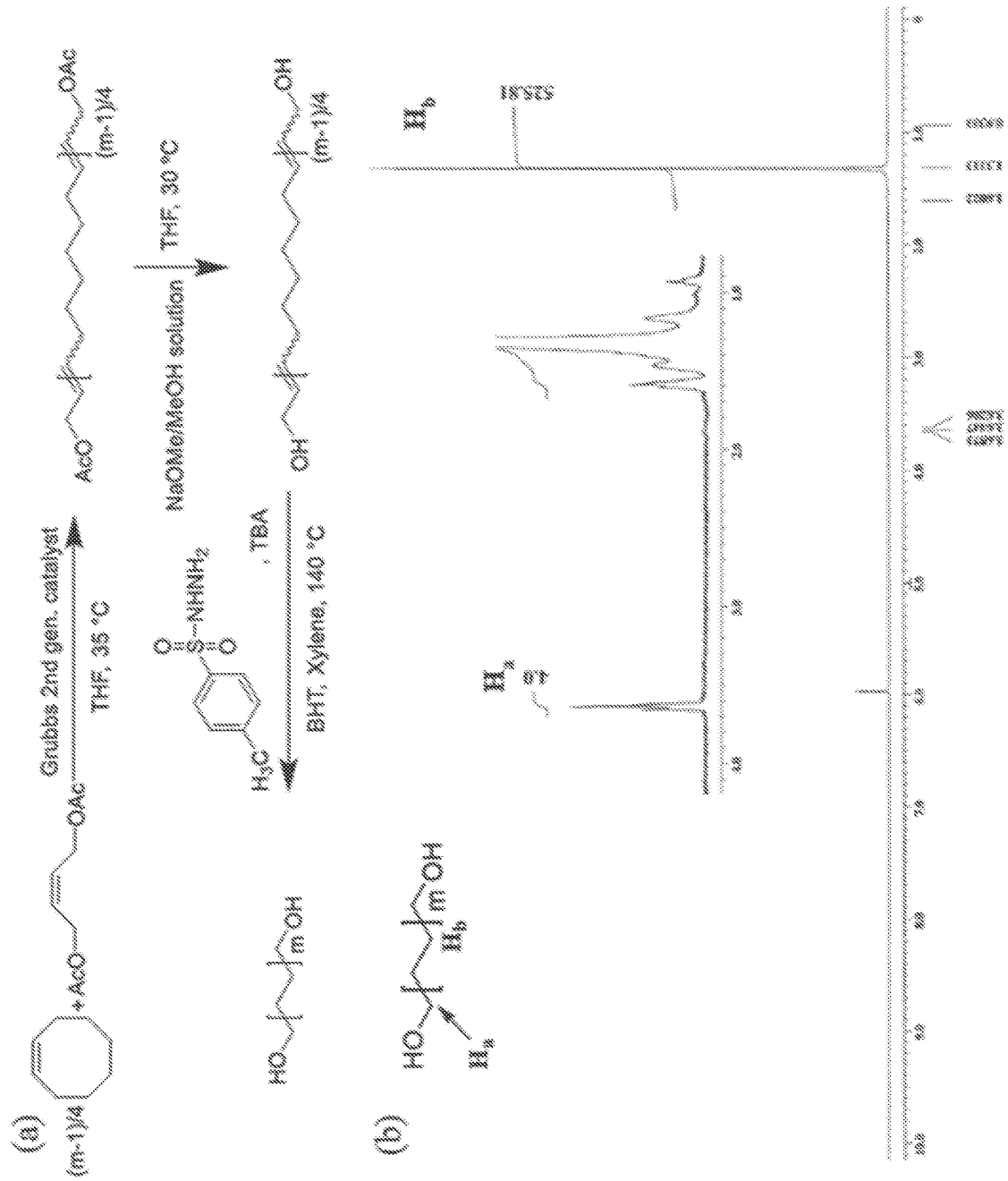
FIG. 3 is an exemplary synthetic scheme and a $^1$H NMR spectrum of PE block precursor for MBCP according to Example 1.

PET-PE multiblock copolymers (MBCPs) were synthesized via a coupling reaction between hydroxy-terminated PET and PE block precursors with terephthaloyl chloride. Acid chlorides have recently been employed by Bates and coworkers in the preparation of poly(lactide-b-butadiene) and poly(lactide-b-(ethylene-co-ethylene)) MBCPs [40], [41]. Targeted PET block precursors ($M_n \approx 4$ k, 7 k) were obtained via step-growth solution polymerization of ethylene glycol and terephthaloyl chloride in THF (FIG. 2). Hydroxy-terminated PE block precursors ($M_n \approx 4$ k, 7 k) were obtained via ring opening metathesis polymerization as described elsewhere [38][20](FIG. 3). Characterization data of the PE and PET block precursors are summarized in Table 1. MBCP-4k and MBCP-7k were then synthesized from PET-4k/PE-4k and PET-7k/PE7k, respectively, with terephthaloyl chloride (1:1 hydroxy:acid chloride functional group ratio) in TCE at 120° C. (Scheme 2, reproduced below).

Scheme 2

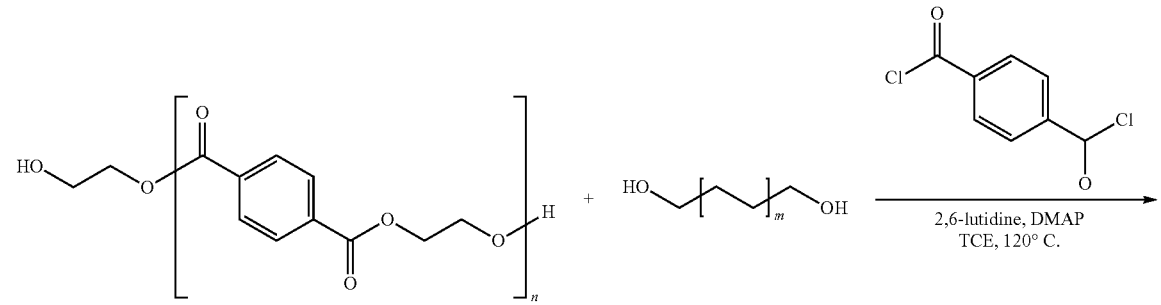

-continued

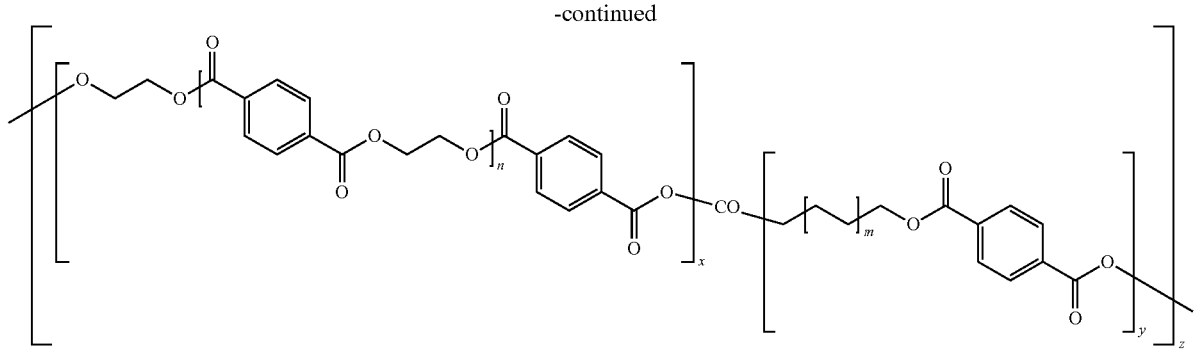

Figure 4:
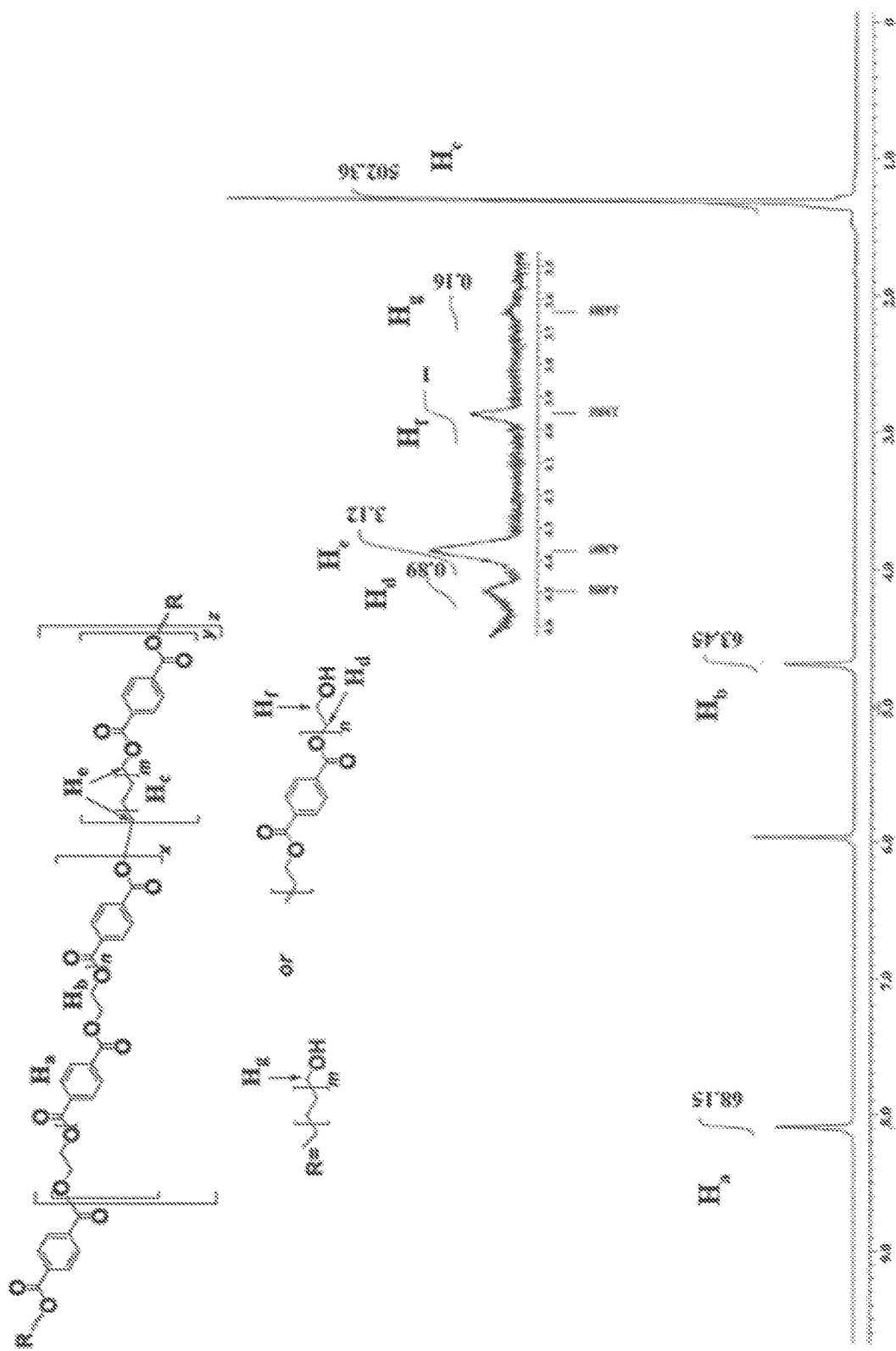
FIG. 4 is a $^1$H NMR spectrum for MBCP-4k in TCE-$d_2$ at 120° C. according to Example 1.
Figure 5A:
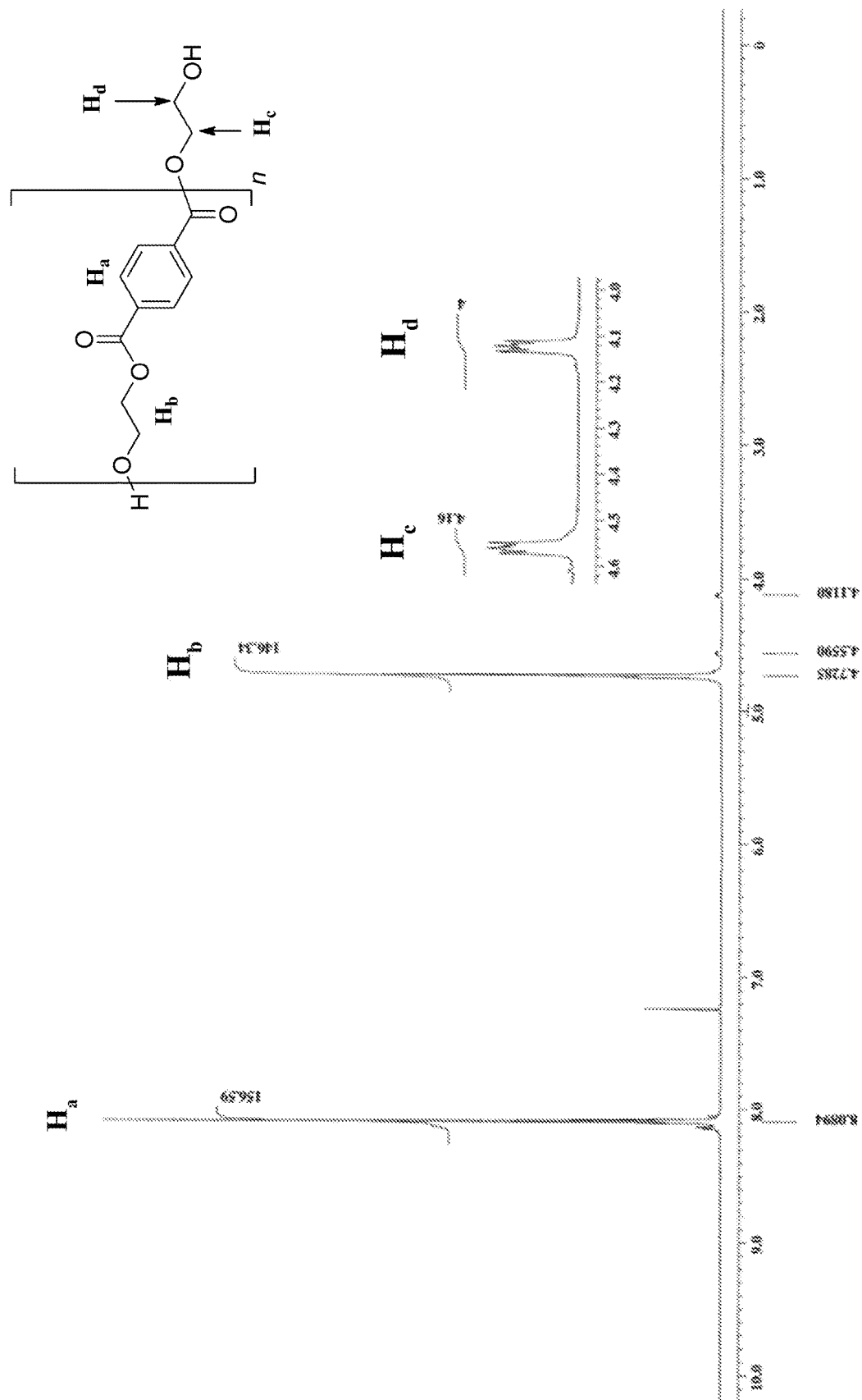
FIG. 5A is a $^1$H NMR spectrum of PET-7k according to Example 1.
Figure 5B:
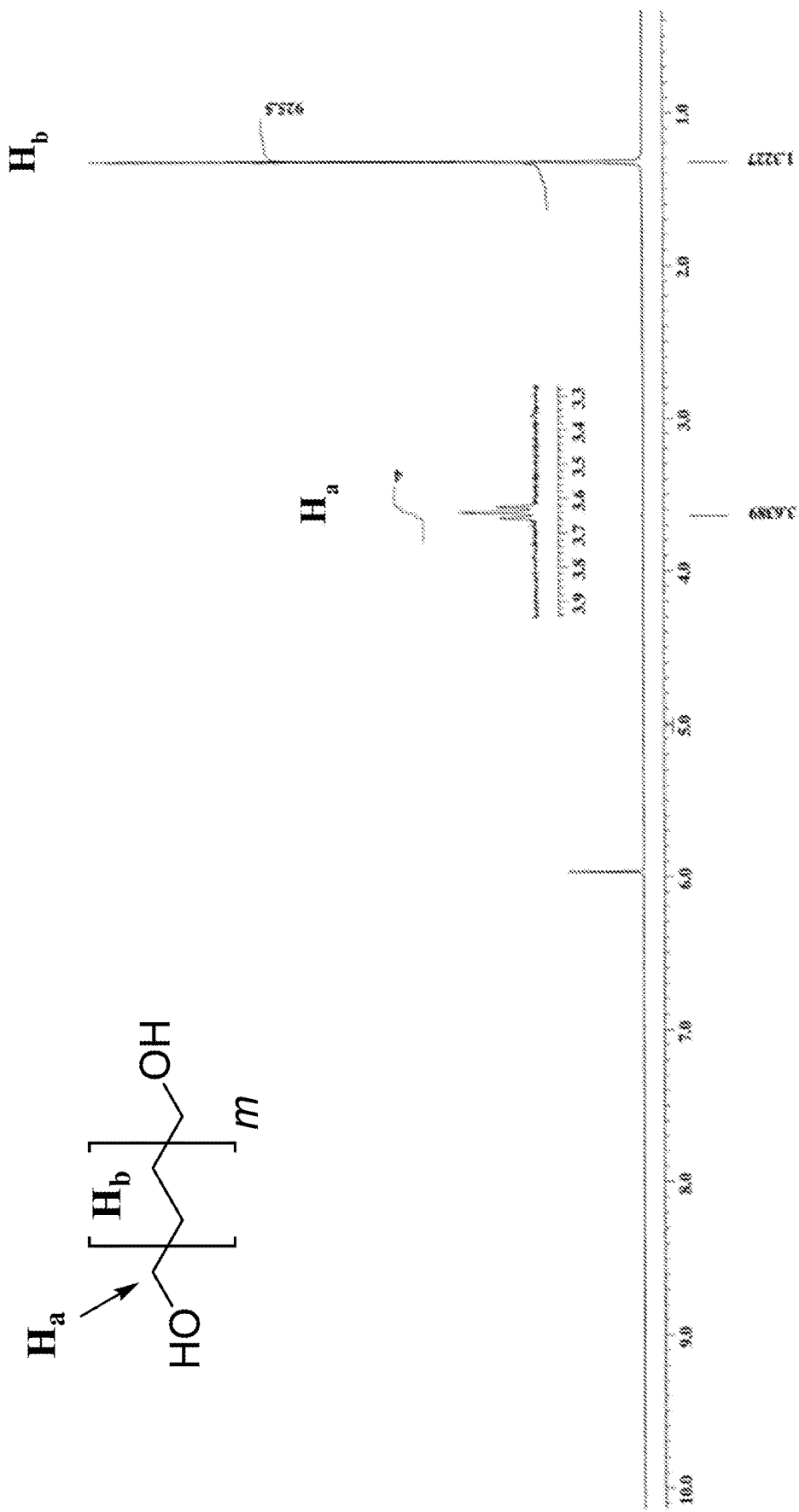
FIG. 5B is a $^1$H NMR spectrum of PE-7k according to Example 1.
Figure 5C:
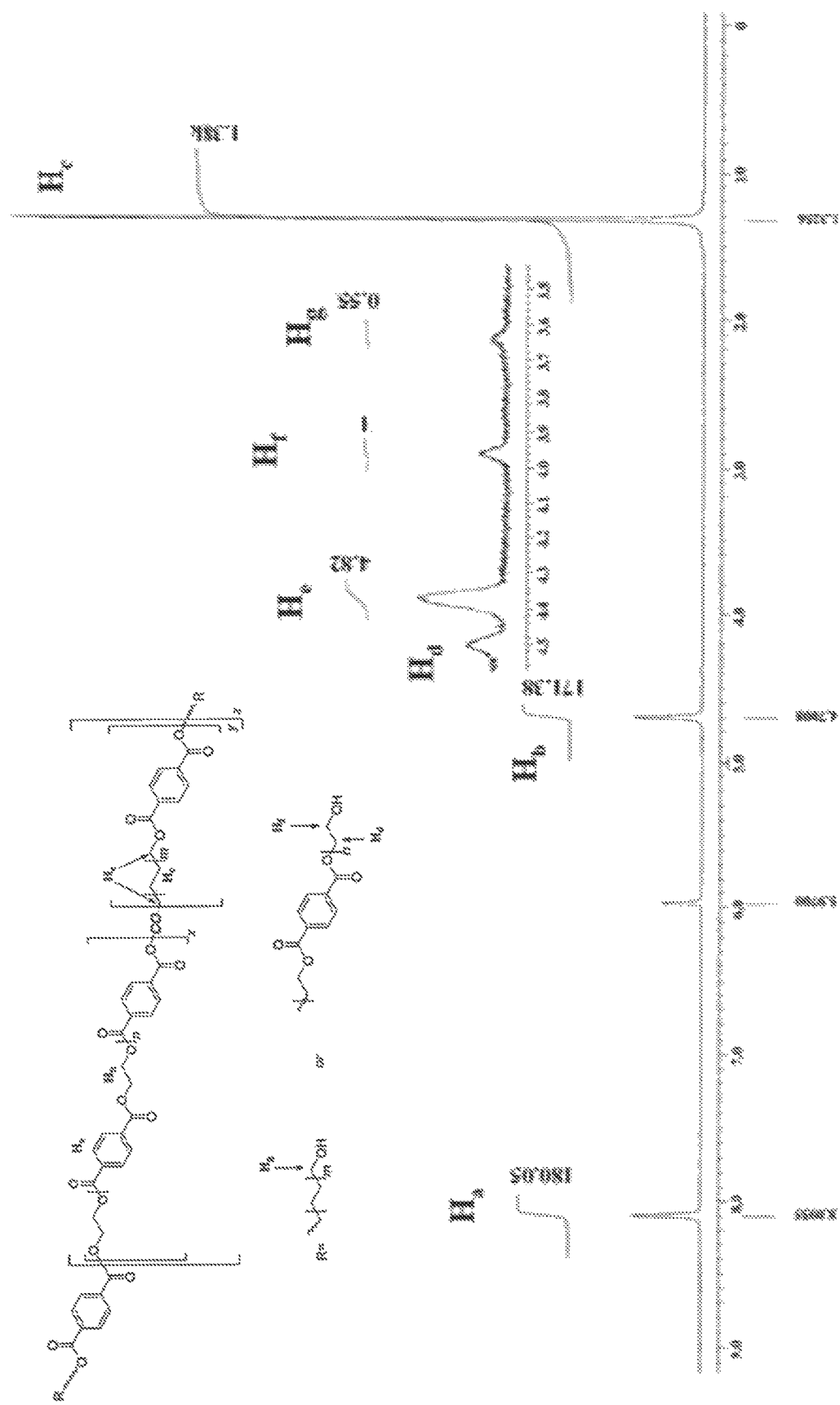
FIG. 5C is a $^1$H NMR spectrum of PET/PE MBCP-7k according to Example 1.
Figure 6:
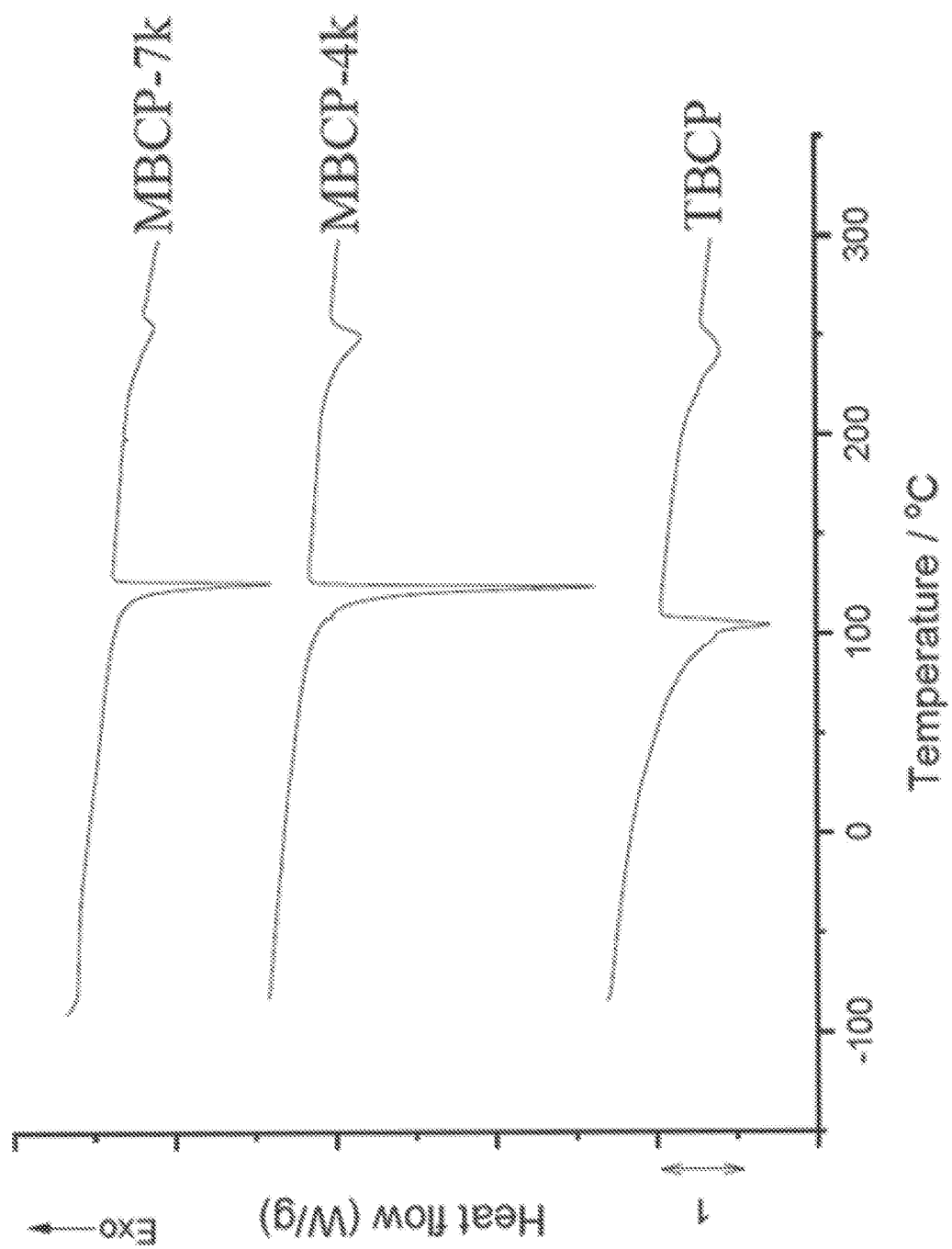
FIG. 6 is a DSC thermogram of PET-PE multiblock copolymers and triblock copolymer according to Example 1.
Figure 7A:
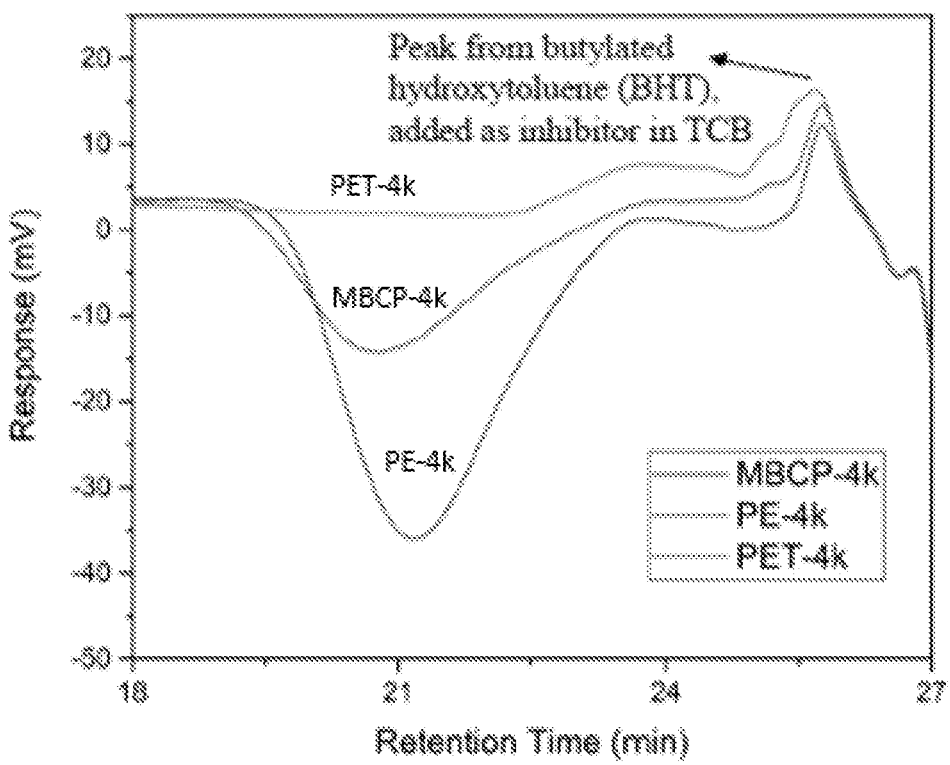
FIGS. 7A and 7B are high-temperature SEC analyses using refractive index detection of MBCPs according to Example 1.
Figure 7B:
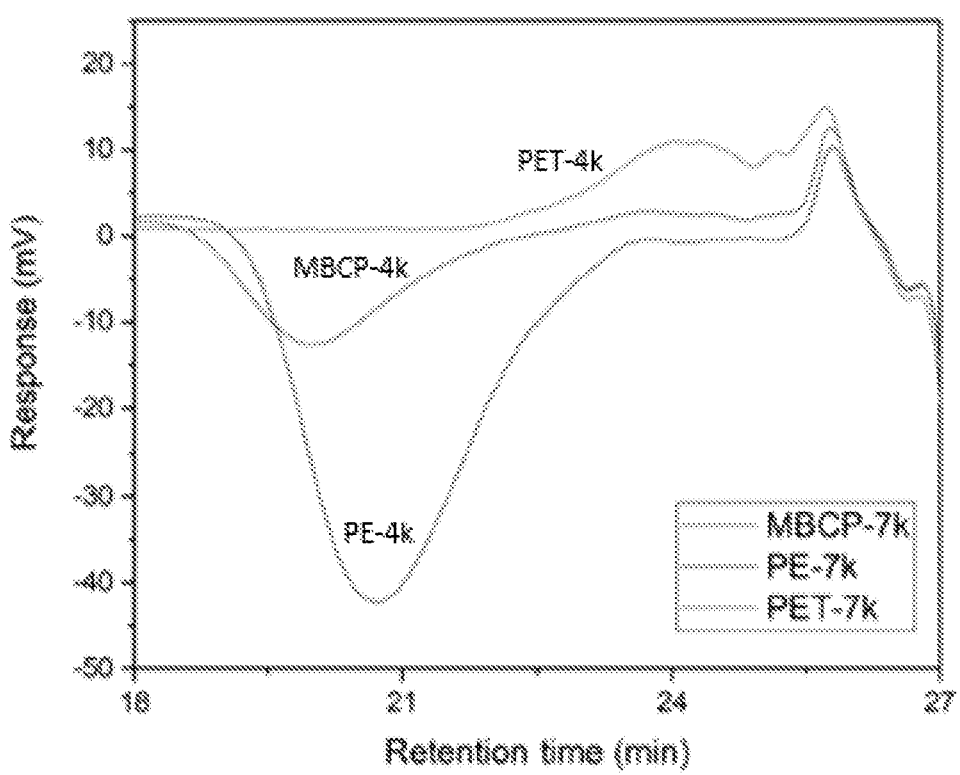

Once isolated, the molecular weights of the MBCPs were evaluated by $^1$H NMR spectroscopy via end-group analysis, the results of which are summarized in Table 2. Generally, the coupling reaction occurs randomly, therefore the sequence of the blocks are not essentially alternating, however, from the calculated $M_n$ values (FIG. 4), it was determined that MBCP-4k contained 10 repeating units, while MBCP-7k was found to have 13 units on average (FIG. 5A-5C). Assessment of the thermal properties of the MBCPs by DSC (Table 2) indicated two melting transitions ($T_m$), one each for crystalline PET and PE (FIG. 6). Additionally, in order to compare the retention times between PET-PE MBCPs and their precursors, the PE precursor was also tested using TCE to dissolve the sample followed by injection into the TCB mobile phase (FIGS. 7A-7B). As shown in FIGS. 7A-7B, PE possessed a negative dn/dc value while that of PET was positive enabling easier separation of the chromatographic peaks.

Figure 8:
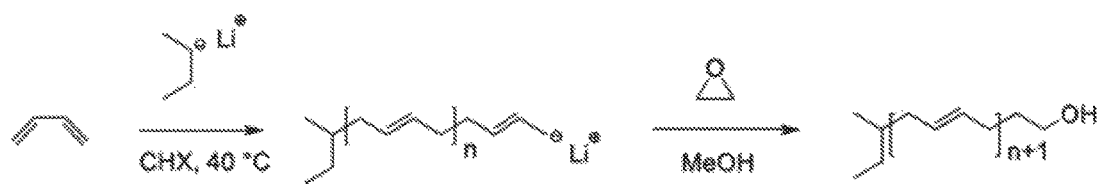
FIG. 8 is an exemplary synthetic scheme and $^1$H NMR spectrum of PE block precursor for TBCP according to Example 1.
Figure 8:
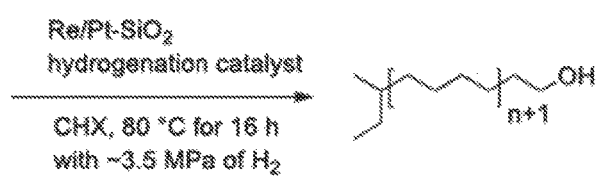
Figure 8:
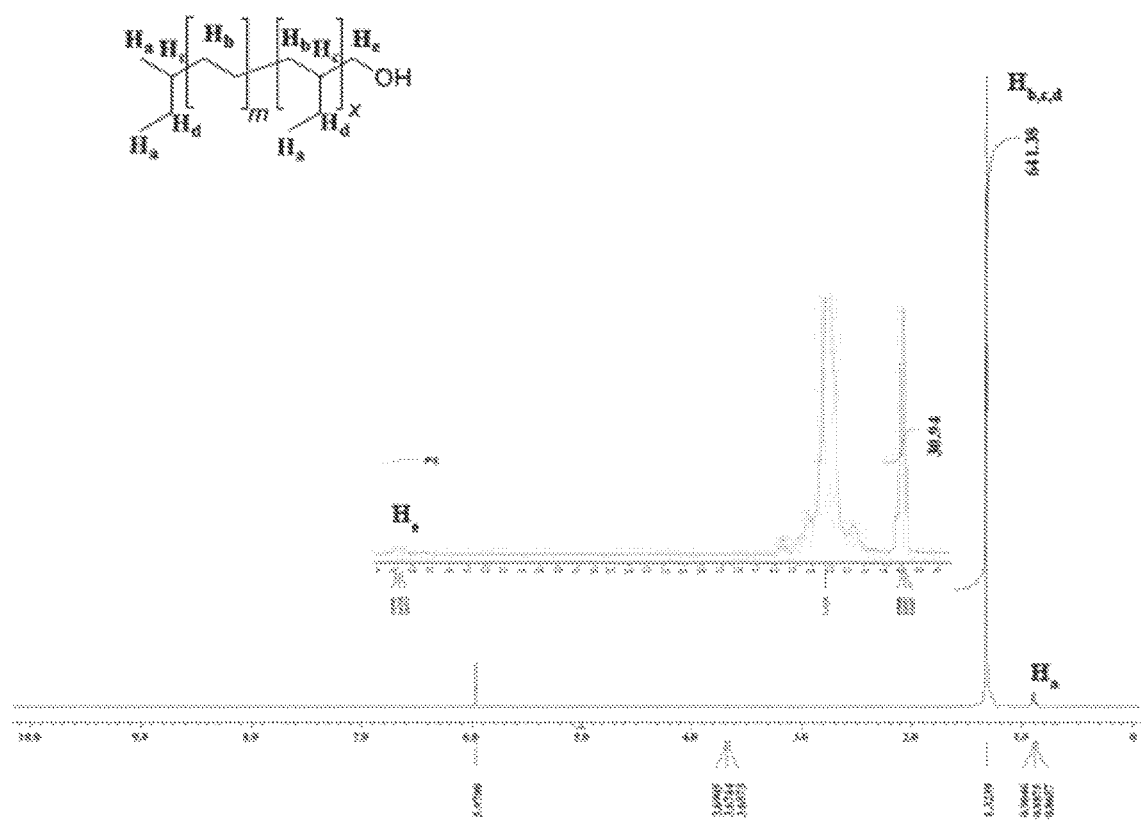
Figure 10:
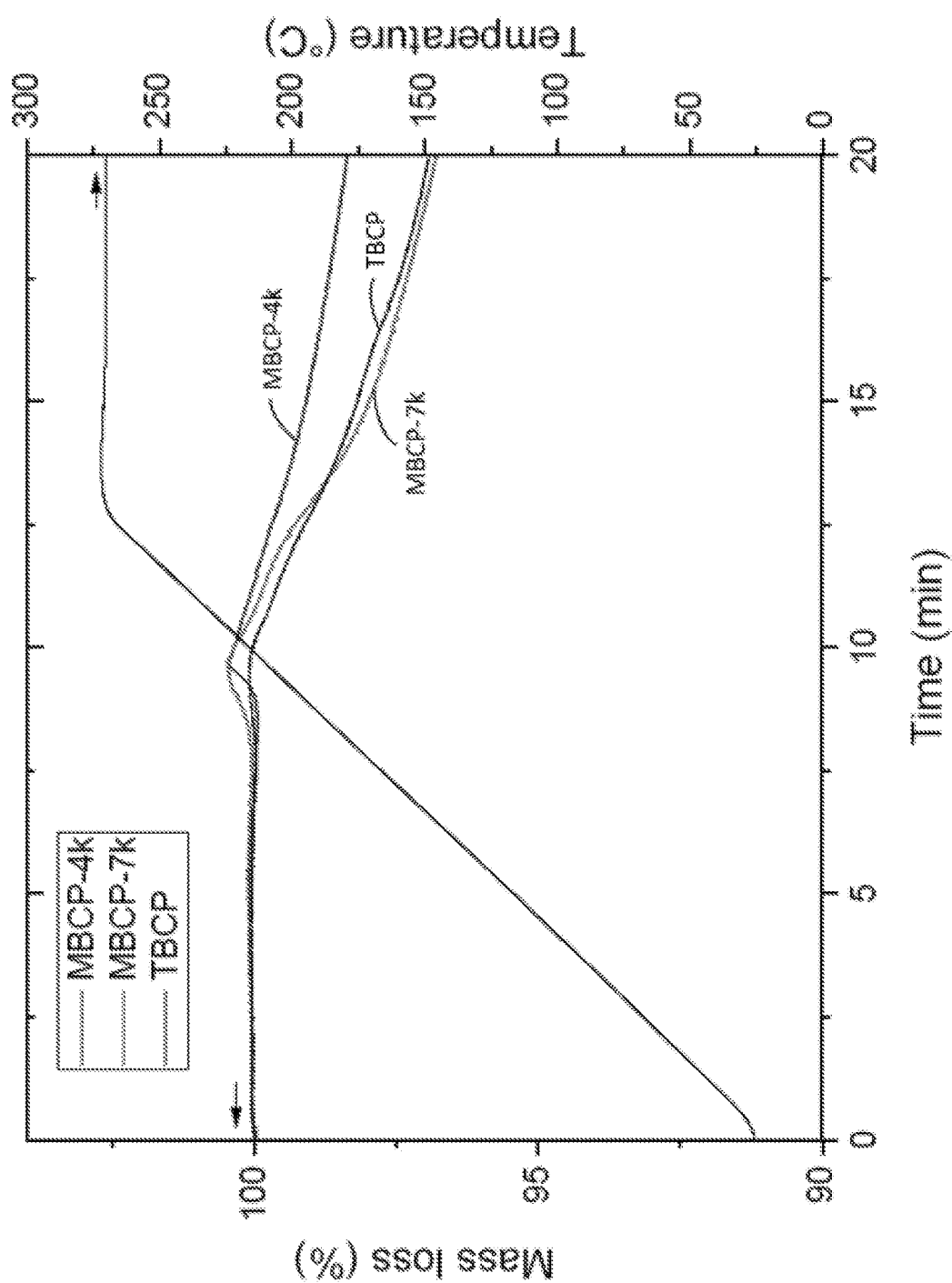
FIG. 10 is a thermal gravimetric analysis for MBCPs and TBCP in nitrogen (TA Instruments TGA500) according to Example 1. Samples were heated under nitrogen at a ramp rate of 20° C./min to 270° C., and held for 20 min.

For comparison, a PE-PET-PE triblock copolymer (TBCP) was also synthesized following the synthetic method described above. TCE, lutidine, and catalytic DMAP in TCE were dissolved into a solution, followed by coupling with dihydroxy-terminated PET block precursor ($M_n \approx 4$ k) with terephthaloyl chloride (FIG. 8, 9). The properties of the block precursors and the TBCP are provided in Table 1 and 2. The obtained block copolymers were confirmed to be stable at 270° C. which is the processing temperature described later (FIG. 10).

TABLE 1

Characterization and properties of block precursors.

| Block precursor | $M_n$ ($^1$H NMR) (g/mol) | $M_n$ (SEC) (g/mol) | Đ ($M_n/M_w$) | $T_m^d$ (° C.) |
|---|---|---|---|---|
| PET-4k | 4,600$^a$ | — | — | 251 |
| PET-7k | 7,100$^a$ | — | — | 238 |
| PE-4k | 4,400$^b$ | 4,300$^c$ | 2.72$^c$ | 129 |
| PE-7k | 6,600$^b$ | 6,400$^c$ | 2.53$^c$ | 130 |
| monoPE-4k | 4,600$^b$ | 4,100$^c$ | 1.09$^c$ | 107 |

Figure 19:
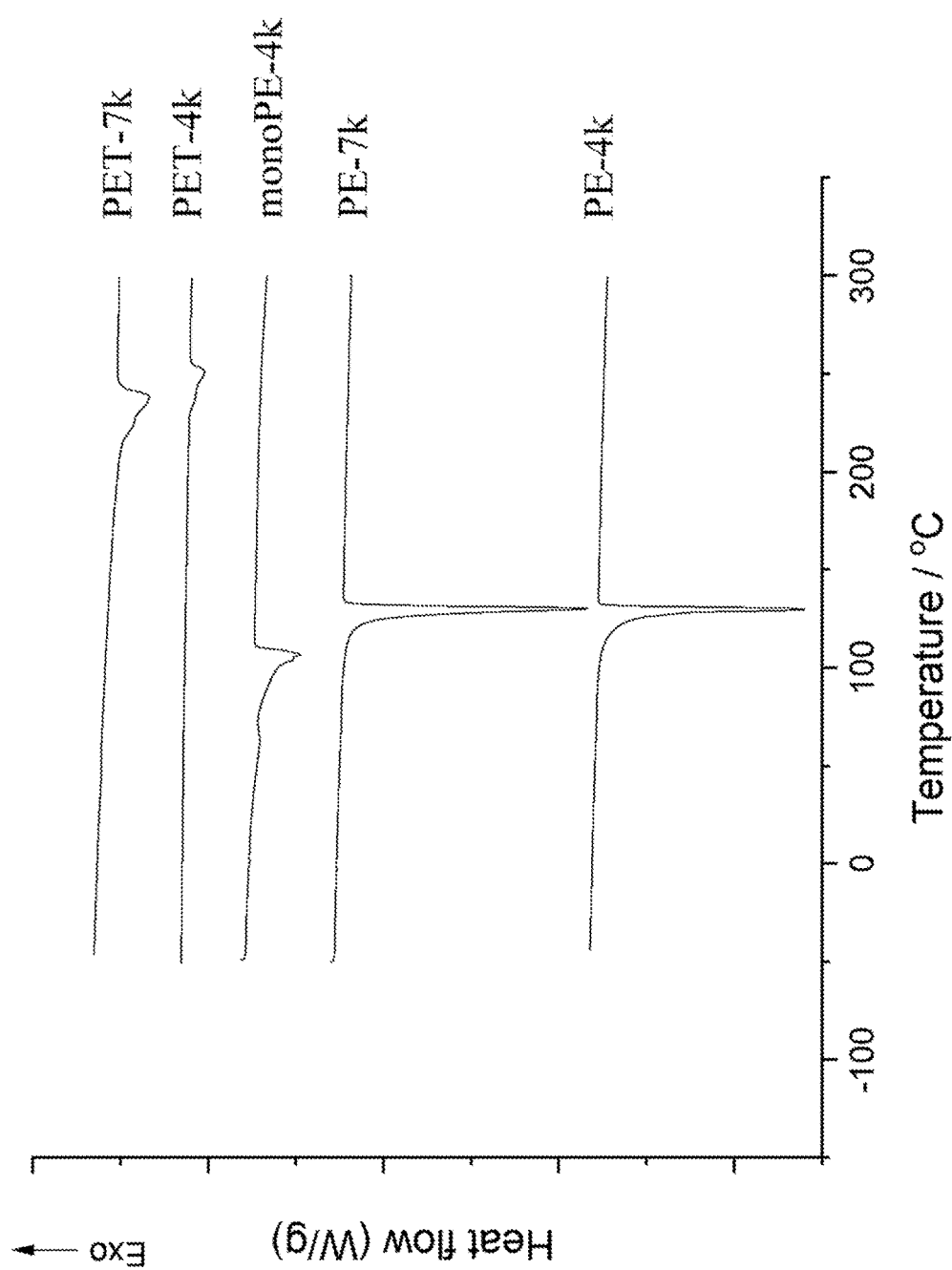
FIG. 19 is a DSC thermogram of exemplary block precursors with heating rate of 5° C./min after cooled down from 270° C. with cooling rate of 5° C./min, according to Example 1.

$^a$Determined by $^1$H-NMR spectroscopy in 8:1 chloroform-d/TFA-d at 25° C.
$^b$Determined by $^1$H-NMR spectroscopy in TCE-d$_2$ at 120° C.
$^c$Determined by SEC in 1,2,4-trichlorobenzene at 135° C. compared with polystyrene standards via universal calibration with Mark-Houwink parameters
$^d$Determined by second heating of DSC curve with heating rate of 5° C./min (FIG. 19)

TABLE 2

Characterization and properties of PET-PE block copolymers. $M_n$ ($^1$H NMR) was determined by $^1$H NMR.

| Polymer | $M_n$ ($^1$H NMR) (g/mol) | $T_m^b$ (° C.) | $f_{PET}^c$ (° C.) | $f_{PE}^c$ (° C.) |
|---|---|---|---|---|
| MBCP-4k | 45,500$^a$ | 124,250 | 0.42 | 0.58 |
| MBCP-7k | 90,200$^a$ | 127,253 | 0.41 | 0.59 |
| TBCP | 14,900$^a$ | 105,242 | 0.31 | 0.69 |

$^a$Determined by $^1$H-NMR spectroscopy in TCE-d$_2$ at 120° C.
$^b$Determined by second heating of DSC curve with heating rate of 5° C./min rate of 5° C./min.
$^c$Determined by $^1$H NMR spectroscopy according to the melt density of PET and PE (0.989 and 0.769 g/cm3, respectively [18])

Example 2. Adhesive Properties of PET-BCP-PE Multilayer Film

As mentioned previously, multilayer films comprised of only PET and PE are expected to exhibit inferior adhesion without an intermediate tie layer or surface treatment. The interfacial thickness $a_I$ between two immiscible polymers over which the repeat units are compositionally mixed can be estimated by the following equation [42]:

$$a_I = 2\sqrt{\frac{(b_1^2 + b_2^2)}{12\chi}}$$

where $\chi$ is the Flory-Huggins interaction parameter and b is the statistical segmental length. The $\chi_{PET-PE}$ parameter at 270° C. was calculated to be 0.41 with a statistical segmental length of $b_1$=7.9 Å (PET), $b_2$=8.2 Å (PE) [43]. The interfacial thickness of PET/PE was calculated as 10.4 Å which is around one-fourth of the value estimated in iPP/PE system ($a_I$~40 Å) that also exhibits poor adhesion [37] [44]. The reduction in interfacial width is consistent with the higher incompatibility of the PET/PE system. Thinner interfaces generally reduce the amount of interpenetration and mixing between two adjoining polymers, resulting in lower interfacial adhesion.

In an effort to improve adhesion in PET-PE multilayer films, the BCPs previously described were introduced as an interfacial layer, keeping in mind several important factors: the miscibility of the tie-layer with each homopolymer, molecular entanglements between layers and co-crystallization. As each PET and PE block is expected to be miscible with the PET and LLDPE films, respectively, the BCP is expected to act as a miscible interlayer. As PE block in the block copolymer has no branch just like HDPE which is miscible with LLDPE with branch content of ~40 CH3/1000 C [45], [46]. For entanglement, it is well known that there is a critical molecular weight ($M_e$) necessary to improve the adhesion and, generally, it is known that $M_e$ is 2-3 times that of the entanglement molecular weight ($M_e$). Data reported by Zhang et al. supports this notion as the insufficient molecular weight would cause chain pull-out instead of chain scission [47]. As the length of each block in the BCPs utilized in this study were longer than their respective $M_e$ values (1170 mol/g at 275° C. for PET; 828 mol/g at 140° C. for PE) [43], it is believed that the necessary molecular weight to improve interfacial adhesion through entanglement has been achieved. Finally, co-crystallization of the blocks and homopolymers at the interface must also be considered. Xu et al. showed in their study of iPP/PE adhesion that co-crystallization takes place only when the molecular weight of each block length is above ~70 kg/mol [37]. As the molecular weights of the individual blocks in our BCPs are well below this value, it is assumed that co-crystallization effects are negligible.

Figure 11B:
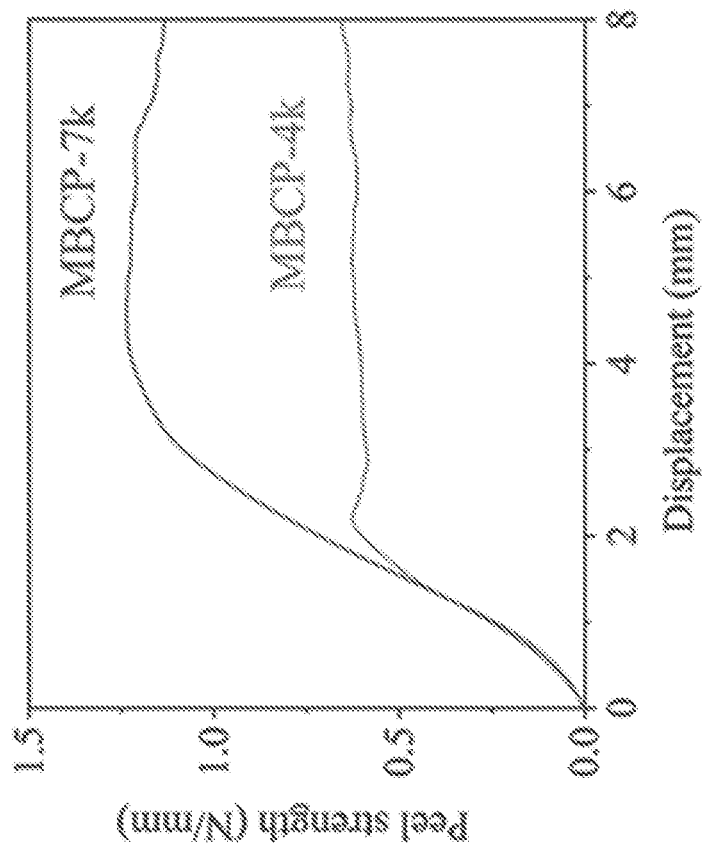
FIG. 11B is a representative curve of peel strength of exemplary PET/PE laminates without BCP, with MBCPs, according to Example 2.
Figure 11A:
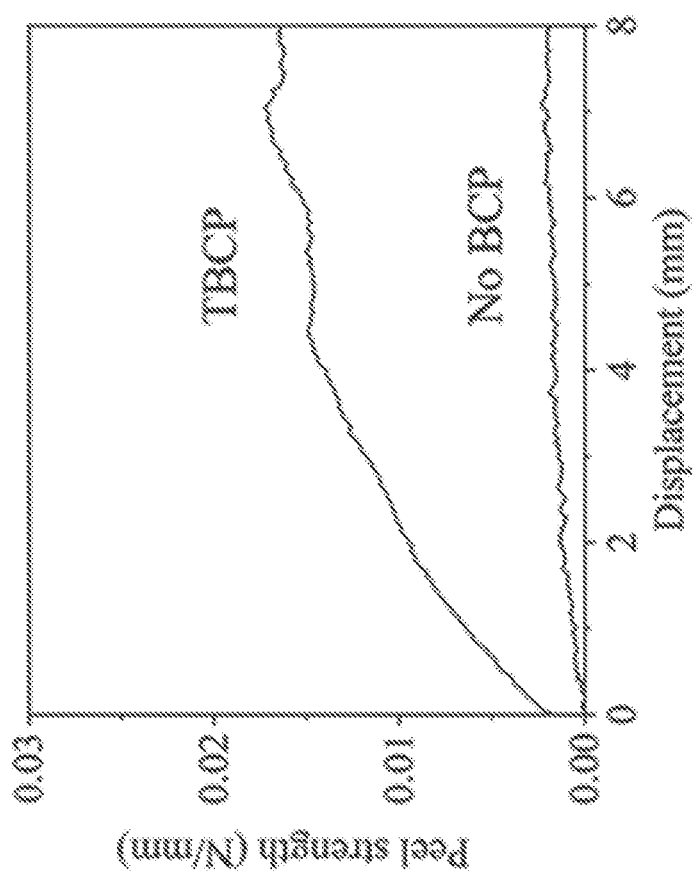
FIG. 11A is a representative curve of peel strength of exemplary PET/PE laminates with TBCP, with MBCPs, according to Example 2.

Peel testing was performed to measure the adhesive strength of a "control" PET/PE bilayer film (no BCP), the results of which indicated little to no adhesion as expected ($1.73 \times 10^{-3}$ N/mm, FIG. 11A-11B) due to the lack of any interpenetration between the layers. When a BCP tie-layer was introduced, the resulting multilayer films exhibited a moderate to the substantial increase in adhesive strength. For example, when the tri-block PET-PE-PET copolymer was utilized, the adhesive strength increased to $1.36 \times 10^{-3}$ N/mm, nearly four times higher than the control. Furthermore, the adhesive strengths of multilayer films employing MBCP-4k or MBCP-7k were 0.62 and 1.14 N/mm, respectively, an increase of several orders of magnitude over the control. As Russel et al. observed with their P(S-b-MMA) block copolymers, the interfaces of PS/PMMA systems exhibited significant broadening (~50% by neutron reflectivity) due to the penetration of a BCP tie-layer into the homopolymer phases [48]. Similarly, we believe that the PET and PE blocks in the BCPs studied here penetrate into and expand their respective homopolymer phases. The use of the MBCPs rather than the TBCP allows for more interfacial crossing due to a larger number of individual PET and PE blocks. Additionally, it is possible that the MBCPs form entangled loops that anchor within the homopolymers layers [37]. In comparing the 4 k and 7 k MBCPs, it is evident that an increase in the molecular weight of the individual blocks enhances adhesion, most likely through improvements in both interfacial crossing and entanglement.

Figure 12:
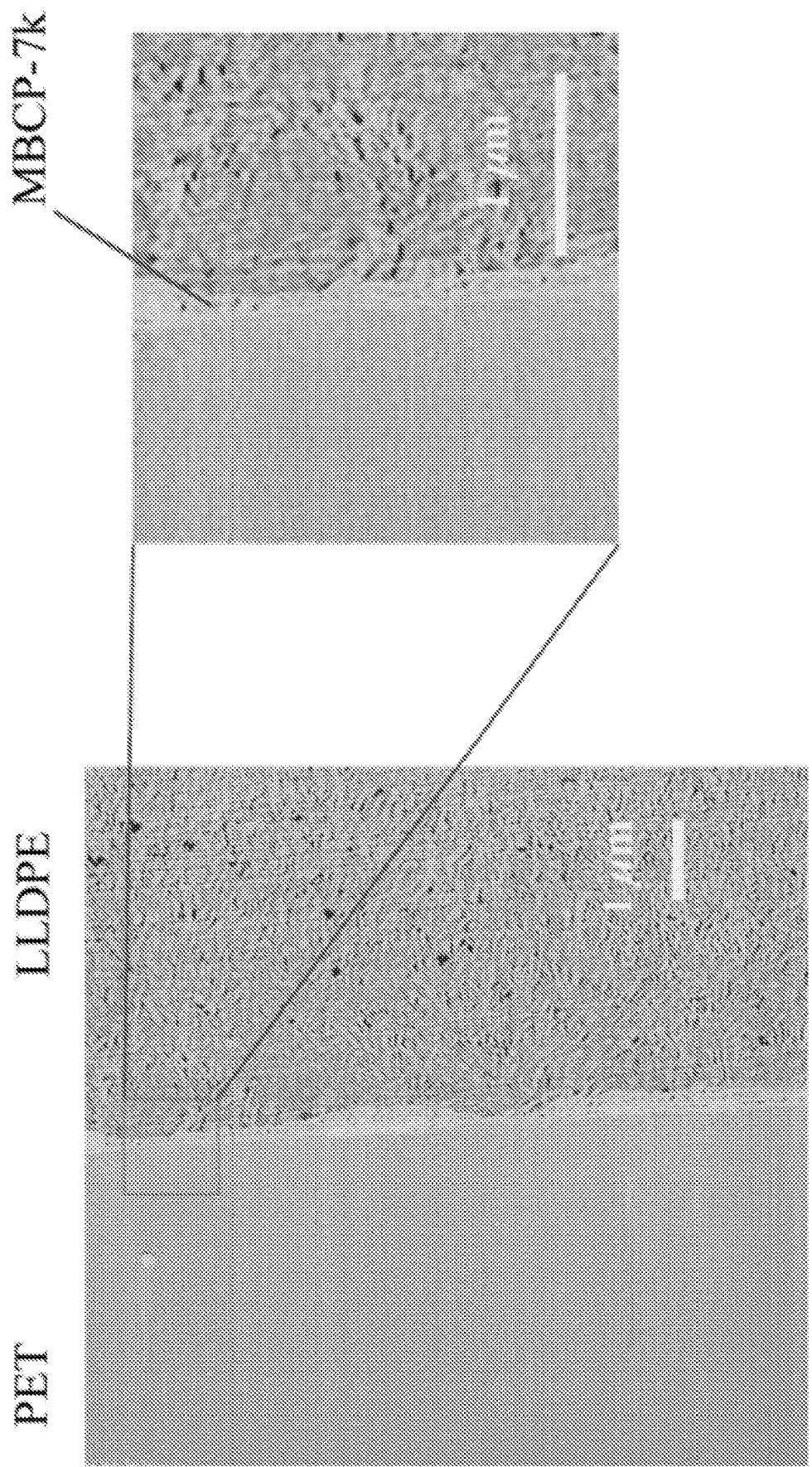
FIG. 12 are AFM phase images of a cross-section of an exemplary PET/MBCP-7k/PE interface according to Example 2.
Figure 14A:
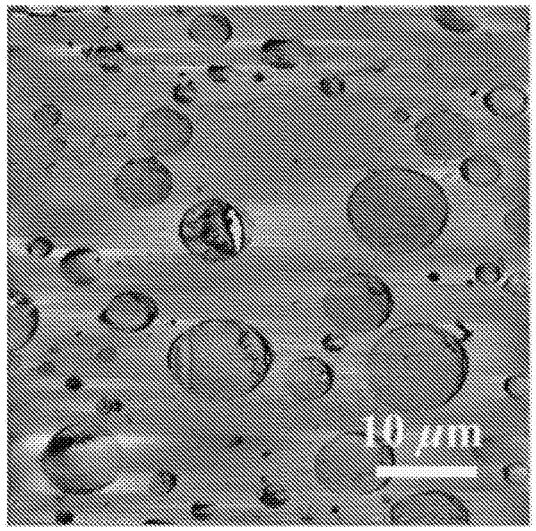
FIG. 14A is an AFM phase image of an exemplary blend of PET/PE (80/20) after annealing for 3 min at 270° C., according to Example 3.
Figure 14B:
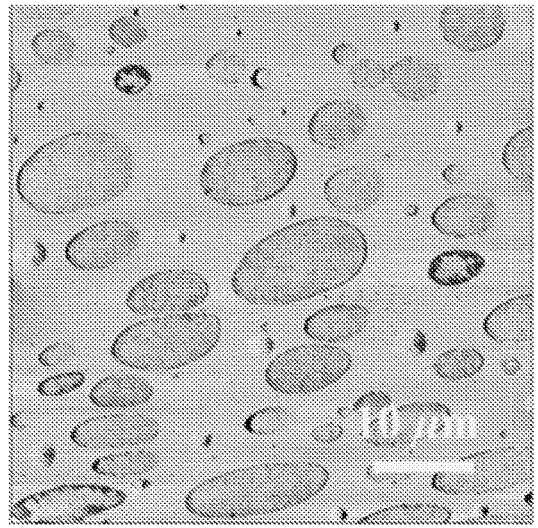
FIG. 14B is an AFM phase image of an exemplary blend of PET/PE/TBCP (80/20/2) after annealing for 3 min at 270° C., according to Example 3.
Figure 14C:
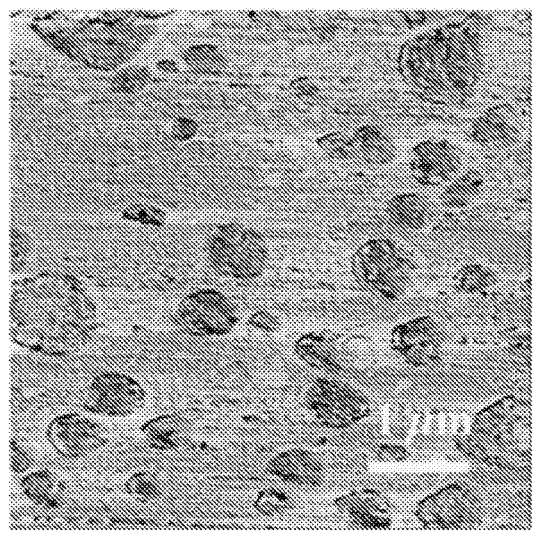
FIG. 14C is an AFM phase image of an exemplary blend of PET/PE/MBCP-4k (80/20/2) after annealing for 3 min at 270° C., according to Example 3.
Figure 14D:
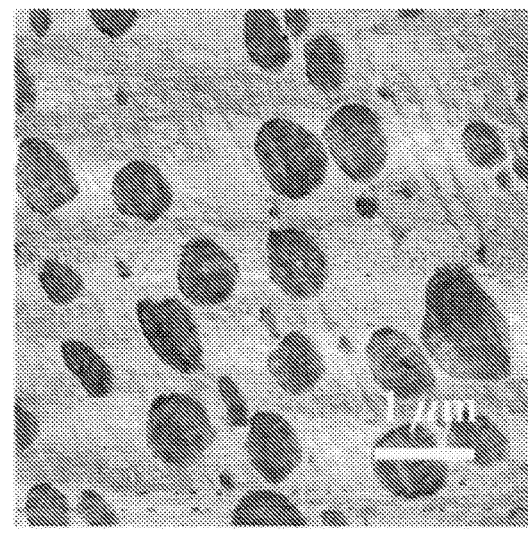
FIG. 14D is an AFM phase image of an exemplary blend of PET/PE/MBCP-7k (80/20/2) after annealing for 3 min at 270° C., according to Example 3.

Atomic force microscopy (AFM) was utilized to analyze cross-sections of the tri-layer films. Shown in FIG. 12 is an AFM image taken of a cross-section (after microtoming) where MBCP-7k was employed as the interfacial layer. The multiblock copolymer layer was indeed found between PET and PE layer and the average thickness of the MBCP layer was determined to be 220 nm.

Example 3. Polymer Blends

Figure 15:
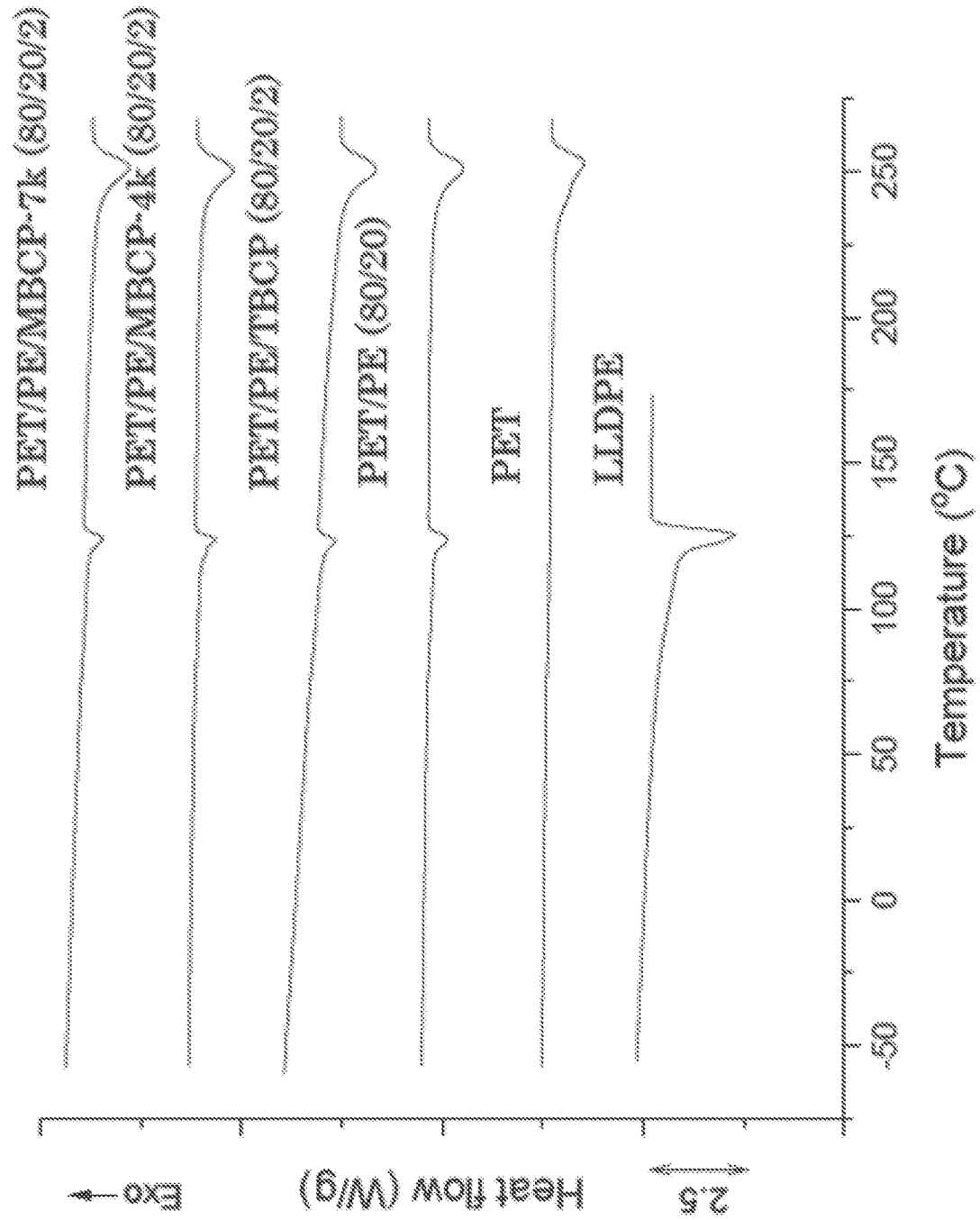
FIG. 15 is a DSC thermogram of exemplary polymer blends with heating rate of 5° C./min after cooled down from 270° C. with cooling rate of 5° C./min, according to Example 3.

In an effort to mimic the recycling of PET/PE multilayer packaging, melt polymer blends of neat PET/PE (80/20 by weight) and PET/PE/BCP (80/20/2) were processed by mixing in a twin-screw extruder and morphologies analyzed by AFM. The block copolymer didn't affect to the chemical structure of the homopolymers since the melting temperatures of the blends are the same (FIG. 15), meaning that no reactions occur between the BCPs and the homopolymers are expected to occur. In the AFM images, the PET matrix is observed as a brighter color while the PE droplets are darker in color (FIG. 13A-13D, 14A-14D). The structural size was determined as the diameter of the PE droplet in the PET matrix in this study. They were calculated by measuring the cross-sectional area of the PE droplets using the ImageJ software, following the equation $$D_i = 2\left(\frac{A_i}{\pi}\right)^{1/2},$$

where $A_i$ is of the cross-sectional area of the droplets. The AFM images showed that both the TBCP and MBCPs significantly reduced the droplet size. The number average structural size of the PE droplets ($D_n = \Sigma n_i D_i / \Sigma n_i$) in the neat polymer blend was calculated to be 3.1 μm while that in the blend with the TBCP was 2.5 μm. The MBCPs had a far more effective compatibility compared to the TBCP as their $D_n$ value was 0.41 μm or less, 10 times smaller than the neat blend, at the same 2 wt. % loading.

Figure 9:
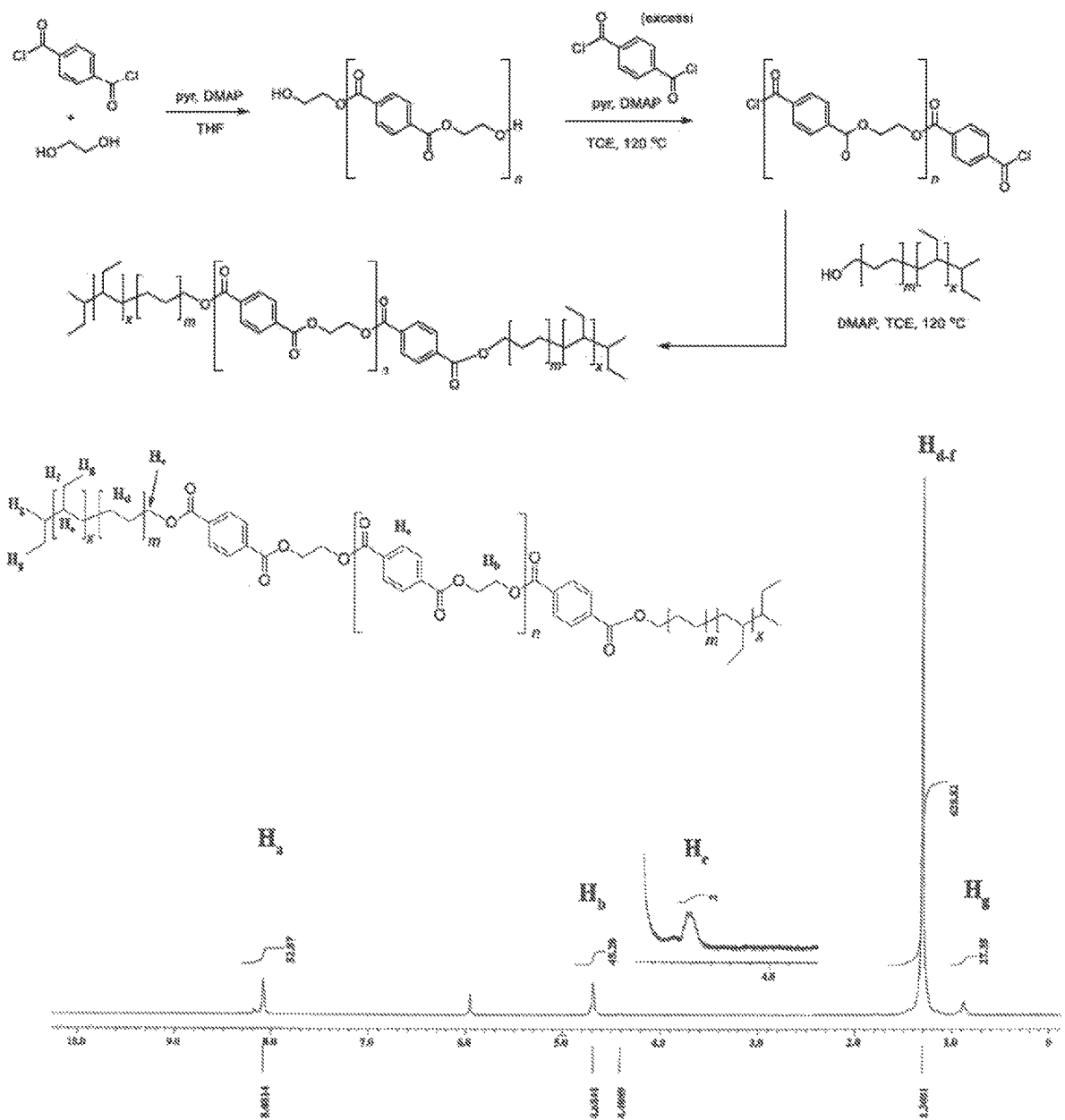
FIG. 9 is an exemplary synthetic scheme and $^1$H NMR spectrum of TBCP according to Example 1.

Blend morphology by AFM was also completed after annealing for 3 min at 270° C. in a hot press (tensile test specimen preparation), the results of which are shown in FIG. 9. The structural sizes of the droplets were found to increase in the control and TBCP-containing samples, while the morphology appears to be unchanged after annealing in the two blends containing MBCPs (particle size values are provided in Table 3). The results indicate that the MBCPs is more effective than TBCP as a sterically repelling layer at the interface between homopolymer in the melt state. Therefore, a slower coarsening rate was observed in the blend compatibilized with MBCP than that with TBCP. Such a phenomenon has been investigated by Noolandi, who suggested that MBCPs form a pancake-shape at the interface between two incompatible homopolymers in parallel orientation to the interface, which is more efficient than the dumbbell-shape conformation formed by analogous di- or triblock copolymers [36]. Simulation work by Balazs et al. further supported the idea that MBCPs are readily spread out along the interface of immiscible blends compared to diblock copolymers [49]. Therefore, it is possible that the PET-PE MBCPs expand along the interface, working more efficiently as a compatibilizer than the TBCP. Although it is hypothesized that the MBCPs are thought to be more localized at the interface compared to TBCP, further investigation into the transport equilibrium between the interface and interpenetration into either homopolymer phase (micelle formation) is necessary to support this claim.

TABLE 3

Size of the particles in the polymer blend

| Polymer | Before annealing (μms) | After annealing (μms) |
|---|---|---|
| PET/LLDPE | 3.1 | 4.1 |
| PET/LLDPE/TBCP (2 wt. %) | 2.5 | 3.2 |
| PET/LLDPE/ MBCP-4k (2 wt. %) | 0.37 | 0.42 |
| PET/LLDPE/ MBCP-7k (2 wt. %) | 0.41 | 0.42 |
| PET/LLDPE/ MBCP-4k (0.5 wt. %) | 1.4 | 1.5 |

Example 4: Mechanical Properties of the Copolymer Blends

Both PET and PE are regarded as "tough" materials, where PET is a strong material with high Young's modulus and yield strength, while PE is a softer material with lower Young's modulus but a higher elongation at break. Polymer blending is a preferred method for forming strong and ductile polymers, taking advantage of the best attributes of the individual homopolymers. However, both the structural size and the adhesion between the two phases must be considered in order to achieve the desired end-use properties. Polymer blends usually exhibit poor mechanical properties when immiscibility between the homopolymers leads to phase separation (droplet formation), poor adhesion and low tensile strength.

Figure 16A:
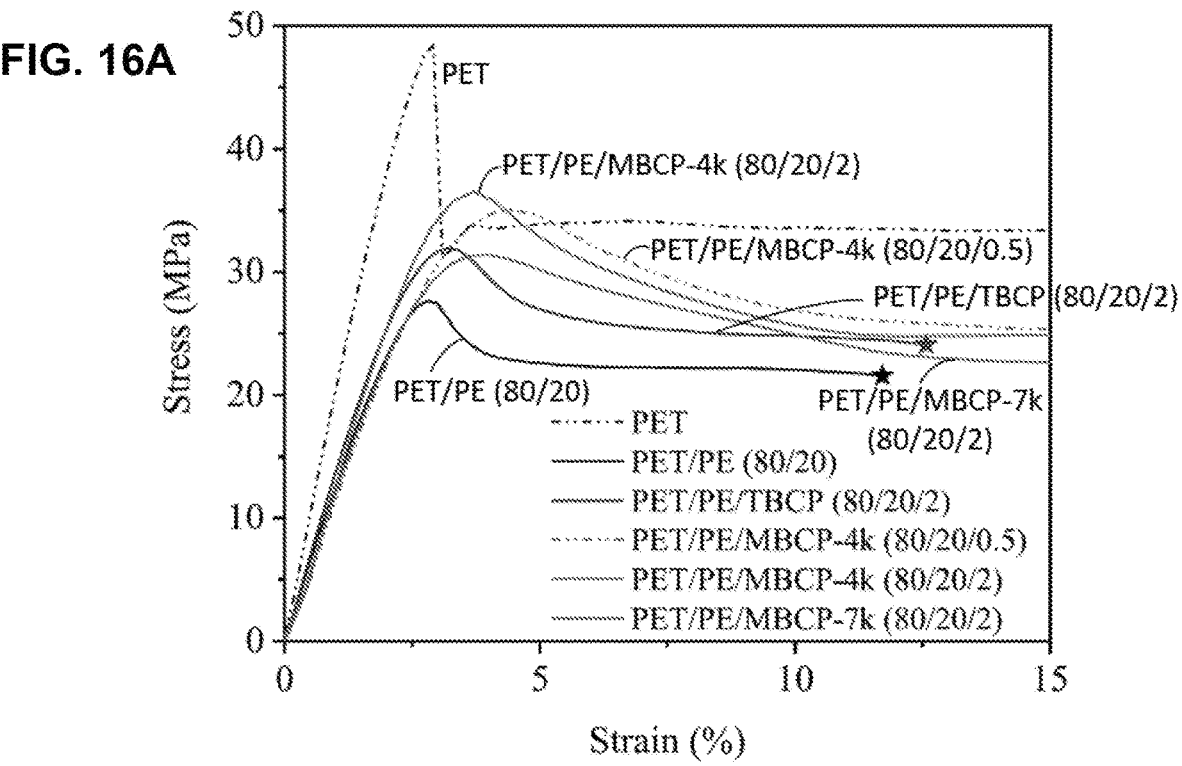
FIGS. 16A and 16B show representative stress-strain curves for uniaxial tensile elongation of exemplary PET/PE polymer blends, according to Example 4.
Figure 16B:
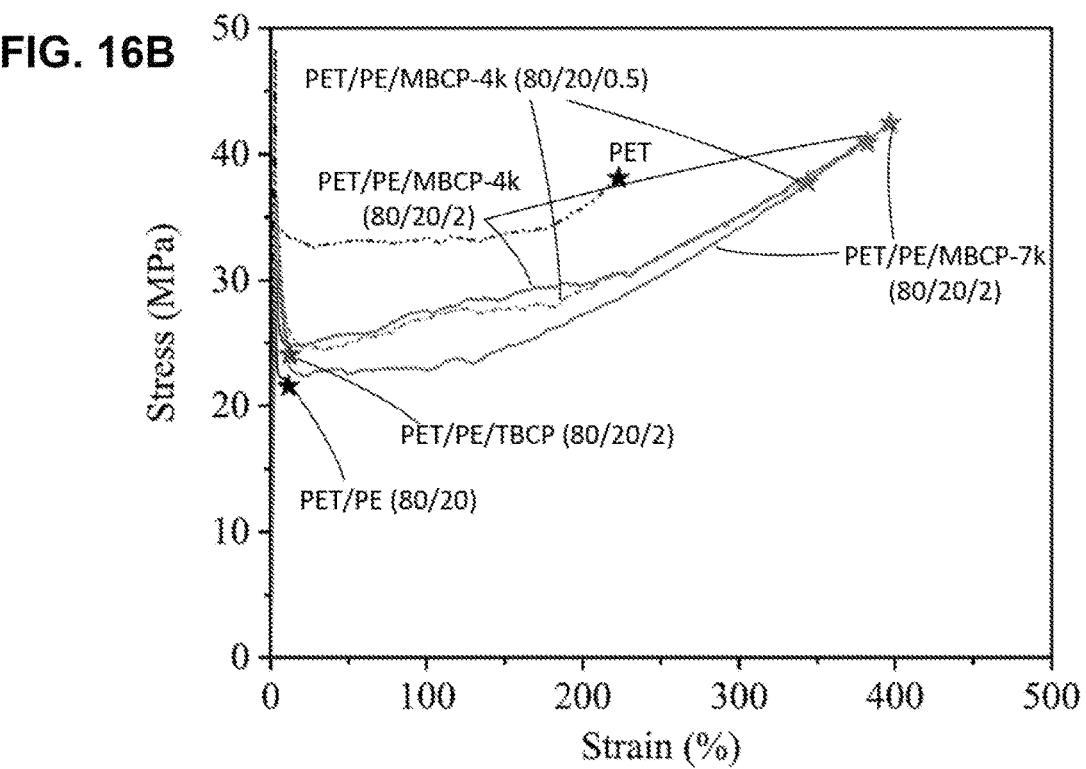
Figure 17A:
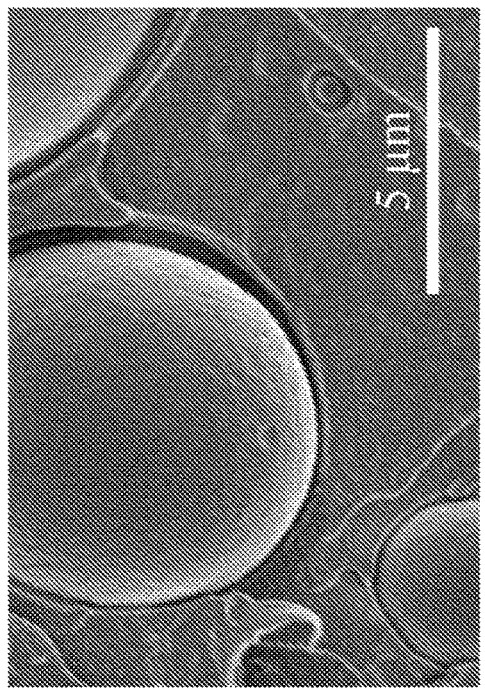
FIG. 17A is a SEM image of a tensile test of an exemplary cryo-fractured polymer blend of PET/PE (80/20), according to Example 4.
Figure 18:
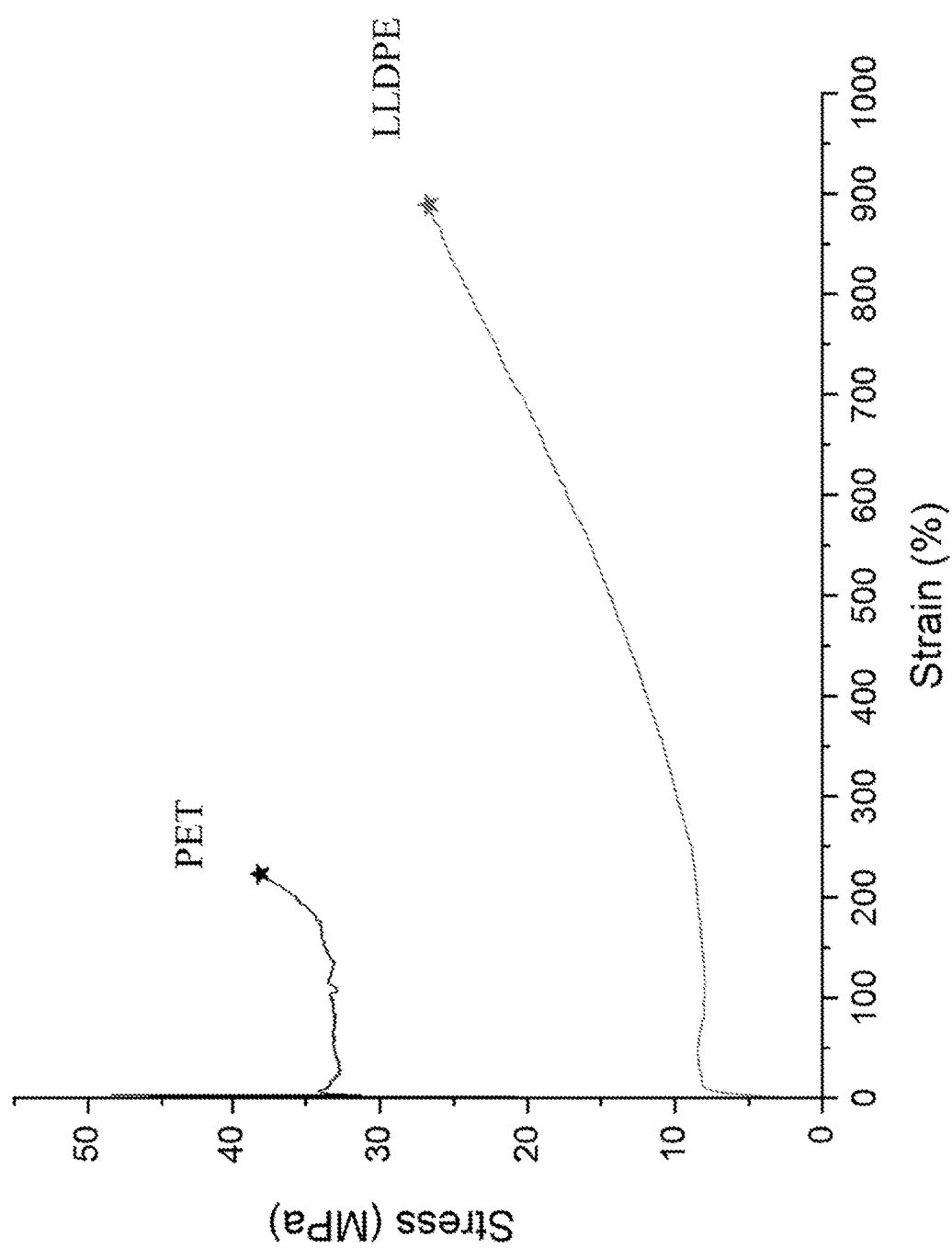
FIG. 18 is a stress-strain tensile test of PET and LLDPE, according to Example 4.

Mechanical properties and miscibility of the PET/PE/BCP blends were evaluated by tensile testing and SEM, respectively. Stress-strain curves from tensile testing are shown in FIGS. 16A and 16B with values summarized in Table 4. As expected, the neat blend of PET/PE 80/20 was very brittle with less than 10% elongation at break even though the PET and PE homopolymers each individually broke at more than 200% and 800%, respectively (FIG. 18). An SEM image of the cryo-fractured PET/PE polymer blend from tensile testing is shown in FIG. 17A. Note that the PE droplets and gaps in this blend are quite large, indicating poor miscibility with PET and thus low adhesion. These observations are consistent with the previously discussed multilayer peel testing (FIG. 11A-11B) and corresponding AFM image (FIG. 13A-13D).

Figure 17B:
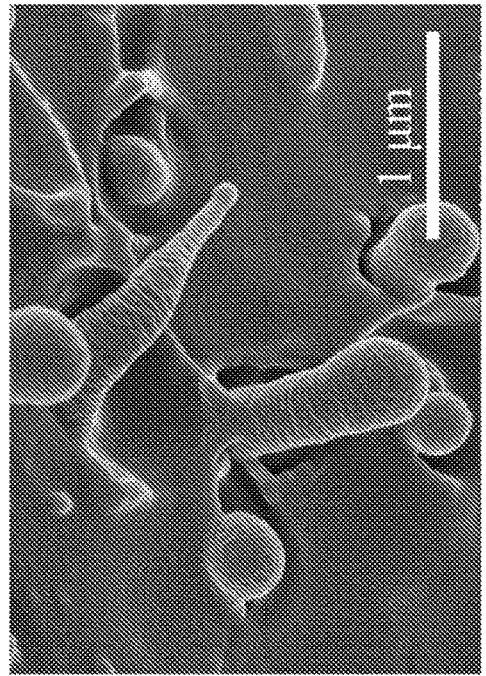
FIG. 17B is a SEM image of a tensile test of an exemplary cryo-fractured polymer blend of PET/PE/TBCP (80/20/2), according to Example 4.
Figure 17C:
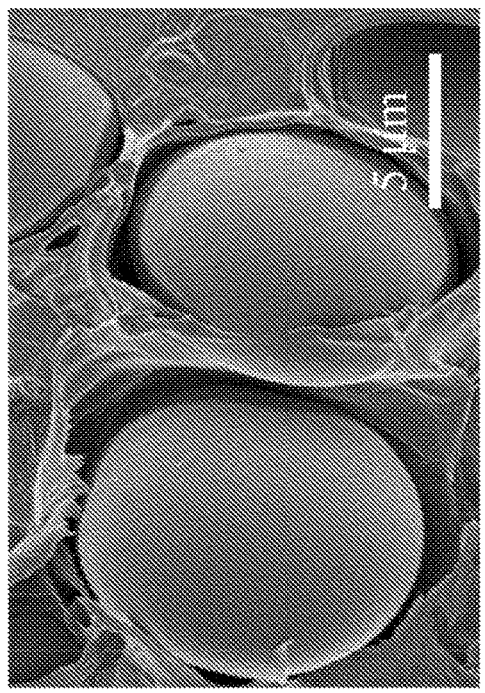
FIG. 17C is a SEM image of a tensile test of an exemplary cryo-fractured polymer blend of PET/PE/MBCP-4k (80/20/2), according to Example 4.
Figure 17D:
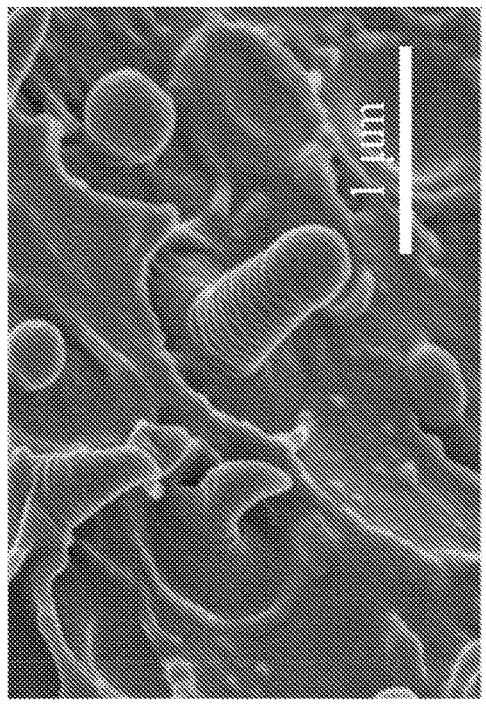
FIG. 17D is a SEM image of a tensile test of an exemplary cryo-fractured polymer blend of PET/PE/MBCP-7k (80/20/2), according to Example 4.

With the addition of TBCP (2 wt %), the strain at break was observed to increase three times that of the neat blend, though significant PE droplets and gaps between the two components were still observed (FIG. 17B). We postulate that the TBCP only reduces the droplet size of the PE phase without enhancing interfacial adhesion. On the other hand, stress and strain at break were dramatically enhanced when MBCPs (2 wt %) was added to the blend without any significant change in Young's modulus. For example, the strain at break for the PET/PE/MBCP-7k (80/20/2) blend was found to be approximately 395% which is over 30 times better than the neat blend. As with the previously discussed multilayer peel testing, the longer molecular weight blocks (7 k versus 4 k) appear to enhance adhesion, most likely through a combination of improved compatibility and chain entanglement. Overall, it is assumed that blends containing MBCPs are not only more compatibilized than those with TBCP, they also improved the adhesion between PET and PE phases. SEM images of the MBCP compatibilized blend specimens after cryo-fracturing (FIGS. 17C and 17D) show that the interfacial adhesion is much better than that of the uncompatibilized blend or the blend with TBCP. There were neither clear boundaries of PET/PE nor spherical PE droplets at the fracture surface. Furthermore, the PE droplets were deformed and elongated by the fracture without detaching from one another. We assume that each block in the MBCP improved the adhesion in the blend so that the applied force was appropriately and efficiently transferred to the more ductile PE phase, leading to an improvement in the overall toughness.

TABLE 4

Mechanical properties of PET, PE, and PET/PE blends.

| Polymer | Strain at break (%) | Stress at break (MPa) | Young's modulus (GPa) |
|---|---|---|---|
| PET | 235.6 ± 32.1 | 39.4 ± 1.1 | 1.96 ± 0.15 |
| LLDPE | 840.4 ± 87.3 | 24.9 ± 3.4 | 0.22 ± 0.02 |
| PET/LLDPE (80/20) | 9.8 ± 2.3 | 21.1 ± 1.8 | 1.28 ± 0.10 |
| PET/LLDPE/TBCP (80/20/2) | 13.0 ± 1.5 | 20.6 ± 5.2 | 1.40 ± 0.04 |
| PET/LLDPE/MBCP-4k (80/20/2) | 333.0 ± 93.0 | 36.2 ± 5.0 | 1.34 ± 0.10 |
| PET/LLDPE/MBCP-4k (80/20/2) | 401.7 ± 18.9 | 44.0 ± 3.2 | 1.47 ± 0.06 |
| PET/LLDPE/MBCP-7k (80/20/2) | 395.4 ± 21.3 | 41.9 ± 1.6 | 1.25 ± 0.02 |

CONCLUSIONS

PET-PE MBCPs were synthesized through a coupling reaction of hydroxy-terminated PET and PE block precursors. The interfacial adhesion of PET/PE with the MBCPs and the ability of the MBCPs to compatibilize immiscible PET/PE polymer blends were investigated. Peel testing of multilayer PET/PE films confirmed that the MBCPs dramatically strengthened the PET/PE interlayer which otherwise shows inferior adhesion. While the PE-PET-PE TBCP-4k hardly improved adhesion (peel strength $1.36 \times 10^{-3}$ N/mm), MBCP-4k dramatically increased it (0.62 N/mm). Moreover, increasing the MBCP block length to 7 k led to an even greater enhancement in adhesion (1.14 N/mm). The MBCPs are thought to be more miscible with the homopolymer phases, leading to greater entanglement at the interface. This entanglement phenomenon was enhanced by increasing the size of the individual blocks in the MBCP from 4 k to 7 k.

The MBCPs also worked effectively as compatibilizers in PET/PE polymer blends. Adding only 2 wt % of MBCP to PET/PE (80/20) significantly reduced the size of the PE droplets in the PET matrix by a factor of 10, while the elongation at break increased over 30 times. It is considered that the interfacial energy decreases due to the localization of MBCP at the interface and that the resulting adhesion improves greatly contributing to the improvement of physical properties. These results open up the possibility of recycling multicomponent products such as PET/PE multilayer films, which are normally difficult to separate, by direct melt blending with a PET-PET MBCP.

Example 5: Exemplary Synthesis of an Alternating MBCP

In a round-bottomed flask purged with argon were dissolved ethylene glycol (0.76 g, 0.012 mol), pyridine (2.92 g, 0.037 mol) and catalytic DMAP in TCE (20 mL). The reaction was warmed to 80° C. whereupon a solution of terephthaloyl chloride (3.00 g, 0.015 mol) in TCE (25 mL) was added dropwise. After the addition was completed, the reaction continued to stir at 80° C. for 2 hours. A solution of dihydroxy PE block precursor (0.061 mol) in TCE (10 mL) was added dropwise and the reaction stirred at 80 C for 16 hr. The reaction was then cooled to RT and precipitated with acetone (400 mL), followed by filtration and washing with acetone (400 mL) and DI water (400 mL) and drying in a vacuum oven overnight. The reaction yielded 5.15 g of a white solid.

REFERENCES

[1] R. Geyer, J. R. Jambeck, and K. L. Law, "Production, use, and fate of all plastics ever made," *Sci. Adv.*, no. July, pp. 25-29, 2017.

[2] D. K. A. Barnes, F. Galgani, R. C. Thompson, and M. Barlaz, "Accumulation and fragmentation of plastic debris in global environments," *Philos. Trans. R. Soc. B Biol. Sci.*, vol. 364, no. 1526, pp. 1985-1998, 2009.

[3] A.-C. Albertsson and M. Hakkarainen, "Designed to degrade," *Science*, vol. 358, no. 6365, pp. 872-873, November 2017.

[4] J. R. Jambeck et al., "Plastic waste inputs from land into the ocean," *Science*, vol. 347, no. 6223, pp. 768-771, February 2015.

[5] J. M. Garcia and M. L. Robertson, "The future of plastics recycling," *Science*, vol. 358, no. 6365, pp. 870-872, 2017.

[6] U.S. Environmental Protection Agency (EPA), "https://archive.epa.gov/epawaste/conserve/tools/warm/pdfs/Plastics.pdf," *Plastics*, 2015.

[7] J. M. Eagan et al., "Combining polyethylene and polypropylene: Enhanced performance with PE/iPP multiblock polymers," *Science*, vol. 355, no. 6327, pp. 814-816, 2017.

[8] G. A. Uehara, M. P. França, and S. V. Canevarolo Junior, "Recycling assessment of multilayer flexible packaging films using design of experiments," *Polimeros*, vol. 25, no. 4, pp. 371-381, August 2015.

[9] Y. Zheng, S. M. Guerra, S. E. Hansen, and B. W. Walther, "Resin for Use as Tie Layers in Multilayer Films and Multilayer Films Comprising the Same," International Patent WO2018/063578, 2018.

[10] S. Pucci, Mark, D. Whaley, Paul, and L. Opacich, Michael, "Adhesive Compositions, Articles including the Adhesive Compositions, and Methods thereof," International Patent WO2017/210423, 2017.

[11] T. Ebeling, S. Norek, A. Hasan, A. Hiltner, and E. Baer, "Effect of a tie layer on the delamination toughness of polypropylene and polyamide-66 microlayers," *J. Appl. Polym. Sci.*, vol. 71, no. 9, pp. 1461-1467, February 1999.

[12] I. Edward J. Dalgewicz, "Multi-layered Thermoplastic Container," U.S. Patent U.S. Pat. No. 6,773,735, 2004.

[13] S. Yang and M. C. Gupta, "Surface modification of polyethyleneterephthalate by an atmospheric-pressure plasma source," *Surf Coatings Technol.*, vol. 187, no. 2-3, pp. 172-176, 2004.

[14] Y. Akishev et al., "Studies on cold plasma-polymer surface interaction by example of PP- and PET-films," *J. Phys. D. Appl. Phys.*, vol. 41, no. 23, 2008.

[15] R. Wolf and A. C. Sparavigna, "Role of Plasma Surface Treatments on Wetting and Adhesion," *Engineering*, vol. 02, no. 06, pp. 397-402, 2010.

[16] S. Sapieha, J. Cerny, J. E. Klemberg-Sapieha, and L. Martinu, "Corona versus low pressure plasma treatment: Effect on surface properties and adhesion of polymers," *J. Adhes.*, vol. 42, no. 1-2, pp. 91-102, 1993.

[17] M. S. Kaiser, Katharina, Markus Schmid, K. Kaiser, M. Schmid, and M. Schlummer, "Recycling of Polymer-Based Multilayer Packaging: A Review," *Recycling*, vol. 3, no. 1, p. 1, December 2017.

[18] S. Wu, "Chain structure and entanglement," *J. Polym. Sci. Part B Polym. Phys.*, vol. 27, no. 4, pp. 723-741, 1989.

[19] M. Okamoto and T. Kotaka, "Phase separation and homogenization in poly(ethylene naphthalene-2,6-dicarboxylate)/poly(ethylene terephthalate) blends," *Polymer*, vol. 38, no. 6, pp. 1357-1361, 1997.

[20] Y. Wang and M. A. Hillmyer, "Hydroxy-telechelic poly(ethylene-co-isobutylene) as a soft segment for thermoplastic polyurethanes," *Polym. Chem.*, vol. 6, no. 38, pp. 6806-6811, 2015.

[21] Y. Pietrasanta, J. Robin, N. Torres, and B. Boutevin, "Reactive compatibilization of HDPE/PET blends by glycidyl methacrylate functionalized polyolefins," *Macromol. Chem. Phys.*, vol. 200, no. 1, pp. 142-149, 1999.

[22] T. L. Carté and A. Moet, "Morphological origin of super toughness in poly(ethylene terephthalate)/polyethylene blends," *J. Appl. Polym. Sci.*, vol. 48, no. 4, pp. 611-624, April 1993.

[23] N. K. Kalfoglou, D. S. Skafidas, J. K. Kallitsis, J. C. Lambert, and L. Van der Stappen, "Comparison of compatibilizer effectiveness for PET/HDPE blends," *Polymer*, vol. 36, no. 23, pp. 4453-4462, 1995.

[24] D. H. Kim, K. Y. Park, J. Y. Kim, and K. D. O. Sum, "Improved compatibility of high-density polyethylene/poly(ethylene terephthalate) blend by the use of blocked isocyanate group," *J. Appl. Polym. Sci.*, vol. 78, no. 5, pp. 1017-1024, 2000.

[25] H. Zhang, Y. Zhang, W. Guo, D. Xu, and C. Wu, "Thermal properties and morphology of recycled poly(ethylene terephthalate)/maleic anhydride grafted linear low-density polyethylene blends," *J. Appl. Polym. Sci.*, vol. 109, no. 6, pp. 3546-3553, September 2008.

[26] A. D. Todd, R. J. McEneany, V. A. Topolkaraev, C. W. Macosko, and M. A. Hillmyer, "Reactive Compatibilization of Poly(ethylene terephthalate) and High-Density Polyethylene Using Amino-Telechelic Polyethylene," *Macromolecules*, vol. 49, no. 23, pp. 8988-8994, 2016.

[27] M. D. Dadmun, "Importance of a broad composition distribution in polymeric interfacial modifiers," *Macromolecules*, vol. 33, no. 24, pp. 9122-9125, 2000.

[28] M. S. Lee, T. P. Lodge, and C. W. Macosko, "Can random copolymers serve as effective polymeric compatibilizers?," *J. Polym. Sci. Part B Polym. Phys.*, vol. 35, no. 17, pp. 2835-2842, 1997.

[29] Y. Xu, C. M. Thurber, T. P. Lodge, and M. A. Hillmyer, "Synthesis and remarkable efficacy of model polyethylene-graft-poly(methyl methacrylate) copolymers as compatibilizers in polyethylene/poly(methyl methacrylate) blends," *Macromolecules*, vol. 45, no. 24, pp. 9604-9610, 2012.

[30] D. J. Lohse, S. Datta, and E. N. Kresge, "Graft Copolymer Compatibilizers for Blends of Polypropylene and Ethylene-Propylene Copolymers," *Macromolecules*, vol. 24, no. 2, pp. 561-566, 1991.

[31] Y. Zhu, Z. Ma, Y. Li, J. Cui, and W. Jiang, "Monte Carlo simulation of the compatibility of graft copolymer compatibilized two incompatible homopolymer blends: Effect of graft structure," *J. Appl. Polym. Sci.*, vol. 105, no. 3, pp. 1591-1596, August 2007.

[32] T. D. Traugott, J. W. Barlow, and D. R. Paul, "Mechanical compatibilization of high density polyethylene-poly(ethylene terephthalate) blends," *J. Appl. Polym. Sci.*, vol. 28, no. 9, pp. 2947-2959, 1983.

[33] J. W. Barlow and D. R. Paul, "Mechanical compatibilization of immiscible blends," *Polym. Eng. Sci.*, vol. 24, no. 8, pp. 525-534, 1984.

[34] F. S. Bates, M. A. Hillmyer, T. P. Lodge, C. M. Bates, K. T. Delaney, and G. H. Fredrickson, "Multiblock Polymers: Panacea or Pandora's Box?," *Science*, vol. 336, no. 6080, pp. 434-440, April 2012.

[35] E. A. Eastwood and M. D. Dadmun, "Multiblock copolymers in the compatibilization of polystyrene and poly(methyl methacrylate) blends: Role of polymer architecture," *Macromolecules*, vol. 35, no. 13, pp. 5069-5077, 2002.

[36] J. Noolandi, "Multiblock copolymers as polymeric surfactants: are 'pancakes' better than 'dumbbells'?," *Macromol. Theory Simulations*, vol. 1, no. 5, pp. 295-298, 1992.

[37] J. Xu et al., "Compatibilization of Isotactic Polypropylene (iPP) and High-Density Polyethylene (HDPE) with iPP-PE Multiblock Copolymers," *Macromolecules*, vol. 51, no. 21, p.acs.macromol.8b01907, November 2018.

[38] L. M. Pitet, M. A. Amendt, and M. A. Hillmyer, "Nanoporous linear polyethylene from a block polymer precursor," *J. Am. Chem. Soc.*, vol. 132, no. 24, pp. 8230-8231, 2010.

[39] M. A. Hillmyer and F. S. Bates, "Synthesis and characterization of model polyalkane-poly(ethylene oxide) block copolymers," *Macromolecules*, vol. 29, no. 22, pp. 6994-7002, 1996.

[40] I. Lee, T. R. Panthani, and F. S. Bates, "Sustainable poly(lactide-b-butadiene) multiblock copolymers with enhanced mechanical properties," *Macromolecules*, vol. 46, no. 18, pp. 7387-7398, 2013.

[41] T. R. Panthani and F. S. Bates, "Crystallization and Mechanical Properties of Poly(I-lactide)-Based Rubbery/Semicrystalline Multiblock Copolymers," *Macromolecules*, vol. 48, no. 13, pp. 4529-4540, 2015.

[42] P. J. Cole, R. F. Cook, and C. W. Macosko, "Adhesion between immiscible polymers correlated with interfacial entanglements," *Macromolecules*, vol. 36, no. 8, pp. 2808-2815, 2003.

[43] L. J. Fetters, D. J. Lohse, D. Richter, T. A. Witten, and A. Zirkel, "Connection between Polymer Molecular Weight, Density, Chain Dimensions, and Melt Viscoelastic Properties," *Macromolecules*, vol. 27, no. 17, pp. 4639-4647, 1994.

[44] Y. Zeng, C. R. López-Barrón, S. Kang, A. P. R. Eberle, T. P. Lodge, and F. S. Bates, "Effect of Branching and Molecular Weight on Heterogeneous Catalytic Deuterium Exchange in Polyolefins," *Macromolecules*, vol. 50, no. 17, pp. 6849-6860, 2017.

[45] T. H. Ameed, I. A. H. Ussein, T. Hameed, and I. A. Hussein, "Melt Miscibility and Mechanical Properties of Metallocene LLDPE blends with HDPE: Influence of Mw of LLDPE," *Polym. J.*, vol. 38, no. 11, pp. 1114-1126, 2006.

[46] I. A. Hussein, "Influence of composition distribution and branch content on the miscibility of m-LLDPE and HDPE blends: Rheological investigation," *Macromolecules*, vol. 36, no. 6, pp. 2024-2031, 2003.

[47] J. Zhang, T. P. Lodge, and C. W. Macosko, "Models for adhesion at weak polymer interfaces," *J. Polym. Sci. Part B Polym. Phys.*, vol. 47, no. 23, pp. 2313-2319, December 2009.

[48] T. P. Russell, S. H. Anastasiadis, A. Menelle, G. P. Felcher, and S. K. Satija, "Segment Density Distribution of Symmetric Diblock Copolymers at the Interface between Two Homopolymers As Revealed by Neutron Reflectivity," *Macromolecules*, vol. 24, no. 7, pp. 1575-1582, 1991.

[49] A. C. Balazs, C. P. Siemasko, and C. W. Lantman, "Monte Carlo simulations for the behavior of multiblock copolymers at a penetrable interface," *J. Chem. Phys.*, vol. 94, no. 2, pp. 1653-1663, 1991.

Other Embodiments

It is to be understood that while the present application has been described in conjunction with the detailed description thereof, the foregoing description is intended to illustrate and not limit the scope of the present application, which is defined by the scope of the appended claims. Other aspects, advantages, and modifications are within the scope of the following claims.

What is claimed is:

1. A multiblock copolymer comprising:
    a block obtained from a polyester having an average $M_N$ of from about 2,000 to about 200,000, wherein the polyester contains one or more terephthalate units; and
    a block obtained from a polyolefin having an average $M_N$ of from about 2,000 to about 200,000, wherein the polyolefin is selected from the group consisting of polyethylenes, polypropylenes, polystyrenes, alkyl polystyrenes, polybutylenes, polybutadienes, polyacrylates, polymethacrylates, polyisoprenes, polyisobutylene, polyvinylidene dichloride, polyethylene vinyl alcohol, and combinations thereof.

2. The multiblock copolymer of claim 1, wherein the multiblock copolymer has an average $M_N$ of from about 4,000 to about 600,000.

3. The multiblock copolymer of claim 1, wherein the multiblock copolymer has an average of from about 2 to about 20 repeating block units.

4. The multiblock copolymer of claim 1, wherein the blocks are randomly arranged or alternatingly arranged.

5. The multiblock copolymer of claim 1, wherein the multiblock copolymer consists essentially of blocks obtained from a polyester containing one or more terephthalate units and blocks obtained from a polyolefin.

6. The multiblock copolymer of claim 1, wherein the polyester is selected from polyethylene terephthalate (PET), polyethylene terephthalate glycol (PETG), polybutylene terephthalate (PBT), polycyclohexane terephthalate glycol (PCTG), polycyclohexane terephthalate (PCT), polytrimethylene terephthalate (PTT), polydianol terephthalate (PDT), and combinations thereof.

7. The multiblock copolymer of claim 1, wherein the multiblock copolymer comprises from one of about 10 wt.-% to about 90 wt.-% blocks obtained from the polyester.

8. The multiblock copolymer of claim 1, wherein the multiblock copolymer comprises from about 40 wt.-% to about 60 wt.-% blocks obtained from the polyolefin.

9. A process for preparing the multiblock copolymer of claim 1 comprising reacting:
    a hydroxy-terminated polyester block precursor, wherein the polyester contains one or more terephthalate units;
    a hydroxy-terminated polyolefin block precursor, wherein the polyolefin is selected from the group consisting of polyethylenes, polypropylenes, polystyrenes, alkyl polystyrenes, polybutylenes, polybutadienes, polyacrylates, polymethacrylates, polyisoprenes, polyisobutylene, polyvinylidene dichloride, polyethylene vinyl alcohol, and combinations thereof; and
    an acid chloride.

10. The process of claim 9, wherein the polyester is selected from polyethylene terephthalate (PET), polyethylene terephthalate glycol (PETG), polybutylene terephthalate (PBT), polycyclohexane terephthalate glycol (PCTG), polycyclohexane terephthalate (PCT), polytrimethylene terephthalate (PTT), polydianol terephthalate (PDT), and combinations thereof.

11. The process of claim 9, wherein the reacting is performed at between about 70° C. and 300° C.

12. The process of claim 9, wherein the reacting is performed in the presence of a Lewis base catalyst, a Lewis base neutralizer, or a solubilizing solvent.

13. The process of claim 9, wherein the acid chloride is a diacyl chloride.

14. The process of claim 13, wherein the diacyl chloride is selected from terephthaloyl chloride, sebacoyl chloride, adipoyl chloride, benzoyl chloride, and isophthaloyl chloride.

15. The process of claim 9, wherein a ratio of acid chloride functional groups to combined hydroxyl groups present on the polyester block precursor and polyolefin block precursor is from about 1:9 to about 9:1.

16. A process for preparing a multiblock copolymer comprising:
performing a ring opening reaction with
a cyclic polyester block precursor;
a Lewis acid catalyst; and
a hydroxy-terminated polyolefin block precursor to form a diblock polyester-polyolefin polymer or a triblock polyester-polyolefin-polyester polymer; and
coupling the diblock polymer or the triblock polymer in the presence of a diacyl chloride, wherein the polyester contains one or more terephthalate units; and wherein the polyolefin is selected from the group consisting of polyethylenes, polypropylenes, polystyrenes, alkyl polystyrenes, polybutylenes, polybutadienes, polyacrylates, polymethacrylates, polyisoprenes, polyisobutylene, polyvinylidene dichloride, polyethylene vinyl alcohol, and combinations thereof.

17. The process of claim 16, wherein the diacyl chloride is selected from terephthaloyl chloride, sebacoyl chloride, adipoyl chloride, and isophthaloyl chloride.

18. The process of claim 16, wherein the reaction is performed at between about 50° C. and 300° C.

* * * * *

UNITED STATES PATENT AND TRADEMARK OFFICE
CERTIFICATE OF CORRECTION

PATENT NO. : 12,281,204 B2
APPLICATION NO. : 17/598655
DATED : April 22, 2025
INVENTOR(S) : Christopher J. Ellison and Kevin Michael Miller Page 1 of 1

It is certified that error appears in the above-identified patent and that said Letters Patent is hereby corrected as shown below:

On the Title Page

Column 2, item (57) Abstract, Line 3: please delete "MN" and insert therefor -- $M_N$ --;

Column 2, item (57) Abstract, Line 6: please delete "MN" and insert therefor -- $M_N$ --;

In the Claims

Column 38, Line 39, Claim 6: please delete "polycyclohexane" and insert therefor
-- polycyclohexylenedimethylene --;

Column 38, Line 40, Claim 6: please delete "polycyclohexane" and insert therefor
-- polycyclohexylenedimethylene --;

Column 38, Line 64, Claim 10: please delete "polycyclohexane" and insert therefor
-- polycyclohexylenedimethylene --;

Column 38, Line 64-65, Claim 10: please delete "polycyclohexane" and insert therefor
-- polycyclohexylenedimethylene --; and Column 39, Line 16, Claim 16: after "copolymer", please insert -- of claim 1 --.

Signed and Sealed this
Third Day of June, 2025

Coke Morgan Stewart
*Acting Director of the United States Patent and Trademark Office*